US008368647B2

(12) United States Patent
Lin

(10) Patent No.: US 8,368,647 B2
(45) Date of Patent: Feb. 5, 2013

(54) THREE-DIMENSIONAL VIRTUAL INPUT AND SIMULATION APPARATUS

(76) Inventor: Ming-Yen Lin, Taipei (TW)

( * ) Notice: Subject to any disclaimer, the term of this patent is extended or adjusted under 35 U.S.C. 154(b) by 1151 days.

(21) Appl. No.: 12/184,475

(22) Filed: Aug. 1, 2008

(65) Prior Publication Data

US 2009/0033623 A1 Feb. 5, 2009

(30) Foreign Application Priority Data

Aug. 1, 2007 (TW) .............................. 96128242 A
Jan. 4, 2008 (TW) .............................. 97100377 A
Jul. 25, 2008 (TW) .............................. 97128441 A

(51) Int. Cl.
G06F 3/033 (2006.01)
G09G 5/08 (2006.01)

(52) U.S. Cl. ........................................................ 345/158
(58) Field of Classification Search ........... 345/156–184
See application file for complete search history.

(56) References Cited

U.S. PATENT DOCUMENTS 3,084,261 A * 4/1963 Wilson ....................... 250/208.2
4,092,072 A * 5/1978 Ellis ............................. 356/141.5
4,193,689 A * 3/1980 Reymond et al. ........ 356/139.03
4,209,254 A * 6/1980 Reymond et al. ........ 356/139.03
4,414,537 A * 11/1983 Grimes ............................ 341/20
4,419,012 A * 12/1983 Stephenson et al. ........ 356/141.5
4,613,866 A * 9/1986 Blood ............................ 342/448
4,928,175 A * 5/1990 Haggren ....................... 348/159
4,945,305 A * 7/1990 Blood ........................ 324/207.17
4,973,156 A * 11/1990 Dainis ......................... 356/141.5
4,988,981 A * 1/1991 Zimmerman et al. ........ 345/158
5,047,952 A * 9/1991 Kramer et al. ................ 704/271
5,198,877 A * 3/1993 Schulz ............................ 356/614
5,214,615 A * 5/1993 Bauer ............................ 367/128
5,319,387 A * 6/1994 Yoshikawa .................... 345/179
5,640,241 A * 6/1997 Ogawa .......................... 356/615
5,642,164 A * 6/1997 Ogawa .......................... 348/335
5,739,812 A * 4/1998 Mochizuki et al. ........... 345/163
5,907,395 A * 5/1999 Schulz et al. ............. 356/139.03
5,920,395 A * 7/1999 Schulz ........................... 356/622
6,025,726 A * 2/2000 Gershenfeld et al. ......... 324/671
6,573,883 B1 * 6/2003 Bartlett ......................... 345/156
6,584,339 B2 * 6/2003 Galloway et al. ............. 600/426
6,587,809 B2 * 7/2003 Majoe ........................... 702/150
6,801,637 B2 * 10/2004 Voronka et al. ............... 382/103
6,810,142 B2 * 10/2004 Kochi et al. ................... 382/154
6,844,871 B1 * 1/2005 Hinckley et al. .............. 345/163
7,072,707 B2 * 7/2006 Galloway et al. ............. 600/424
7,889,179 B2 * 2/2011 Tseng ........................... 345/167
2002/0097230 A1 * 7/2002 Lowry et al. ................. 345/175
2005/0093824 A1 * 5/2005 Hinckley et al. .............. 345/163
2005/0116947 A1 * 6/2005 Lovberg et al. ............... 345/418
2005/0156915 A1 * 7/2005 Fisher ........................... 345/179
2005/0202869 A1 * 9/2005 Miyamoto et al. .............. 463/36
2005/0212749 A1 * 9/2005 Marvit et al. ................. 345/156
2008/0122788 A1 * 5/2008 Sirtori ........................... 345/158

* cited by examiner

OTHER PUBLICATIONS

Corson, Gregory; Remote Input Device; Date published: Nov. 2006 (Nov. 30, 2006); pp. 1-71.*

Primary Examiner — Amare Mengistu
Assistant Examiner — Antonio Xavier
(74) Attorney, Agent, or Firm — WPAT, PC; Justin King

(57) ABSTRACT

The present invention relates to a three-dimensional virtual input and simulation apparatus, and more particularly to an apparatus comprising a plurality of point light sources, a plurality of optical positioning devices with a visual axis tracking function, and a control analysis procedure. The invention is characterized in that the plurality of optical positioning devices with the visual axis tracking function are provided for measuring and analyzing 3D movements of the plurality of point light sources to achieve the effect of a virtual input and simulator.

30 Claims, 51 Drawing Sheets

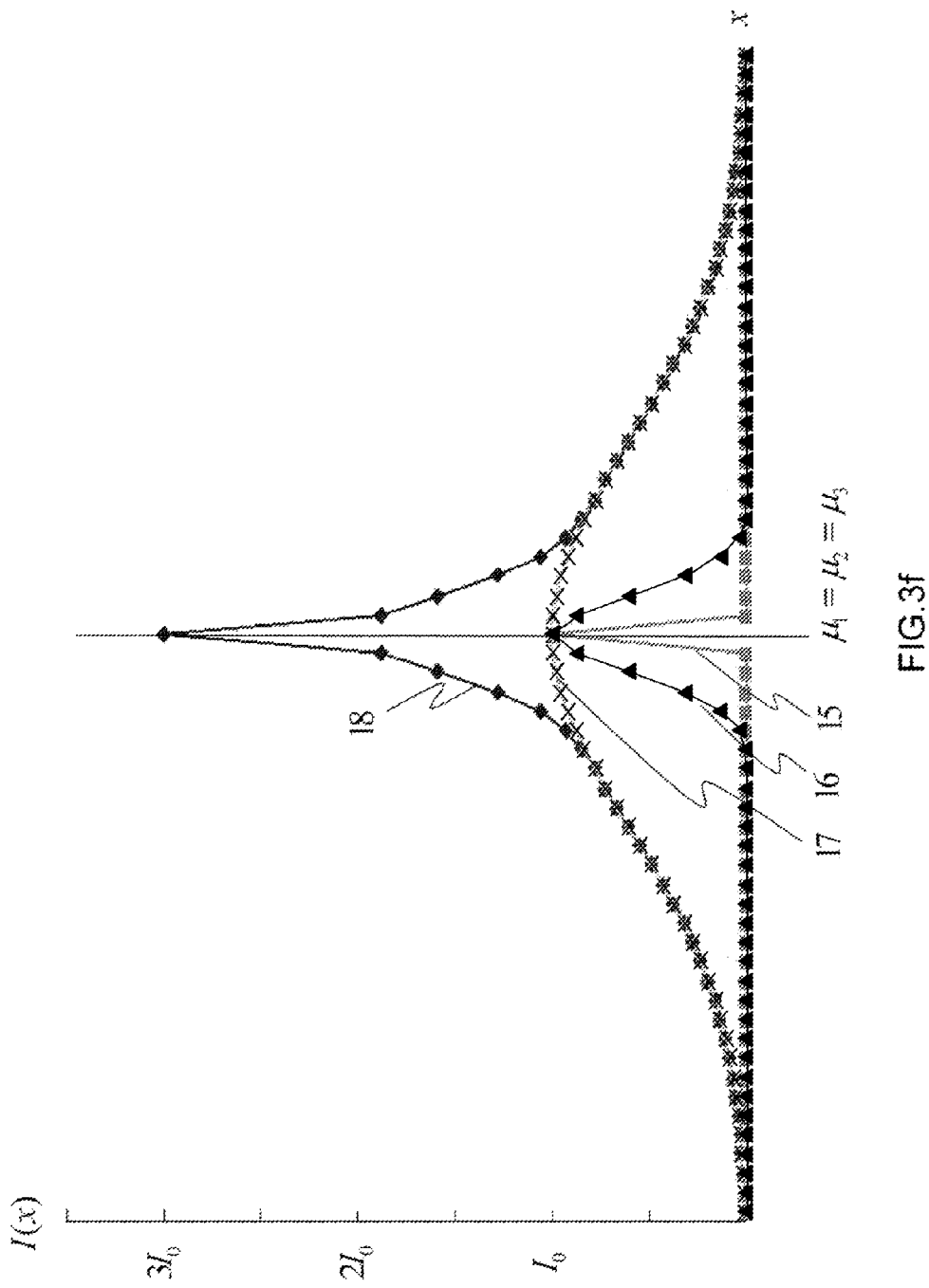

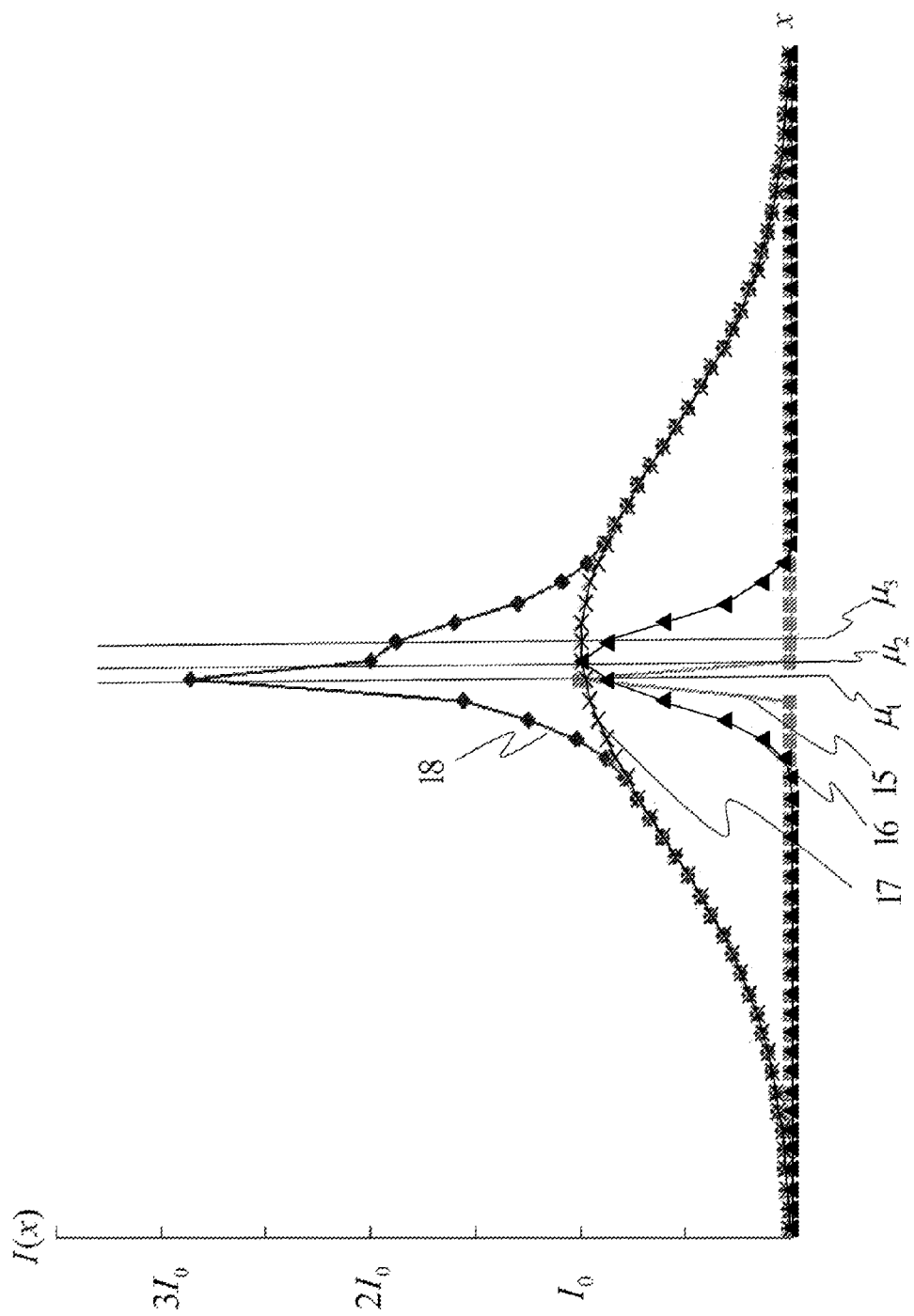

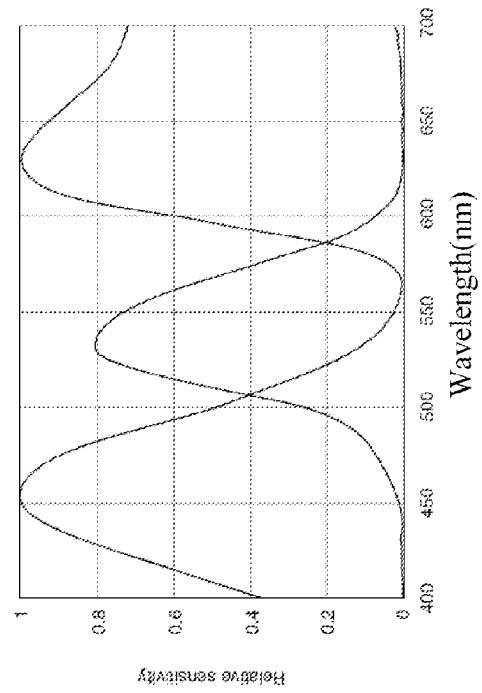
FIG.5b
FIG.5a
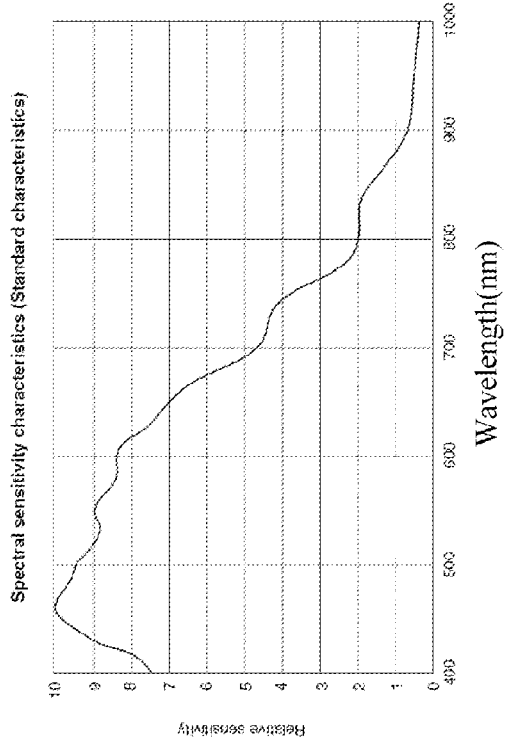
FIG.5c
Micron/CMOS/MT9M413

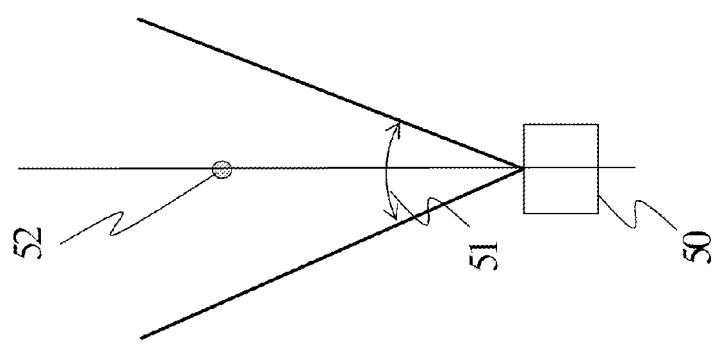
FIG.8a
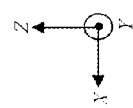

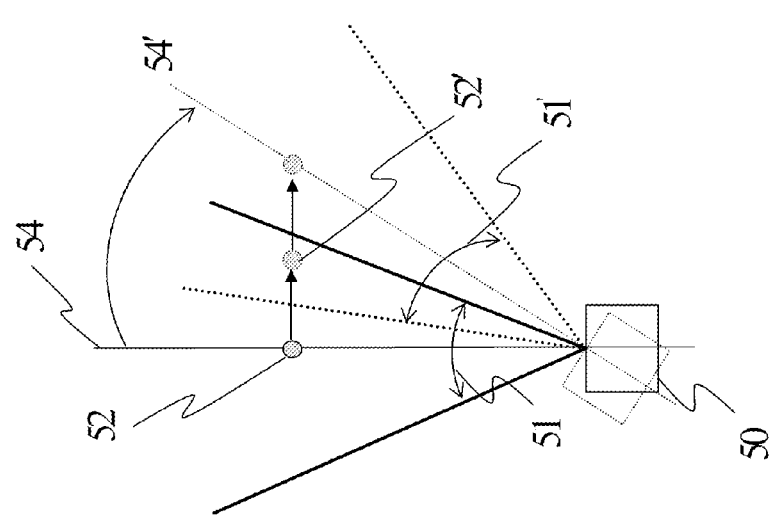
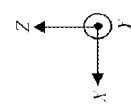
FIG.8d

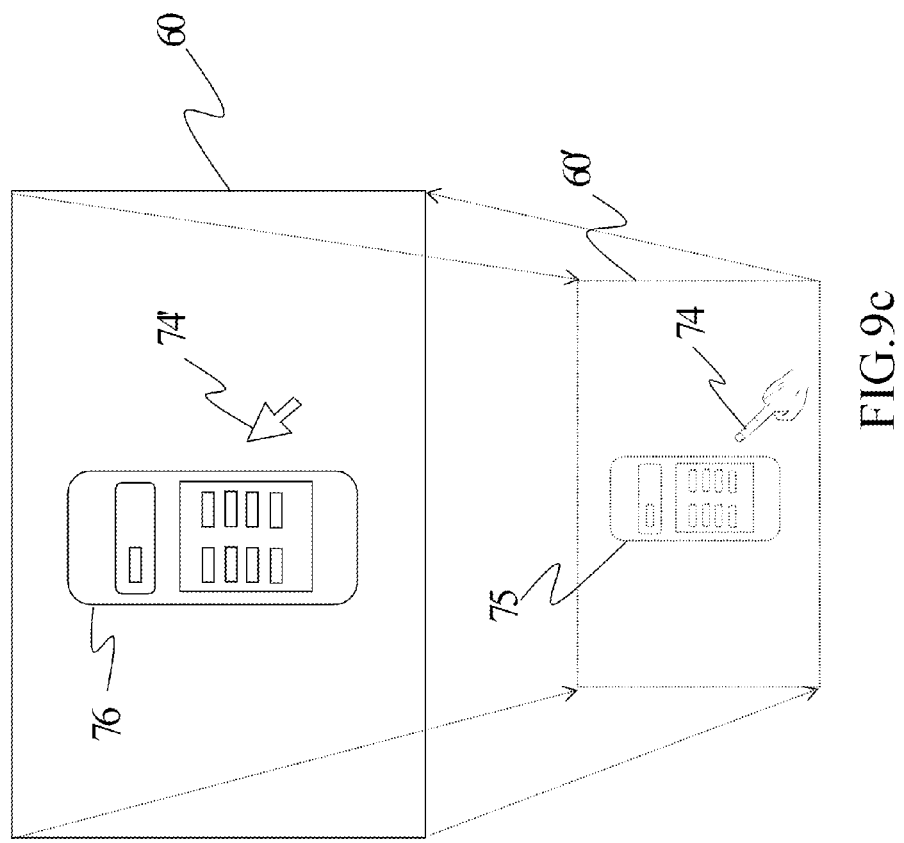

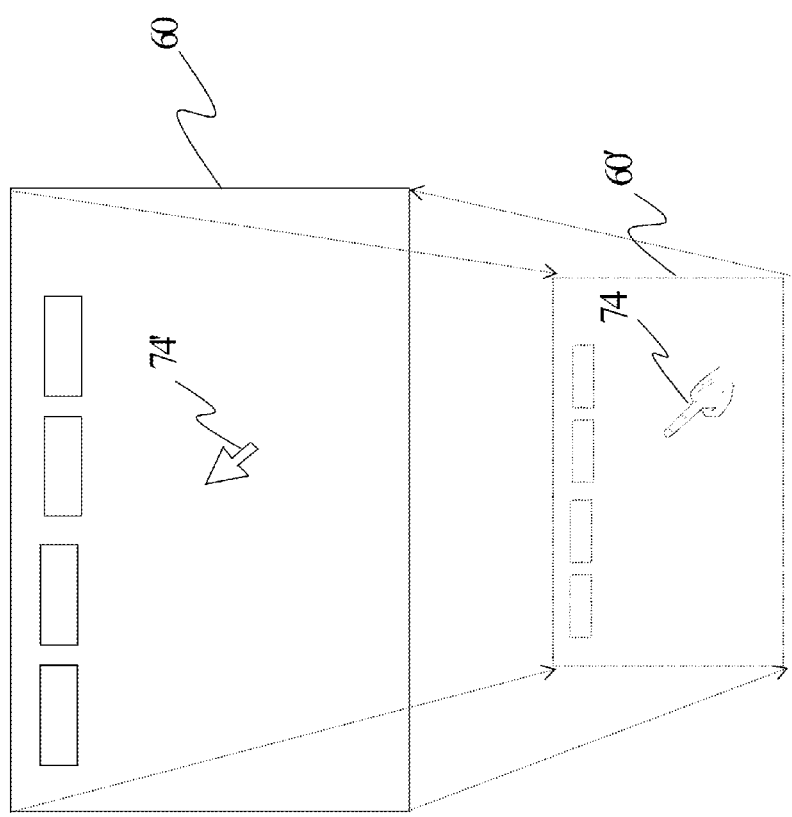

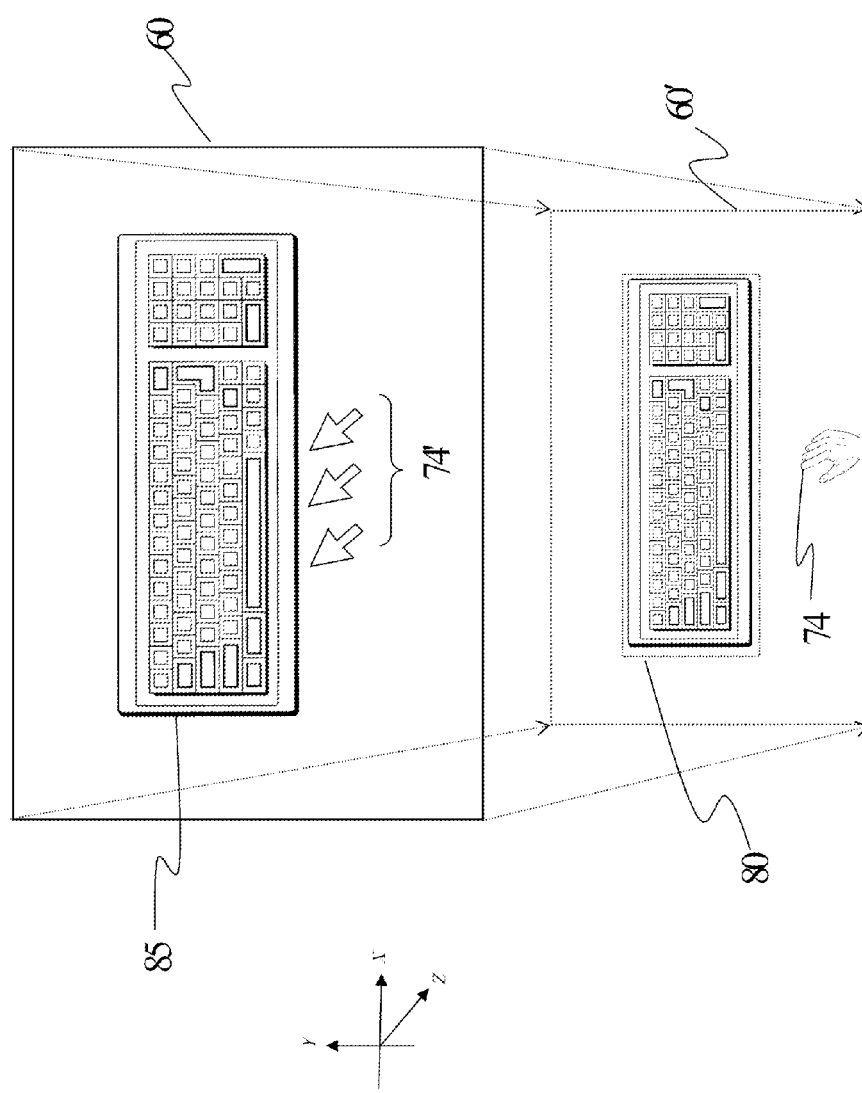

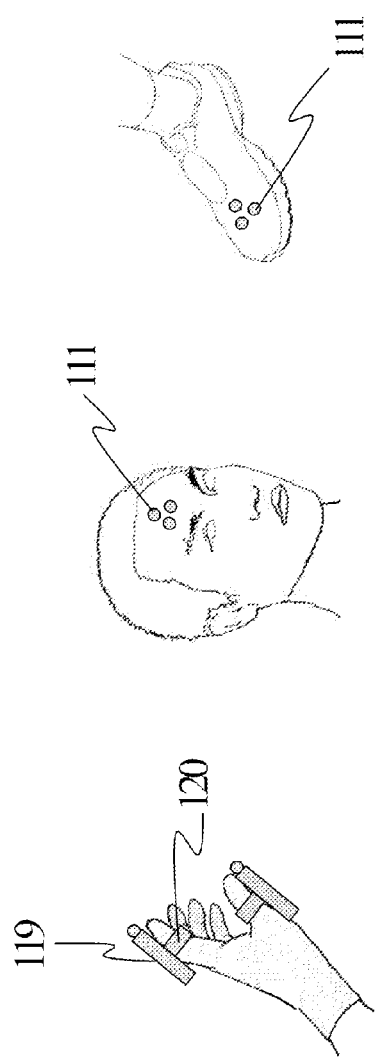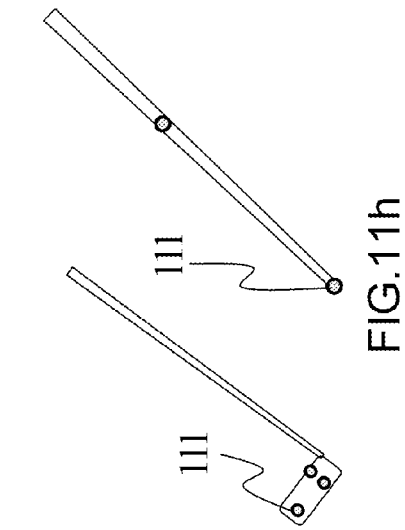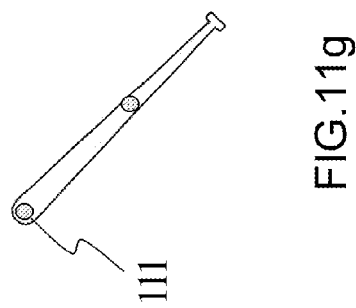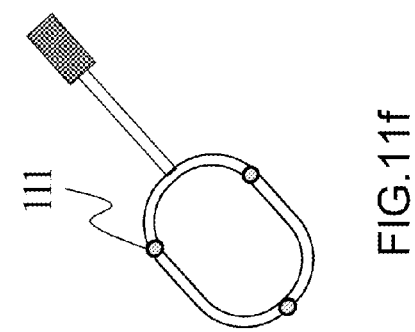
FIG.11e
FIG.11f
FIG.11g
FIG.11h

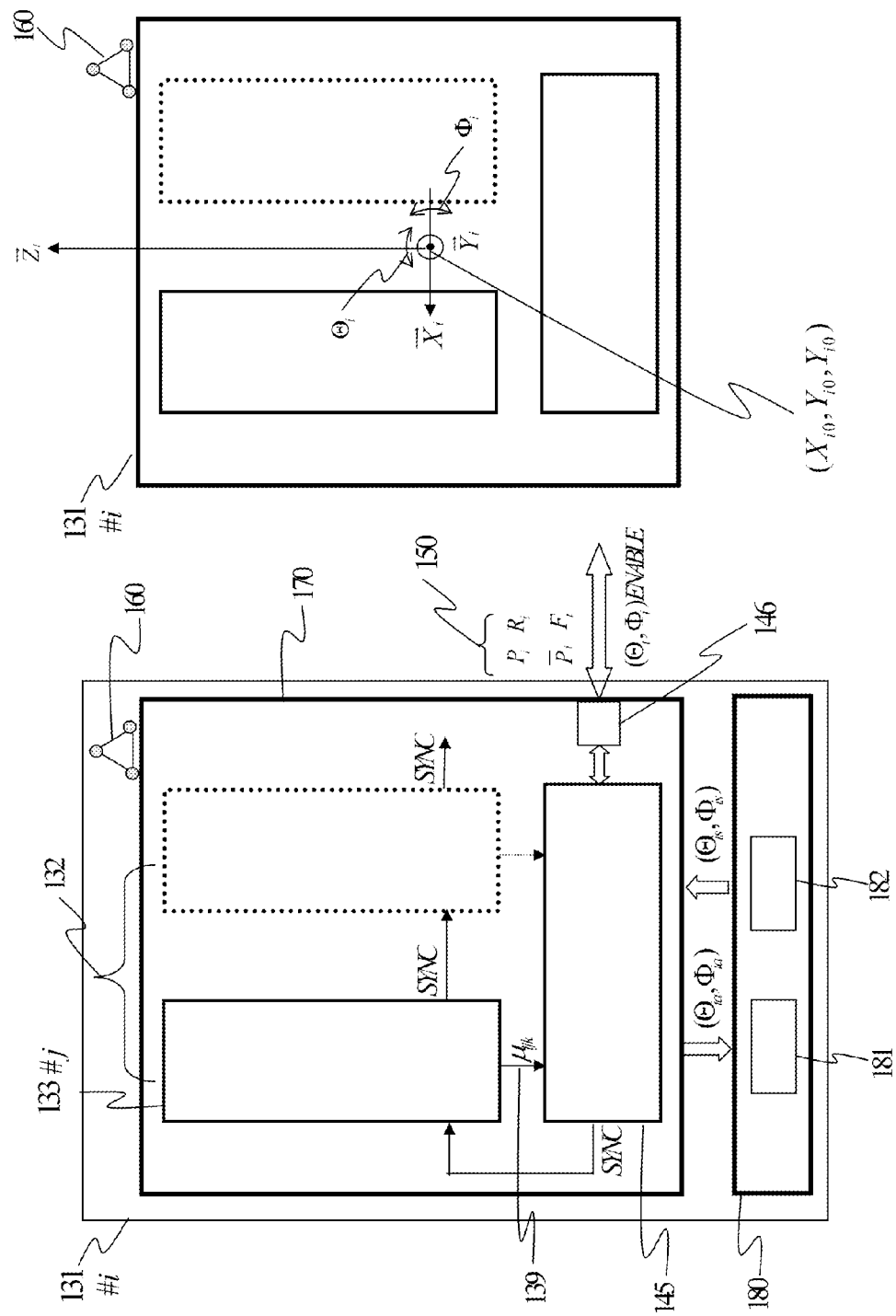

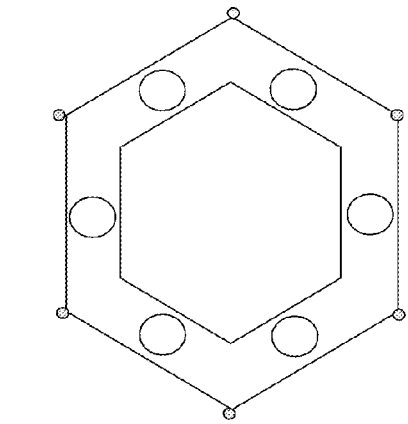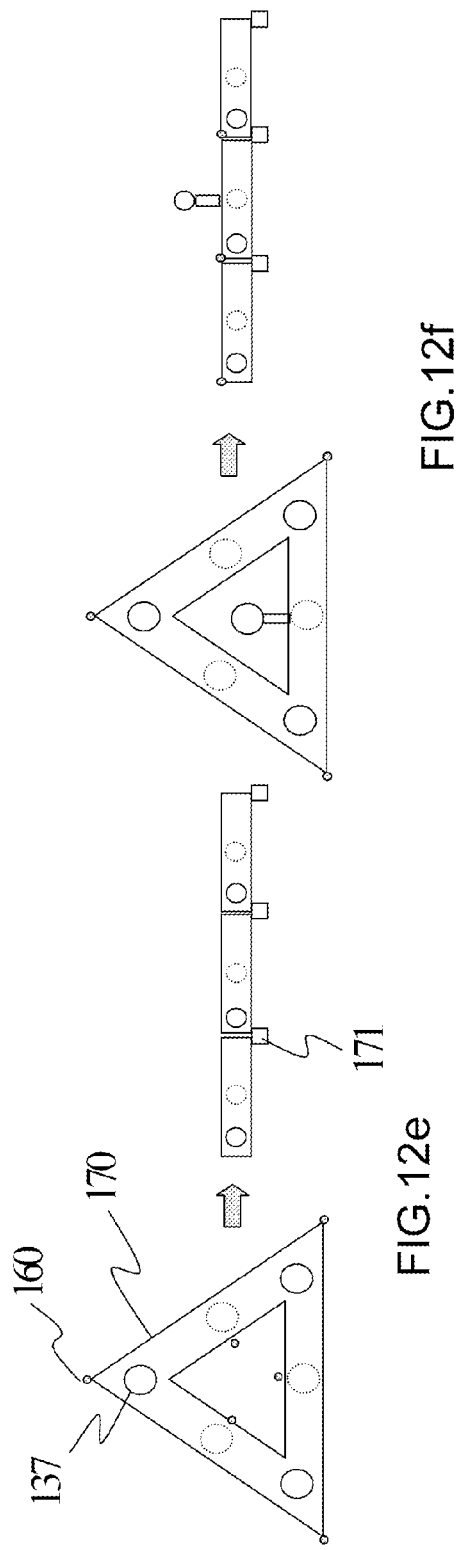

THREE-DIMENSIONAL VIRTUAL INPUT AND SIMULATION APPARATUS

FIELD OF THE INVENTION

The present invention relates to a three-dimensional virtual input and simulation apparatus, and more particularly to an apparatus comprising a plurality of point light sources, a plurality of optical positioning devices with a visual axis tracking function and a control analysis procedure. The invention is characterized in that the plurality of optical positioning devices with the visual axis tracking function are provided for measuring and analyzing 3D movements of the plurality of point light sources to achieve the effect of a virtual input and simulator.

BACKGROUND OF THE INVENTION

The major characteristic of a general traditional man-machine interface such as a keyboard, a mouse, a joystick, a remote control, and a touch screen is that users must use a hand and fingers to touch the mechanical structure of a device for inputting related information including the texts, graphics and other operating instructions to the machine, so as to achieve the effect of man-machine interactions.

In the present invention, the virtual input apparatus is basically defined to use a 3D movement of hand as an inputting method to achieve the effect of inputting information including texts, graphics, and operating instructions. In other words, the 3D hand's movement is used as a man-machine interactive interface.

With reference to FIG. 1 for the schematic view of a virtual reality (VR) glove, the VR glove 1 is a typical device of 3D hand's movement recognition. In order to detect fine movements of fingers of a hand, a general VR glove usually installs a strain gage sensor or a flex sensor (not shown in the figure) at the positions of fingers 2 to measure the physical quantity of bent fingers. In order to pursue the effect of force feedback, the VR glove usually adopts various micro actuators (not shown in the figure). Finally, the VR glove installs a positioning device 3 for measuring the 3D coordinates and orientation of a single position of the glove. Refer to the following related patents for details.
U.S. Pat. No. 4,414,537 (Gray J. Grimes, 1983)
U.S. Pat. No. 5,047,952 (James P. Kramer, 1991)
U.S. Pat. No. 4,988,981 (Tomas G. Zimmerman, 1991)

Although the VR glove has achieved the man-machine communications effect, the structure and control of the VR glove are still too complicated and not applicable to the personal computers, game players, PDAs, mobile phones, and home video equipments that require simple interface operations. Furthermore, the manufacturing cost is relatively high and not affordable by general users, and thus the VR glove is not popular in the consumer market. As to the technology, the positioning device used in the VR glove is nothing more than an electromagnetic or ultrasonic device to avoid interference from the hand's movements, but such position device has drawbacks such as a low response speed that causes an obvious latency in practical operations and a low resistibility of environmental interference. Refer to the following research reports for the details.

Christine Youngblut, etc., Review of Virtual Environment Interface Technology, Chapter 3 and 5, INSTITUTE FOR DEFENSE ANALYSES, 1996

For any virtual input apparatus, a positioning sensor for rapidly recognizing the movements of multiple points on a hand is the primary condition for achieving the virtual input effect. Based on the aforementioned reason, the positioning sensor must have the following characteristics to achieve the practical and popular purpose.

1. The positioning sensor must be able to provide physical quantities (including space coordinates, displacement, velocity and acceleration) of the 3D movements of multiple points of a hand.

2. The positioning sensor must be able to detect a large spatial volume, such that users are allowed to move their hands freely in a relative large space.

3. The positioning sensor must have a visual point tracking capability for automatically tracking the operating position of a user and providing a larger space of operation.

4. The positioning sensor must have a capability of high spatial resolution. The smallest sensible displacement must be up to the order of millimeters in a space where users move their hands.

5. The positioning sensor must have a capability of quick response. The shortest responsible time for detecting the physical quantity of 3D movements of the users' hands must be up to the order of milliseconds in the time frame.

6. The manufacturing cost of the positioning sensor must be as low as a regular computer peripheral.

Based on the foregoing required conditions, the degree of performance achieved by the prior arts is examined. In the past, the technologies capable of measuring the physical quantity of a single-point 3D movement include static electric field, static magnetic field, ultrasonic wave, electromagnetic wave, and trigonometric methods as disclosed in the following related patents:
Static Electric Field Method: U.S. Pat. No. 6,025,726 (Neil Gershenfeld, 2000)
Static Magnetic Field Method: U.S. Pat. No. 4,945,305 (Ernest B. Blood, 1990)
Ultrasonic Wave Method: U.S. Pat. No. 5,214,615 (Will Bauer, 1993)
Electromagnetic Wave Method: U.S. Pat. No. 4,613,866 (Ernest B. Blood, 1986) and U.S. Pat. No. 5,739,812 (Takayasu Mochizuki, 1998)
Trigonometric Method—Image Processing (2D Camera): U.S. Pat. No. 4,928,175 (Henrik Haggren, 1990) and U.S. Pat. No. 6,810,142 (Nobuo Kochi, 2004)
Trigonometric Method—2D Optical Method: U.S. Pat. No. 5,319,387 (Kouhei Yoshikawa, 1994)

The aforementioned technologies more or less cannot satisfy the requirements of a high spatial resolution, a high-speed response, a large detectable volume and a low manufacturing cost, and such technologies are not the subjects for discussion in the present invention. The technology explored by the present invention is the positioning technology based on 1D optics. Unlike the aforementioned technologies, the 1D optical positioning technology can satisfy all requirements of high spatial resolution, a high-speed response, a large detectable volume and a low manufacturing cost. Issued patents of the related 1D optical positioning technology are listed as follows:
U.S. Pat. No. 3,084,261 (Donald K. Wilson, 1963)
U.S. Pat. No. 4,092,072 (Stafford Malcolm Ellis, 1978)
U.S. Pat. No. 4,193,689 (Jean-Claude Reymond, 1980)
U.S. Pat. No. 4,209,254 (Jean-Claude Reymond, 1980)
U.S. Pat. No. 4,419,012 (Michael D. Stephenson, 1983)
U.S. Pat. No. 4,973,156 (Andrew Dainis, 1990)
U.S. Pat. No. 5,198,877 (Waldean A. Schuiz, 1993)
U.S. Pat. No. 5,640,241 (Yasuji Ogawa, 1997)
U.S. Pat. No. 5,642,164 (Yasuji Ogawa, 1997)
U.S. Pat. No. 5,907,395 (Waldean A. Schuiz, 1999)
U.S. Pat. No. 5,920,395 (Waldean A. Schuiz, 1999)

U.S. Pat. No. 6,584,339 B2 (Robert L. Galloway, 2003)
U.S. Pat. No. 6,587,809 B2 (Dennis Majoe, 2003)
U.S. Pat. No. 6,801,637 B2 (Nestor Voronka, 2004)
U.S. Pat. No. 7,072,707 B2 (Robert L. Galloway, 2006)

The positioning technology based on the 1D optics was first disclosed in U.S. Pat. No. 3,084,261 (Donald K. Wilson, 1963). Wilson used two perpendicular 1D cylindrical lenses (or simply referred to as 1D lenses), two triangular and two square silicon photovoltaic cells to achieve the effects of measuring the azimuth and elevation of the sun and automatically tracking the movement of the sun. In 1978, Ellis uses a V-shaped aperture and a linear array of light sensitive elements to achieve the same effect of angular measurement.

In 1980, Reymond first proposed the 3D coordinates positioning technology based on the 1D optics and the major features of the technology are given below:

1. Assembly of Optical System

The optical system comprises three linear positioning sensors composed of a 1D lens, a filter, a linear array of photosensitive elements, and a linear array of photosensitive element signal read circuits, and a method of spatial coordinate calculation. In the spatial arrangement of three linear positioning sensors, the long axes of the linear array of photosensitive elements are disposed at a common plane, and the direction of the long axes of the first and second linear arrays of photosensitive elements are parallel, but the direction of the long axes of the first (second) linear positioning sensor is perpendicular to the direction of the long axes of the third linear positioning sensor.

Theory of Computing 3D Coordinates

The theory of computing 3D coordinates is provided under a condition of the aforementioned common plane. In this method, the positions of a measured point light source, central axis of 1D lens, and image positions of three linear sensor arrays constitute three geometric planes, and the intersection point of three planes can be used for obtaining the coordinates of the point light source.

3. Multi-Point Positioning Effect

The lighting of multiple point light sources is switched alternately and periodically, such that each point light sources will emit light at different time to prevent the image overlapped phenomenon and obtain the correct image corresponding relation among three linear positioning sensors (hereinafter, this technology is referred to as time modulation method for simplicity), so as to achieve the positioning purpose of three point light sources.

4. Signal Process of Measured Data

In the signal reading circuit of a linear sensor array, a threshold comparison circuit is installed to remove unnecessary background light.

In addition, the Reymond's patent also mentioned possible extension of the technology (but not discussed and claimed in the patent) as follows:

5. Extension of Measuring More Points

As to the position measurement of more points, the number of linear positioning sensors can be increased to achieve the positioning purpose of more points.

6. Extension of Spatial Arrangement

As to the arranged positions of the linear sensor arrays, it is not necessary to arrange the linear sensors in a common plane.

For the aforementioned two extensions, Reymond has not taught any theoretical calculation for obtaining the space coordinates of the testing points.

As to the positioning of a 3D point, Reymond's patent fully discloses the principle, architecture and basic technology of the 1D optical positioning system. Later patents, from the patent disclosed by Stephenson in 1983 to the one disclosed by Galloway in 2006, generally continued using Reymond's principle and architecture and their applications remained in the measuring area without special breakthroughs as described below.

U.S. Pat. No. 4,419,012 (Michael D. Stephenson, 1983)

Basically, this patent is an improvement of a portion of Reymond's patent, and the Stephenson's patent is characterized in the improvement of a synchronization method. In other words, Reymond adopted a wire method to achieve the synchronous purpose between the lighting timing of point light sources and the scanning timing of the linear sensor array. Stephenson adopted a pin diode to monitor the lighting timing of each point light source, so as to synchronously start the scanning timing of the linear sensor array, and thus Stephenson uses a wireless method to achieve the effect of synchronization.

U.S. Pat. No. 4,973,156 (Andrew Dainis, 1990)

Dainis' patent almost adopted the whole concept of Reymond's patent. Although Dainis disclosed a common plane with an angle of 120° for the spatial arrangement of three linear positioning sensors and a common plane with an angle of 45° for the spatial arrangement of four linear positioning sensors, Dainis did not give the detailed theoretical calculation for these two spatial arrangements. In addition, although a simultaneous illumination of multiple points has been mentioned, the physical implementation and method are not taught. Further, as to the image overlapped phenomenon (as disclosed in R.O.C. Pat. Application No.: 096113579), no discussion in this regard has been found.

U.S. Pat. No. 5,198,877 (Waldean A. Schuiz, 1993)

Basically, Schuiz's patent is an application of Reymond's patent, which uses a hand-held 1D laser scanner which scans and projects a linear laser light spots onto a surface of the testing object, and two sets of linear positioning sensors are used for obtaining the relative coordinates of the laser light spots reflected by the testing object, and then three sets of Reymond's linear positioning sensors are used to measure three pilot light emitters installed on the laser scanner, and finally the absolute coordinates of the laser light spots reflected by the testing object can be calculated. Regarding the lighting of multiple point light sources, Schuiz adopts Reymond's method without any innovation. As to the lighting of three pilot light emitters, although Schuiz has mentioned, but not claimed, the way of using a light source with a different wavelength (or different color) and a light source with a different frequency modulation, physical implementations have not been taught.

U.S. Pat. No. 5,640,241 (Yasuji Ogawa, 1997)
U.S. Pat. No. 5,642,164 (Yasuji Ogawa, 1997)

Basically, Ogawa's two patents, which are improvements of a portion of Reymond's patent, have the major characteristic of using a 2D photosensitive array and a combined type 1D lens with the advantage of a reduced simple mechanism, but cannot improve the spatial resolution of any measurement (Note: the resolution does not rely on the use of 1D or 2D photosensitive array, but relies on the size of single pixel on the photosensitive array, the optimization of the point light source, and the setting of other optical parameters), and cannot improve the sampling rate (Note: the use of 2D photosensitive arrays only reduces the sampling rate), and cannot lower the manufacturing cost (Note: the combined type 1D lens incurs a high manufacturing cost), and have no description about the signal processing of the measured data and the deal with a plurality of points.

U.S. Pat. No. 5,907,395 (Waldean A. Schuiz, 1999)
U.S. Pat. No. 5,920,395 (Waldean A. Schuiz, 1999)

Basically, these two patents are applications of Reymond's patent and a supplement for a small portion of Reymond's patent. The supplement resides in the improvement of the point light source. In other words, a spherical or planar diffuser is used for obtaining a point light source with a larger diffusion angle. As to the processing of background light, a software method is used, wherein a signal of the background light is recorded into a memory, and the background light is subtracted from a measured signal in an actual measurement to obtain the original signal. As to the method of lighting up the plurality of point light sources, Reymond's method is adopted without further innovation.

U.S. Pat. No. 6,584,339 B2 (Robert L. Galloway, 2003)

U.S. Pat. No. 6,801,637 B2 (Nestor Voronka, 2004)

U.S. Pat. No. 7,072,707 B2 (Robert L. Galloway, 2006)

Basically, the aforementioned three patents are applications of Reymond's patent, which have no innovation on the positioning technology.

In summary of the aforementioned patents, we can draw the following conclusions:

(1) Theoretical Calculation

As to the theoretical calculation of the 3D coordinates of the point light source, no new theory is provided other than the simple theoretical calculation provided by Reymond's patent. In the academic field, the following related theses were published: Yasuo Yamashita, Three-dimensional Stereometric Measurement System Using Optical Scanners, Cylindrical Lenses, & Line Sensors, SPIE 361, August 1982.

The theory described by Yamashita is applicable only if the direction of a long axis of the linear sensor array is arranged on a common plane, and the optical axis of the 1D lens optical axis is arranged on a common plane. Yamashita's theory is not a general theory of 3D positioning. A general theoretical calculation developed for the linear positioning sensors with the arbitrary arranged position and orientation has been disclosed by the following patents:

R.O.C. Pat. Application No.: 096108692

R.O.C. Pat. Application No.: 096113579

R.O.C. Pat. Application No.: 096116210

(2) Technology

The prior arts disclosed in the foregoing patents cannot break through the patent claims of the Reymond (1980). Particularly for the image overlapped phenomenon, no improvement or innovation was made after the Stephenson's patent (1983).

(3) Application

All foregoing patents are applied for the 3D position measurement, but none of the foregoing patents has disclosed the application of a virtual input. R.O.C. Pat. Application No.: 096116210 has disclosed the use of the 1D optical positioning technology for the application of virtual input, and this patent first disclosed a 3D mouse which uses gestures to achieve the purpose of man-machine interface.

SUMMARY OF THE INVENTION

Therefore, it is a primary objective of the present invention to overcome the shortcomings of the prior art by providing a three-dimensional virtual input and simulation apparatus. The features and advantages of the present invention will become apparent from the following detailed description taken with the accompanying drawing.

BRIEF DESCRIPTION OF THE DRAWINGS

FIGS. 3(f)~3(i) show the schematic view of the geometric modulation method;

FIG. 5(a) to FIG. 5(c) show the schematic view of the currently popular image sensing art;

FIG. 5(f) shows the schematic view of a 1D three color optical sensor array;

FIGS. 5(g) and 5(h) show the arrangement of RGB color filters in a 2D color CCD or CMOS optical sensors array;

FIG. 8(a) shows the schematic view of the maximum viewing angle of a 1D optical positioning system;

FIG. 8(d) shows the schematic view of a visual axis tracking method;

FIG. 9(c) shows the schematic view of a remote control simulated input method;

FIG. 9(d) shows the schematic view of a touch screen simulated input method;

FIG. 9(e) shows the schematic view of a keyboard simulated input method;

FIGS. 11(e)~11(n) show the objects for installing the point light sources;

FIG. 12(a) shows the schematic view of a single 1D optical positioning device with visual axis tracking function;

FIG. 12(b) shows a virtual coordinate system set in a 1D optical positioning device;

FIGS. 12(e)~12(i) show the geometric structural relation of the 1D optical positioning device fixation mechanism, the linear positioning sensor fixation mechanism and the pilot point light sources;

DESCRIPTION OF THE PREFERRED EMBODIMENT

Figure 1:
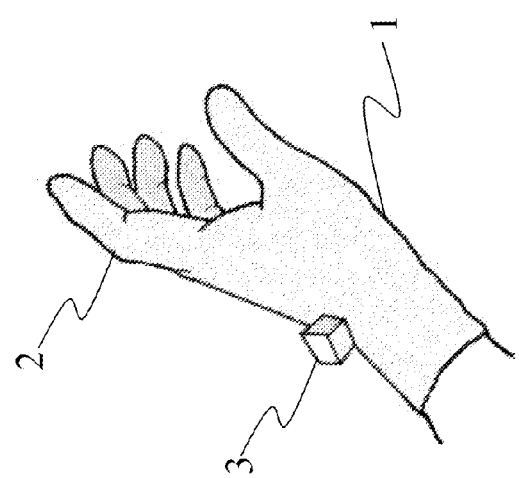
FIG. 1 shows the schematic view of a virtual reality (VR) glove.
Figure 2:
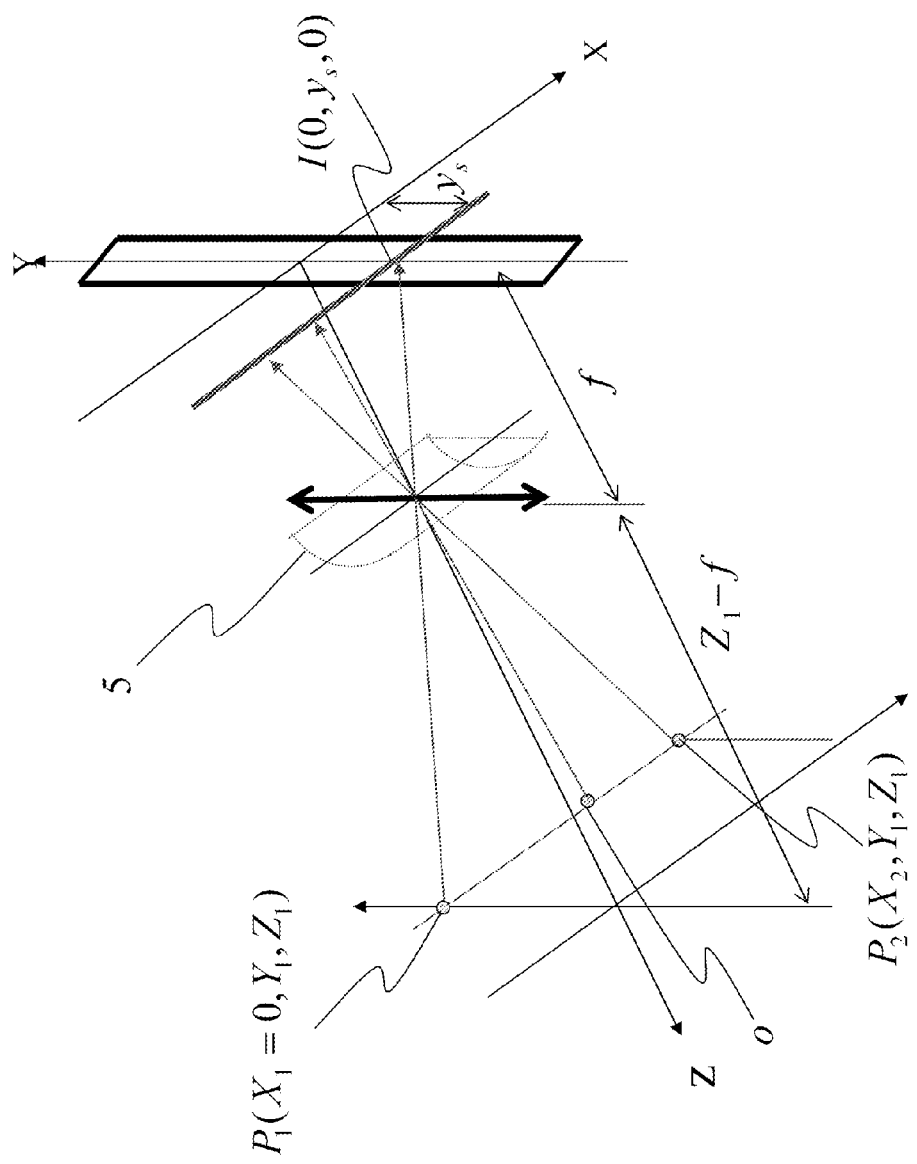
FIG. 2 shows the schematic view of the image overlapped phenomenon of a 1D optical system.

To overcome the shortcomings of the prior art, the present invention provides following innovations and improvements.
1. Process of Unique Characteristics of Point Light Sources
2. Process of Background Light Interference
3. Process of Measurement Data
4. Extension of System Configurations
5. Extension of System Applications Finally a detailed description of preferred embodiments is provided.
1. Process of Unique Characteristics of Point Light Sources The advantage of the 1D optical system resides in its quick reading of an image point position (due to the use of the linear optical sensor array), but the disadvantage resides in its easily produced image overlapped phenomenon. With reference to FIG. 2 for the schematic view of the image overlapped phenomenon of a 1D optical system, the focusing direction of a 1D lens 5 with a focal length f is parallel to the y-axis (wherein the short line with a double-arrowed head in the figure indicates the 1D lens, and the direction of the arrowhead indicates the focusing direction), and the direction of a long axis is parallel to the x-axis, and the optical axis is parallel to the Z-axis. A straight line $\overline{P_1P_2}$ perpendicular to the y-axis lies on the plane which is allocated along the optical axis Z and perpendicular to the optical axis Z, such that the image position of a point light source $o(x_1, y_1, z_1)$ at any position on the straight line $\overline{P_1P_2}$ is $I(0, y_s, 0)$, which indicates an image overlapped phenomenon, and the straight line $\overline{P_1P_2}$ is hereinafter referred to as an image overlapped line. In other words, any point light source on the straight line $\overline{P_1P_2}$ has the same image position. Therefore, if a positioning system using a 1D optical system to measure the multiple point light sources, the most concerning issue is to overcome the image overlapped phenomenon. In addition, as to multiple point light sources, because the least number of used linear optical sensor array is three in present technology, a recognition procedure must be used to find the correct corresponding relation of images among the linear optical sensor arrays rapidly and correctly, so as to achieve the right positioning measurement of a plurality of point light sources.

Letting each point light source have a unique characteristic is the basic principle of overcoming the image overlapped phenomenon and obtaining the correct image corresponding relationship. As disclosed in the foregoing U.S. patent that performs time modulation, or wavelength modulation, or frequency modulation to a plurality of point light sources, such that each point light source has a unique characteristic. The time modulation refers to a method that lights each point light source continuously and alternately. In other words, each point light source is lit at different time. Therefore, each scanning at a detecting end reads the image position of the one and only one lit point light source. The drawback of the time modulation is the positioning measurement error caused by the asynchronous problem, and the error is proportional to the velocities and number of point light sources. The wavelength modulation refers to a method that allows each point light source to have a different light emitting wavelength. The drawback of wavelength modulation is the increase of manufacturing cost and the volume of data processing. The frequency modulation refers to a method that allows a light emitting intensity of each point light source to oscillate at a different frequency. The drawback of frequency modulation is the use of demodulation technology. Unlike the aforementioned processing arrangement, R.O.C. Pat. Application No.: 096113579 also discloses a method of increasing the number of 1D positioning sensor and a method of optical axis rotation for overcoming the image overlapped phenomenon.

In the present invention, as to the gesture recognition and its applications, the following methods such as (1) intensity modulation, (2) geometric modulation, (3) improvement of Stephenson method, (4) master/client wireless synchronous method and (5) wavelength modulation provided for overcoming the image overlapped phenomenon are disclosed.

Figure 3A:
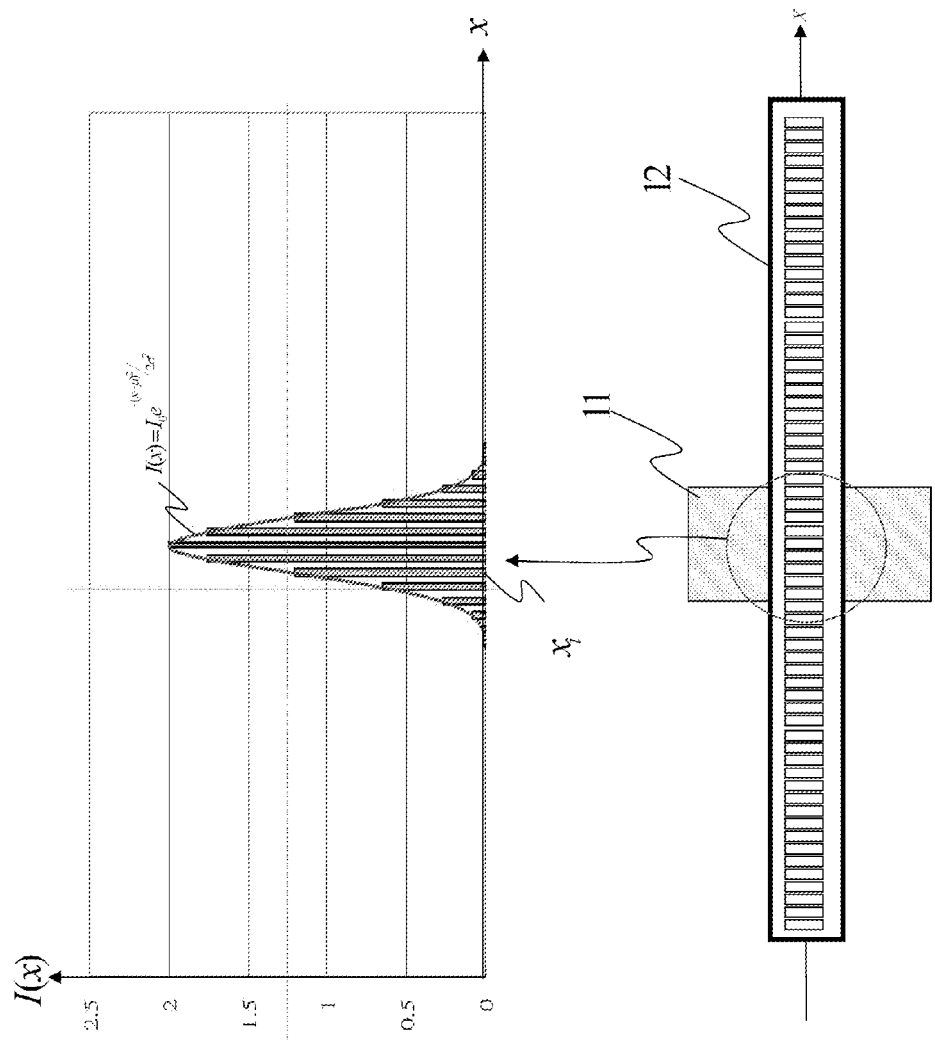
FIG. 3(a) shows the schematic view of an image of a point light source formed by a 1D optical lens.

(1) Unique Characteristics of Light Intensity and Geometric Structure of Point Light Sources With reference to FIG. 3(a) for the schematic view of the image of a point light source formed by a 1D optical lens, generally a line image 11 is obtained when the emitting light of a point light source 10 is transformed by a 1D optical lens. The line image 11 is read by a linear sensor array 12, and an image signal I(x) with an intensity which is close to a Gaussian distribution as shown below is obtained in its transversally distributed direction of the line image.

$$I(x) = I_0 e^{-\frac{(x-\mu)^2}{2\sigma^2}} \quad (1)$$

Where, $I_0$ is the central intensity, $\sigma$ is the standard deviation, and $\mu$ is the mean position. Generally, I(x) is close to zero when the position deviation of x is larger than $3\sigma$. Therefore, an effective image signal can be defined by the signal obtained at $|x-\mu|<3\sigma$. The light emitting power P of the point light source 10 can determine the central intensity $I_0$, and the magnitude r of the point light source will change the standard deviation $\sigma$. Therefore, $I_0$ and $\sigma$ of the point light source can be used as the parameters with the unique characteristic. In other words, as to a plurality of point light sources, different $I_0$ and $\sigma$ can be used to identify a plurality of point light source. The method of using $I_0$ for identifying a point light source is hereinafter referred to as an intensity modulation method, and the method of using $\sigma$ for identifying a point light source is hereinafter referred to as a geometric modulation method.

Three point light sources are used as an example for illustrating the intensity modulation method and the geometric modulation method as follows.

(1) Intensity Modulation Method

Figure 3B:
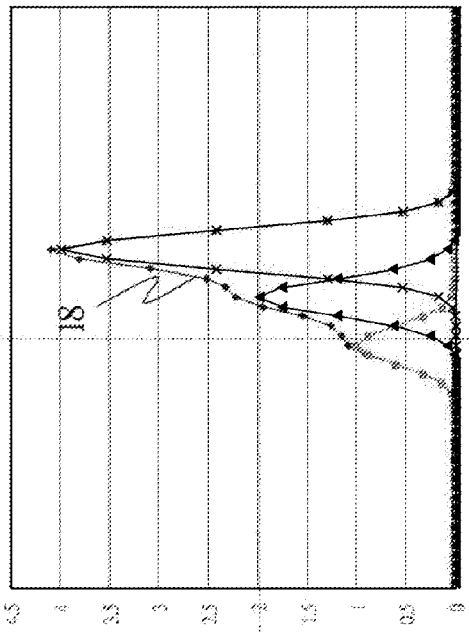
FIGS. 3(b)~3(e) show the schematic view of the intensity modulation method.
Figure 3D:
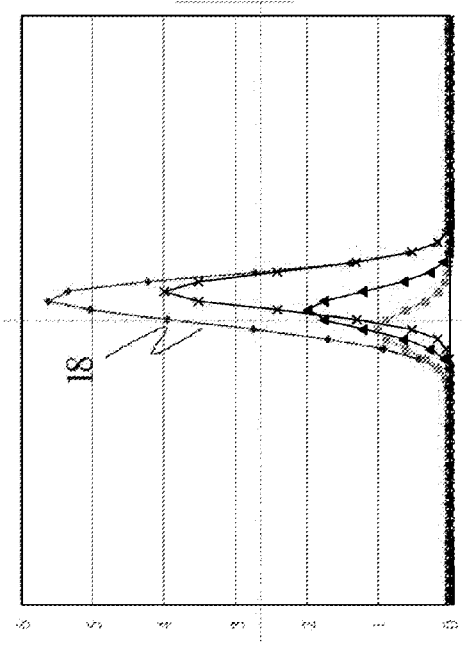
Figure 3C:
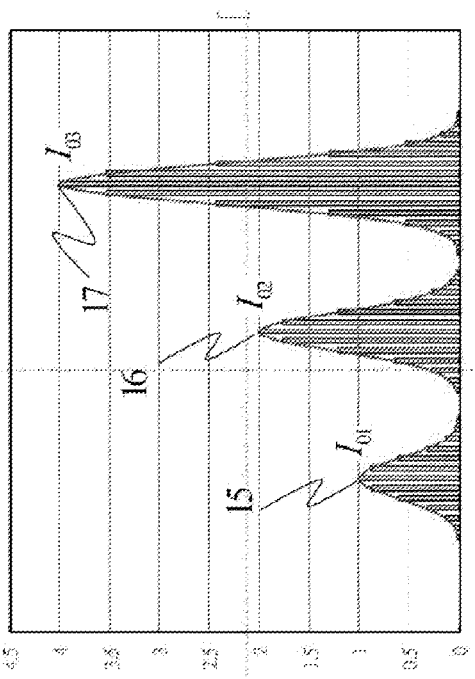
Figure 3E:
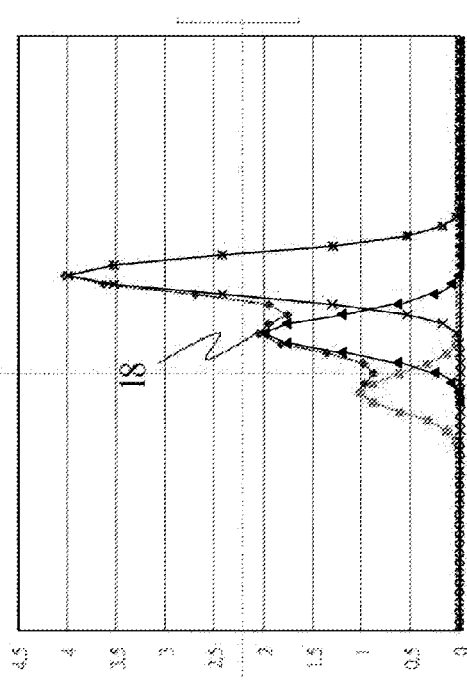

With reference to FIGS. 3(b) to 3(e) for schematic views of the intensity modulation method, FIG. 3(b) shows that, in case of no image overlapped phenomenon occurred, three point light sources with different intensities $I_{01}$, $I_{02}$, $I_{03}$ but same standard deviation $\sigma$ form the image signals 15, 16, 17 on the linear sensor array respectively. According to the unique central intensity, a threshold method or profile detection method (refer to the description below) is used to identify these image signals 15, 16, 17 easily and obtain the mean positions of each image signals. If three point light sources approach the image overlapped line as shown in FIG. 3(c), three image signals 15, 16, 17 are overlapped to form an image superposed signal 18. In this situation, the threshold method is ineffective but the profile detection method still can recognize each mean position. If three point light sources almost approach the image overlapped line as shown in FIGS. 3(d) and 3(e), the mean position no longer can be identified. In this situation, the mean position of each point light source can be treated as equivalent but the measurement error more or less is not avoidable. If let the light emitting radius r of the point light source can be very small but the emitting light still has sufficient intensity to form an image, then the standard deviation $\sigma$ of the image signals I(x) can be as small as or even smaller than the width of a signal pixel on the linear sensor array 12, such that the mentioned measurement error can be reduced and the image overlapped phenomenon is overcame.

(2) Geometric Modulation Method

With reference to FIGS. 3(f) to 3(i) for schematic views of the geometric modulation method, the image signals 15, 16, 17 on the linear sensor array formed by three point light sources with the same $I_0$ but different $\sigma_1$, $\sigma_2$, $\sigma_3$ are $I_1(x)$, $I_2(x)$, $I_3(x)$ respectively, and the image superposed signal 18 is I(x) as listed below:

$$I_1(x) = I_0 e^{-\frac{(x-\mu_1)^2}{2\sigma_1^2}} \quad (2)$$

$$I_2(x) = I_0 e^{-\frac{(x-\mu_2)^2}{2\sigma_2^2}} \quad (3)$$

$$I_3(x) = I_0 e^{-\frac{(x-\mu_3)^2}{2\sigma_3^2}} \quad (4)$$

$$I(x) = I_1(x) + I_2(x) + I_3(x) \quad (5)$$

Where, $\sigma_1$, $\sigma_2$, $\sigma_3$ are known and $\sigma_3 > \sigma_2 > \sigma_1$.

Figure 3H:
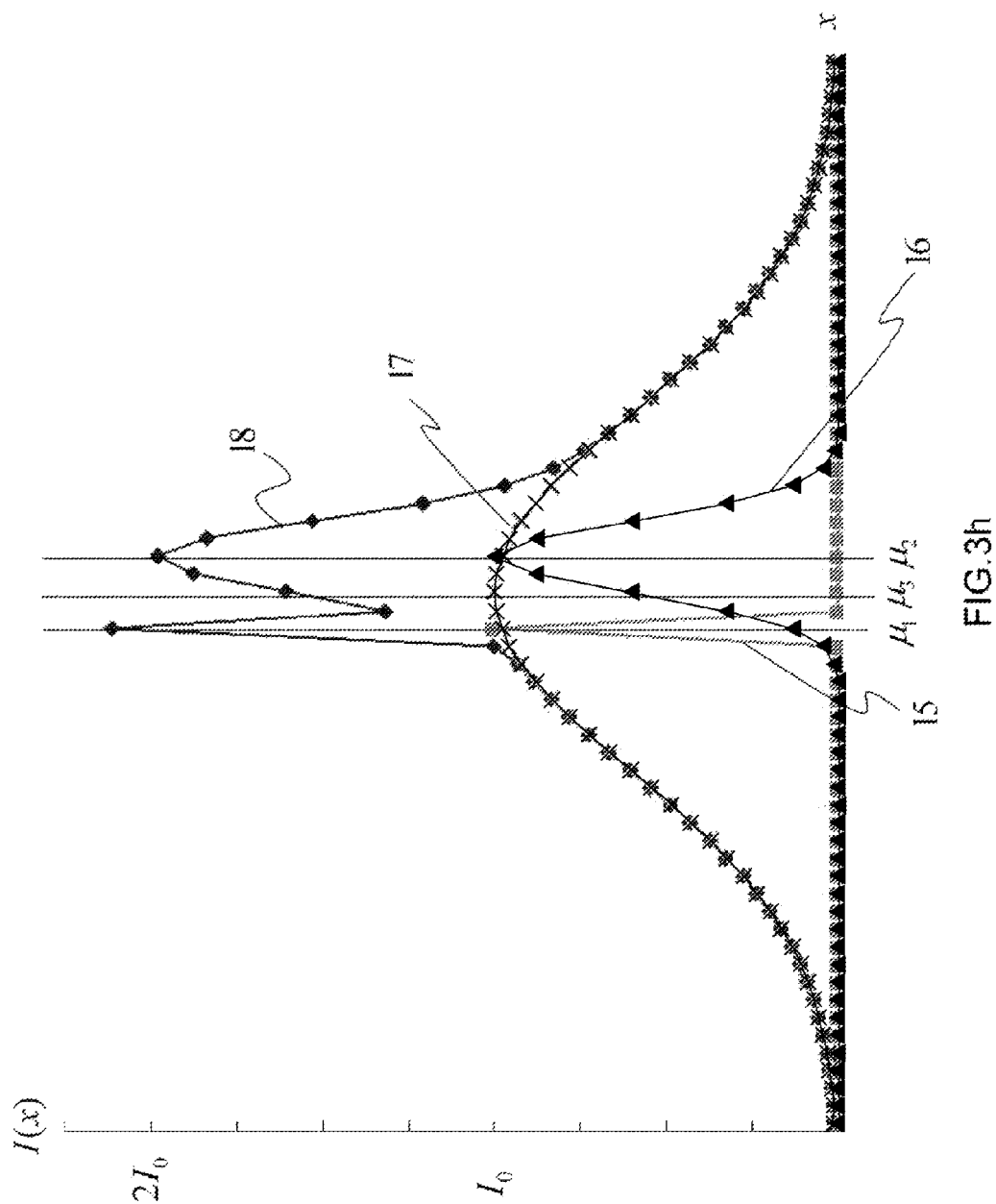
Figure 3I:
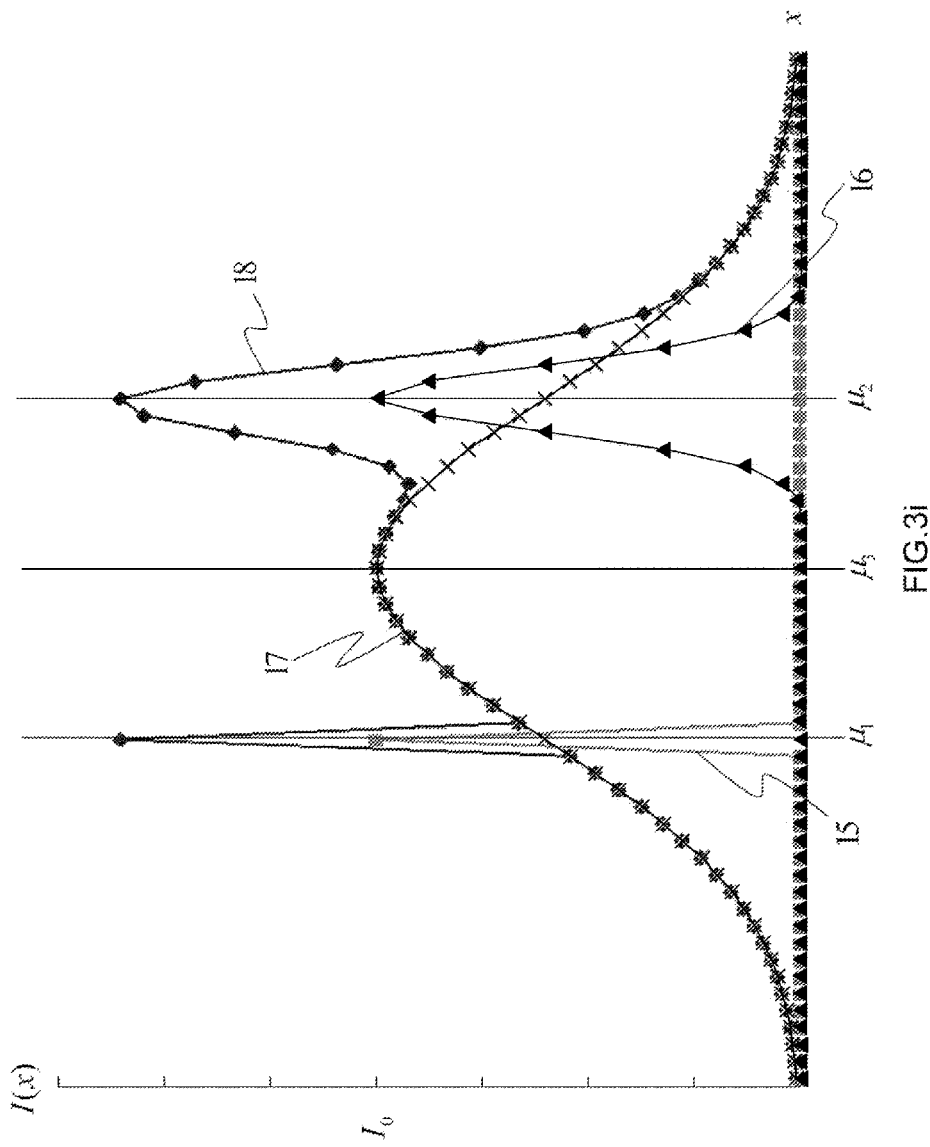

In FIG. 3(f), three point light sources are all aligned on the image overlapped line at the same time, such that the image signals are completely overlapped. In FIGS. 3(g) and 3(h), three point light sources are very close to the image overlapped line, such that the image signals are much intensively overlapped. In FIG. 3(i), three point light sources are close to the image overlapped line, such that the image signals are less intensively overlapped. When an image overlapped phenomenon occurs, it becomes a technical subject for the geometric modulation to solve $\mu_1$, $\mu_2$, $\mu_3$ by the measured image superposed signals 18 I(x).

Figure 3J:
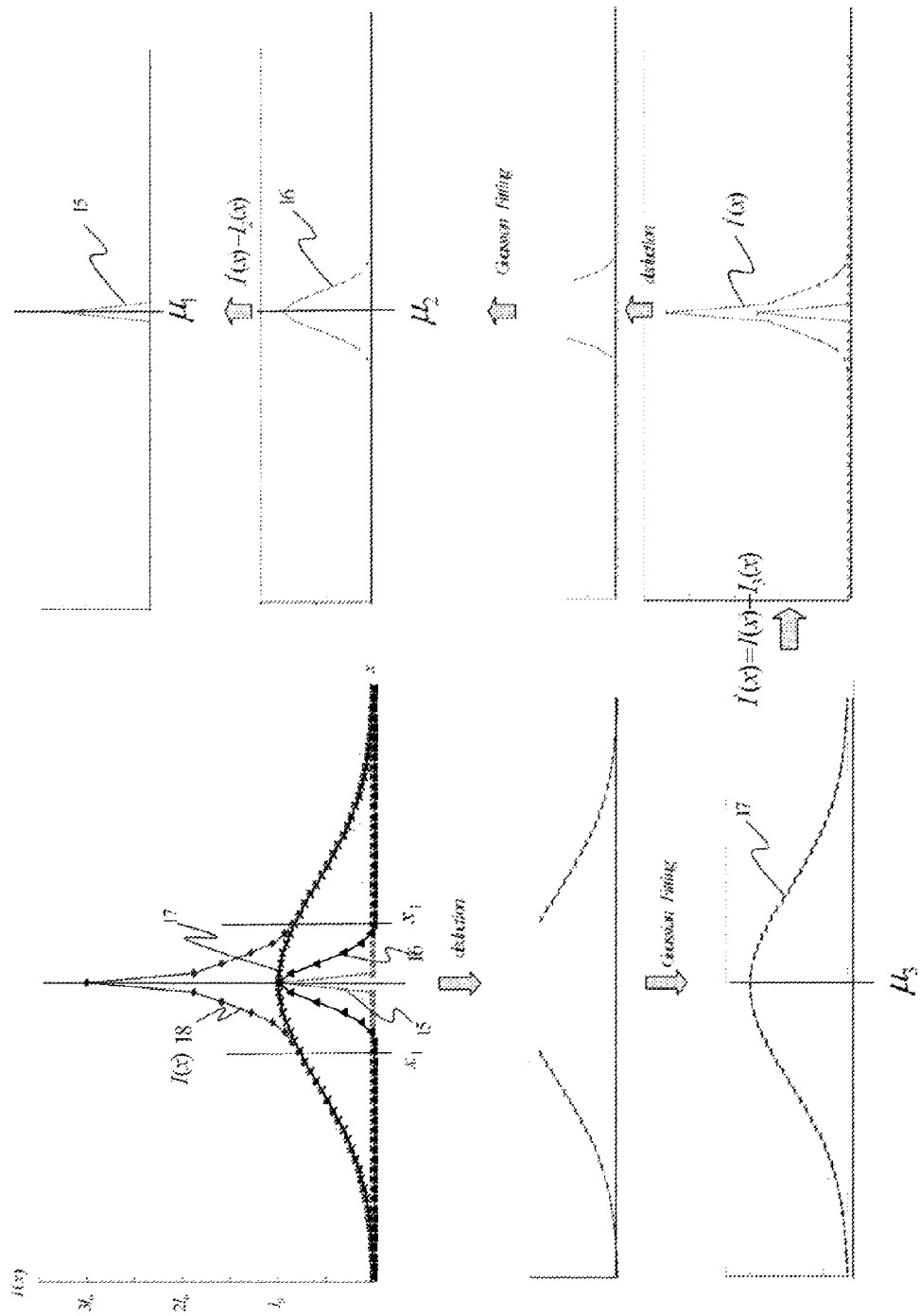
FIGS. 3(j) shows the schematic view of the deduction method and Gaussian Fitting for finding the mean position.

In FIG. 3(j), a method of deduction and a Gaussian Fitting are used to find $\mu_1$, $\mu_2$, $\mu_3$. The method of deduction refers to a method of separating each image signals in the image superposed signals 18 in a sequence from the largest point light source to the smallest point light source. In other words, a portion of $I_3(x)$ found in I(x) is transformed by Gaussian Fitting to obtain $I_3(x)$ and $\mu_3$, and then $I_3(x)$ is subtracted and separated from I(x), such that I'(x)=I(x)−$I_3(x)$ is obtained. Similarly, $I_2(x)$ is separated from I'(x) to obtain $I_1(x)$ by suing the same architecture. The advantage of the geometric modulation is that the calculation is not affected by the image overlapped phenomenon and can obtain the mean position $\mu$ of each image signals formed by all point light sources. The drawback of the geometric modulation is that it requires more mathematical calculations, and the size of each point light source must be divided clearly.

Improvement of Time Modulation Method

Figure 4A:
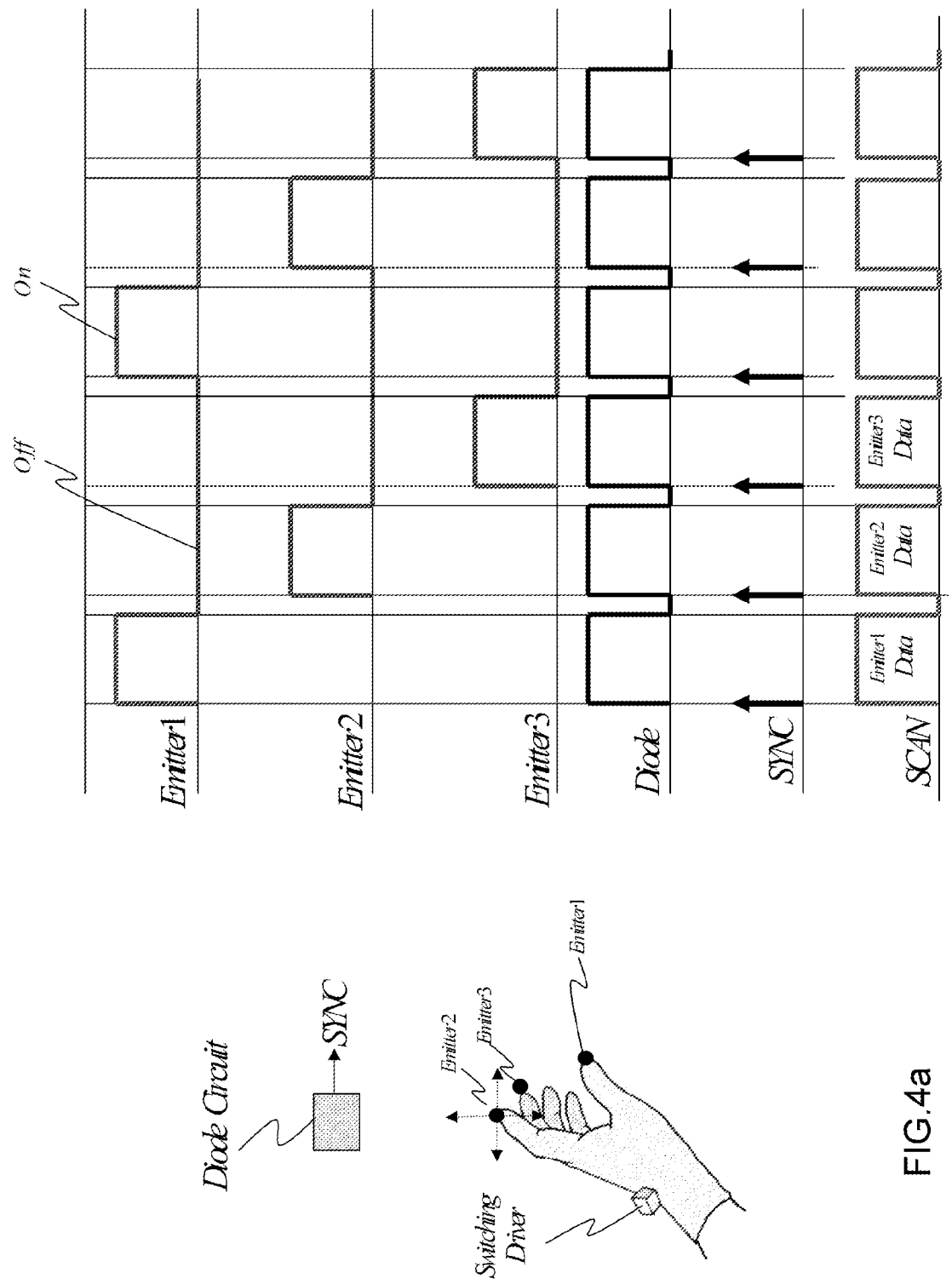
FIG. 4(a) shows the synchronous timing of Stephenson's time modulation method.

As described in Stephenson's patent, Stephenson used a diode to monitor the lighting timing of a plurality of point light sources, so as to achieve the purpose of synchronously scanning the linear sensor array and improve the Reymond wire method. The lighting timing of each signal is shown in FIG. 4(a), which illustrates Stephenson's time modulation method. FIG. 4(a) shows the synchronous timing between the lighting of a plurality of point light sources and the scanning and reading of the linear sensor array. Emitters 1 to 3 (which are point light sources) are lit by a fixed cycle continuously and alternately. After the diode receives these optical signals, a synchronous signal SYNC is generated to synchronously drive all linear sensor arrays to start scanning.

Figure 4B:
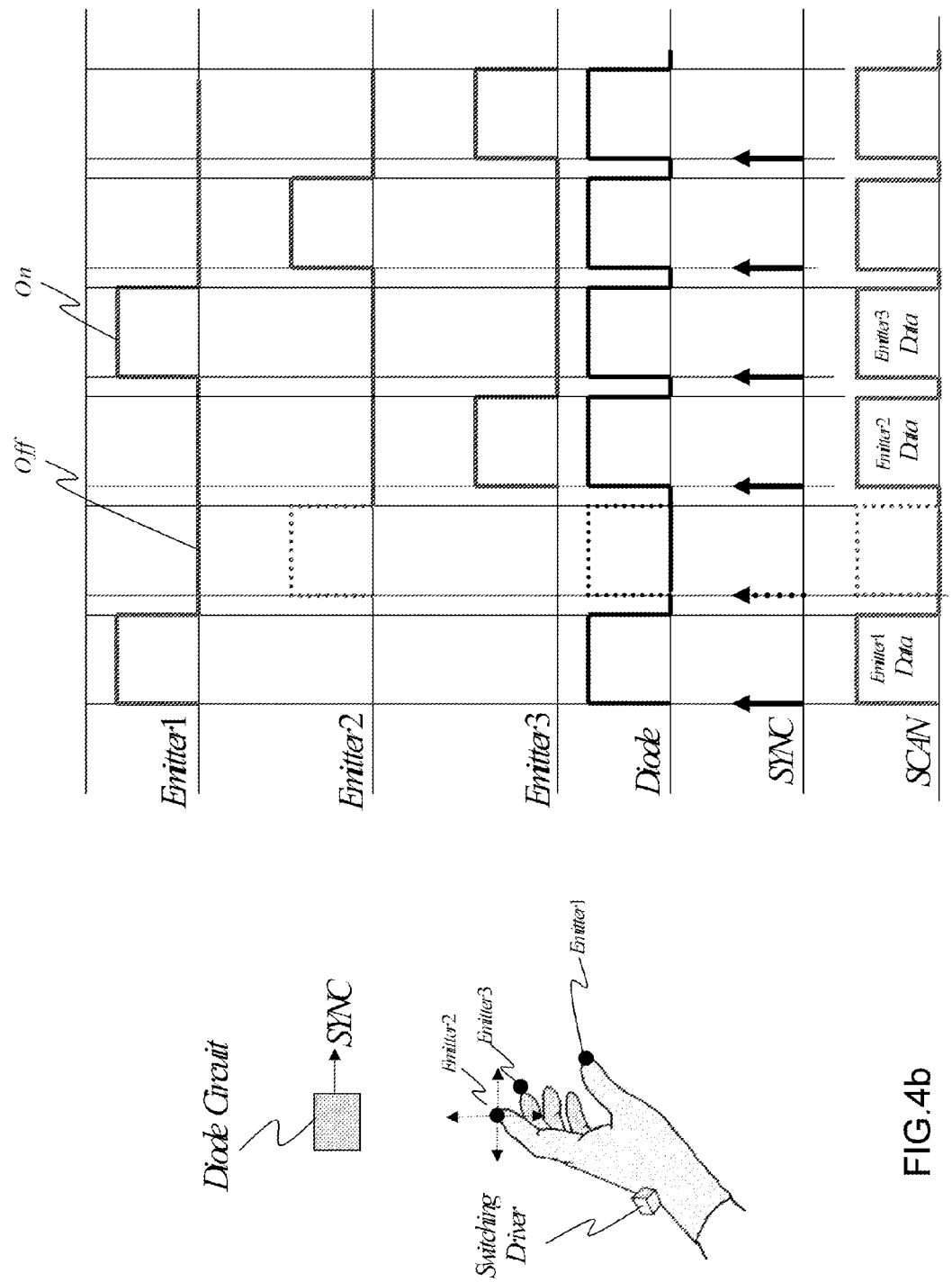
FIG. 4(b) shows the asynchronous problem of Stephenson's time modulation method.

FIG. 4(b) shows the sheltery problem occurred in the actual gesture operation when the point light sources are installed onto a hand or fingers. Due to the free movement of the hand or fingers, one of the point light sources, for example emitter 2, may be sheltered by the hand anytime, and thus causing asynchronous problem which results in a wrong data acquisition scanned by the linear sensor array. Stephenson patent has not provided any solution to this problem. For the asynchronous problem, the present invention provides the following two methods for solving the problem.

(3) Improvement of Stephenson's Method

Figure 4C:
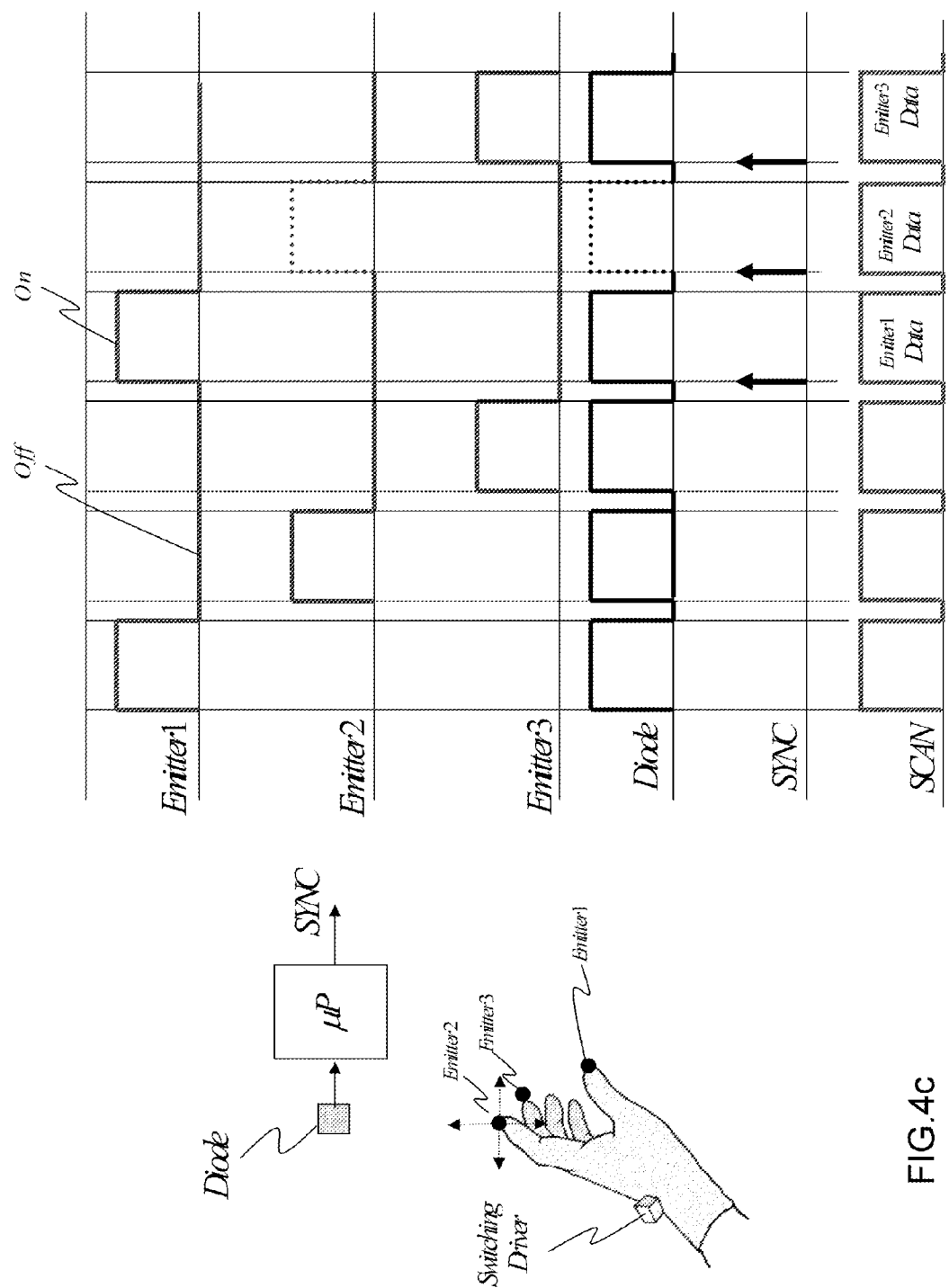
FIGS. 4(c) shows the schematic view of the improved Stephenson's time modulation method.

FIG. 4(c) shows the schematic view of the improvement of Stephenson's time modulation method. As to the light sources emitted by the Emitter1~Emitter3, a microprocessor (µP) is used to receive the signal provided by the Diode at a proper time (for instance, before the operation or at a constant time interval during the operation) and thus measure the period of continuous and alternate lighting timing of Emitter1~Emitter3, and synchronously generate a synchronous signal SYNC with the same period, so as to overcome the asynchronous problem.

(4) Master/Client Wireless Synchronization Method

Unlike the methods provided by Reymond and Stephenson, the master/client wireless synchronization method is a radio-frequency (RF) method for emitting a synchronous signal with a code from a transmitter (master), and the coded synchronous signal includes a number of a point light source to be lit and a timing signal required for the lighting of the point light source. After the receiver (client) receives the coded synchronous signal, the information in the coded synchronous signal can be decoded for a correct synchronization control to achieve the time modulation effect.

Figure 4D:
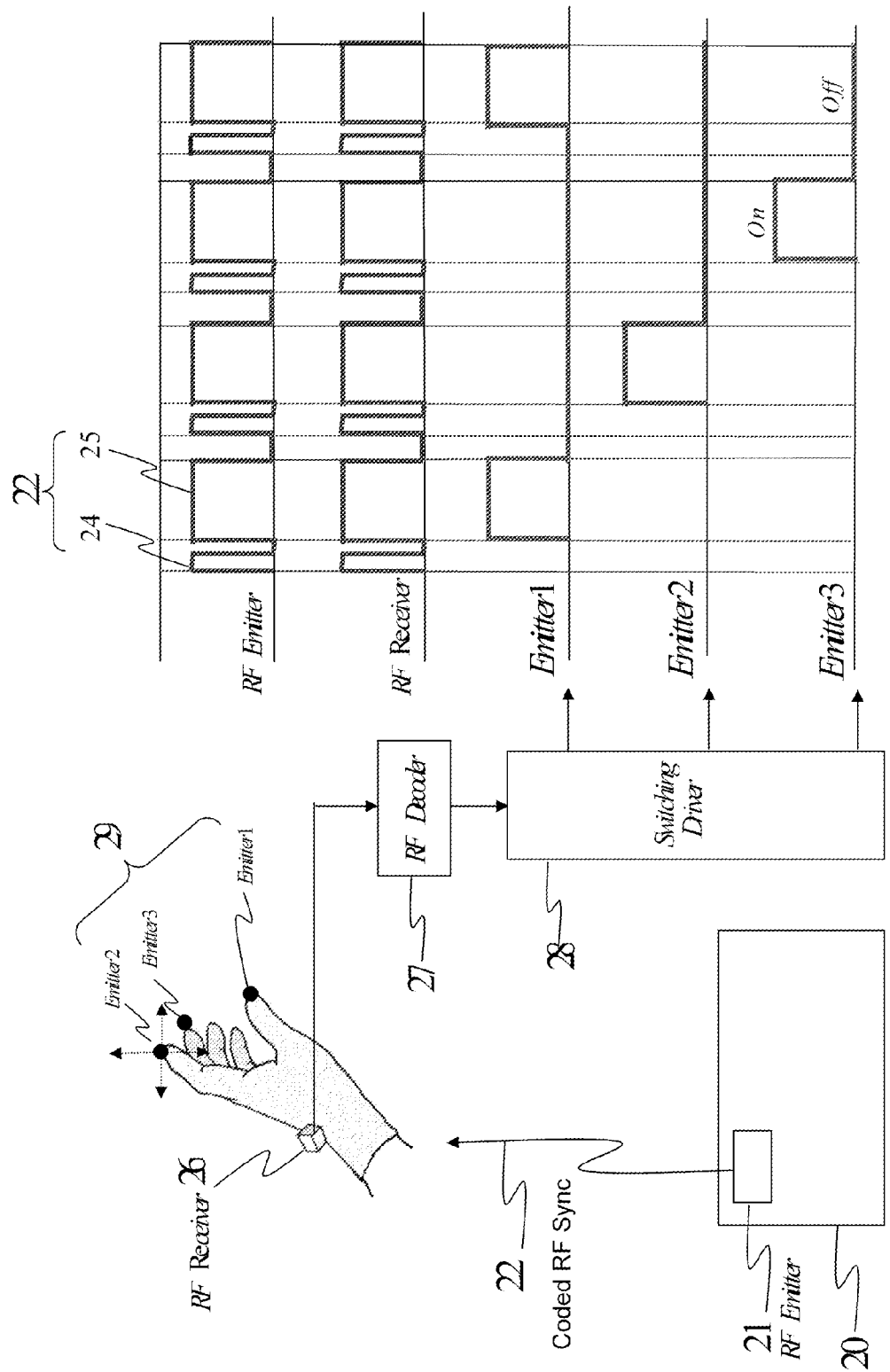
FIGS. 4(d) shows the schematic view of the Master/Client Wireless Synchronization Method.

In FIG. 4(d) shows the schematic view of the Master/Client Wireless Synchronization Method. The RF transmitter 21 installed at the site of linear positioning sensor 20 emits a coded RF synchronous signal 22. The coded synchronous signal 22 includes an encoding signal 24 and a synchronous signal 25. The encoding signal 24 represents the number of a point light source to be lit, and the synchronous signal 25 represents the timing of a point light source to be lit. The encoding signal 24 can be composed of a group of binary codes, a square wave with specific time duration, or a specific number of pulses. After the RF receiver 26 installed at a hand receives the coded RF synchronous signal 22, the coded synchronous signal 22 is outputted to a decoder 27. The decoder 27 can separate the encoding signal 24 and the synchronous signal 25, and then output the two signals to a point light source switch 28. The switch 28 will light each point light source 29 according to the number of the point light source at the correct time. Regardless of the point light source being sheltered or not, the number and timing of the lit point light source are known on the site of the linear positioning sensor 20, so as to overcome the sheltering problem of the Stephenson's patent. In addition, by using this encoding method, the point light sources 29 can be lit at any timing and in any sequence. Of course, the RF transmitter can be installed at the hand, and the RF receiver can be installed at the site of linear positioning sensor to achieve the same effect. In a general RF technology, a modulation in the transmitter is usually needed, and a demodulation in a receiver is usually required. Such arrangement is a prior art, and thus will not be discussed or described here.

Figure 4E:
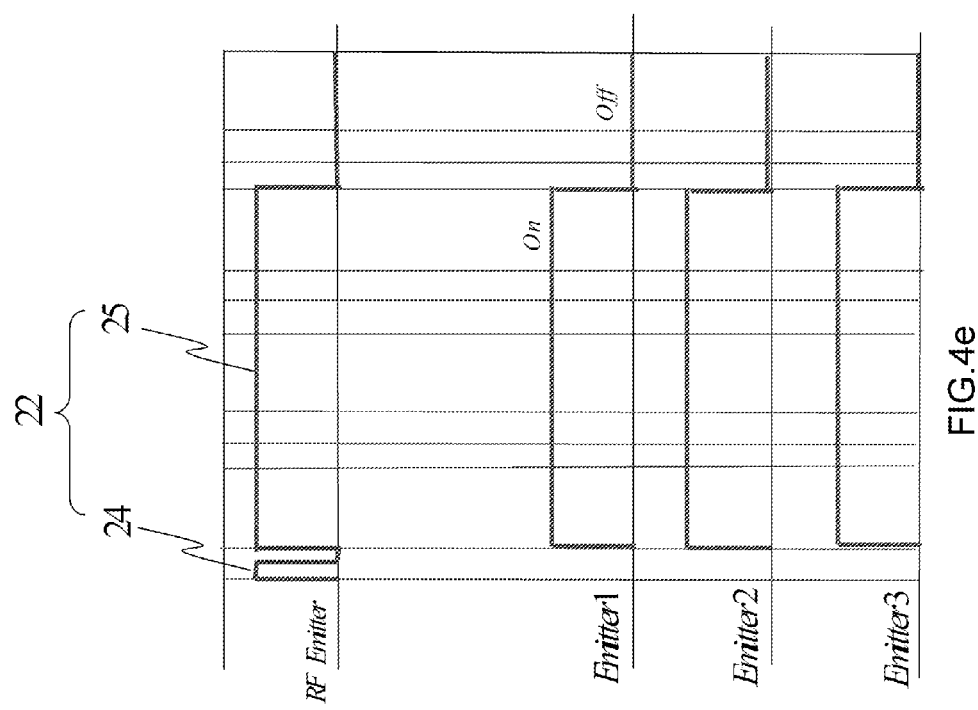
FIGS. 4(e) shows a different application of the Master/Client Wireless Synchronization Method.

In FIG. 4(e), the RF transmitter can emit another RF synchronous signal 22 with a different code, and the purpose of encoding is to light all point light sources at the same time. Therefore, the aforementioned methods of the intensity modulation, the geometric modulation and the wavelength modulation can be integrated with the master/client wireless synchronization method for increasing the variety of the unique characteristics of the point light sources, so as to achieve a better performance.

(5) Wavelength Modulation Method

As the description in Schuiz's patent, although a concept of wavelength modulation method to overcome the image overlapped phenomenon has ever motioned, no further discussion and physical implementations have been provided. FIG. 5(a) to FIG. 5(c) shows the currently popular image sensing art. FIG. 5(a) is the light emission spectrum of a general CCD or CMOS optical sensor array (refer to SONY/CCD/ILX526A). The sensible wavelength usually ranges from 400 nm to 1000 nm and the width of a single pixel ranges from few μm to few tens of μm. FIG. 5(b) shows the transmission spectrum of a RGB color filter which is installed on the surface of a CCD or CMOS optical sensor array (refer to SONY/CCD/ILX516K) and used to achieve the color imaging purpose by utilizing the optical wave filtering effect. FIG. 5(c) is the arrangement of a RGB color filter attached to the RGB pixels of a CCD or CMOS optical sensor array. By taking the advantage of current image sensing technology, a wavelength modulation method is provided to overcome the image overlapped phenomenon and described as follow.

Figure 5D:
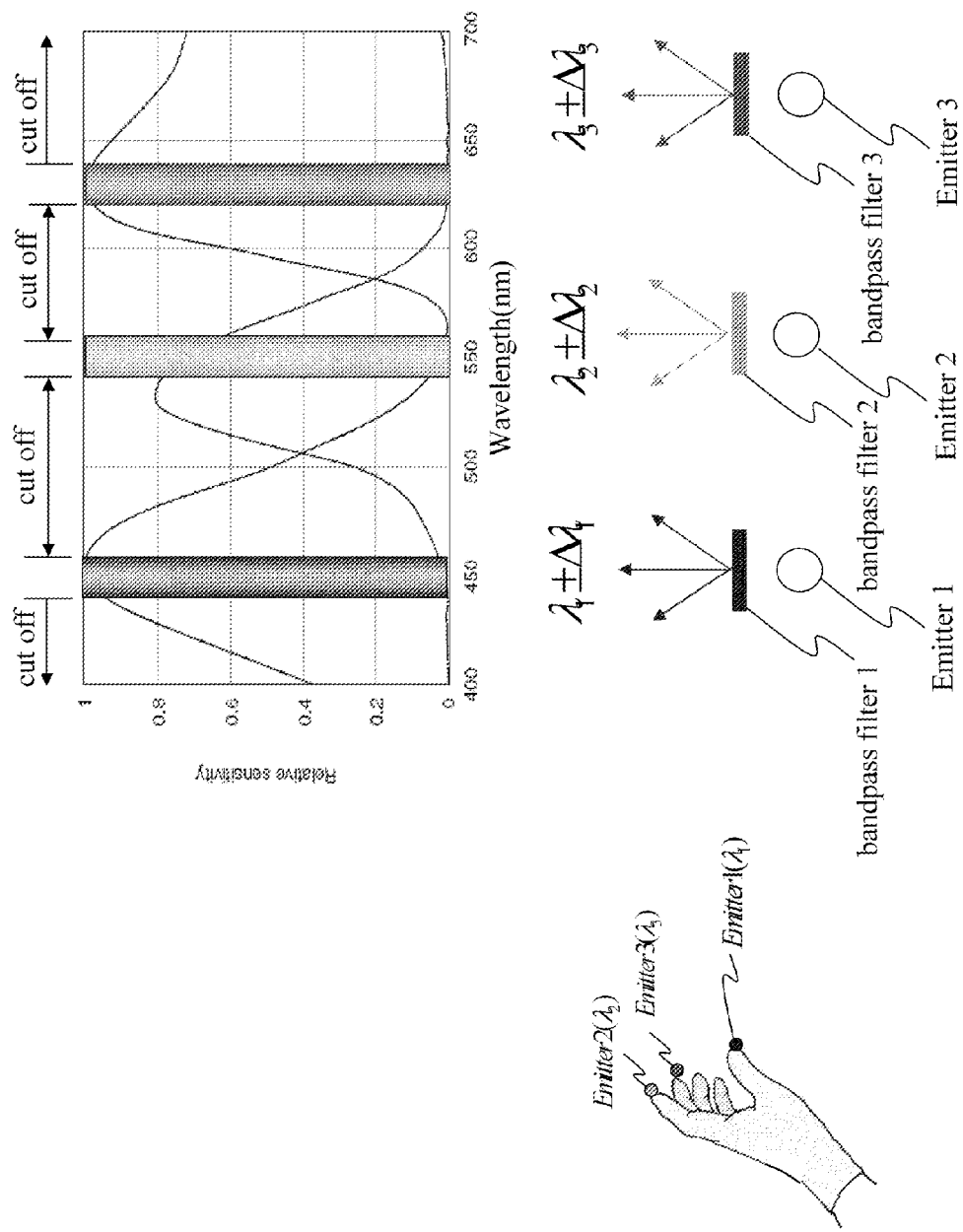
FIGS. 5(d) and 5(e) show the schematic view of the wavelength modulation method.
Figure 5E:
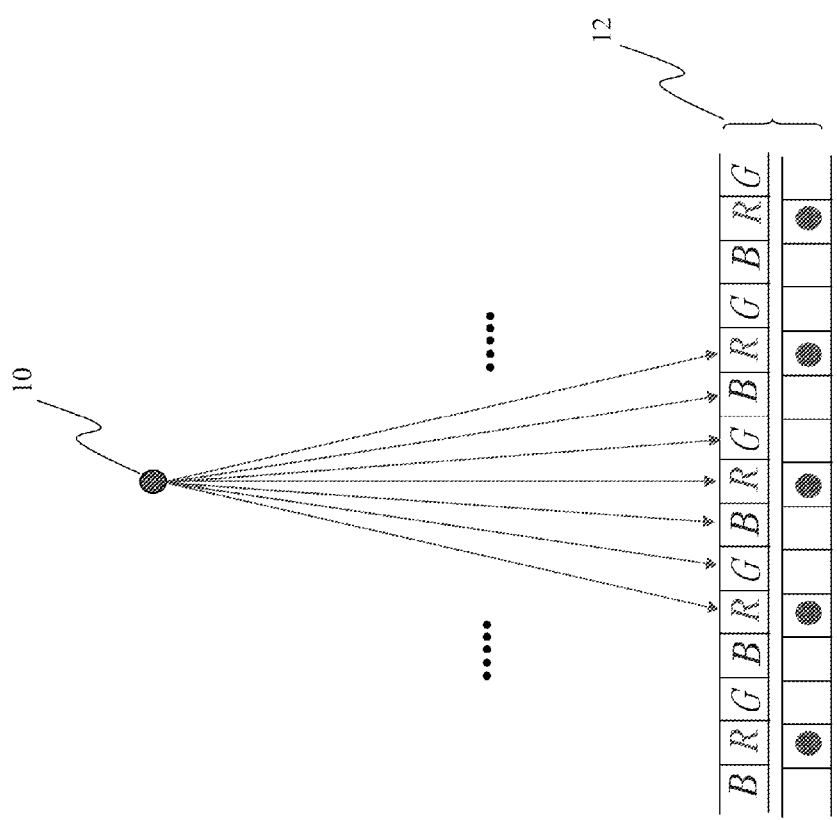

FIGS. 5(d) and 5(e) shows the schematic view of the wavelength modulation method. As to the image overlapped phenomenon caused by the multiple point light sources, the wavelength modulation method can effectively solve the overlapped problem when the number of the point light sources is limited (for example, less than four). The basic principle of this method is to use multiple point light sources for emitting light sources with different wavelengths, and use different color filters to filter and separate those multiple point light sources, and let the multiple point light sources each form an image onto a different pixel position of a 1D image sensor array or individually form an image onto different 1D image sensor arrays at the same time.

FIG. 5(d) shows the schematic view of three point light sources with different wavelengths. As to Emitter1~Emitter3 installed on a hand or fingers, Emitter1~Emitter3 can be white light LED or color LED with proper wavelength, or semiconductor laser diode. After the light sources emitted by Emitter1~Emitter3 are filtered each by a proper optical bandpass filter, three light sources having different wavelengths $\lambda_1 \pm \Delta\lambda_1$, $\lambda_2 \pm \Delta\lambda_2$ and $\lambda_3 \pm \Delta\lambda_3$ are emitted, wherein $\lambda_1$, $\lambda_2$ and $\lambda_3$ are the central wavelength of the optical bandpass filter and $2\Delta\lambda_1$, $2\Delta\lambda_2$ and $2\Delta\lambda_3$ are the FWHM (Full Width at Half Maximum). The selection of the central wavelength and FWHM is based on the transmission spectrum of the RGB color filters. As to the transmission spectrum shown in the FIG. 5(b), the central wavelength and FWHM can be set as $\lambda_1 \square 450$ nm (blue light), $\lambda_2 \square 550$ nm (green light), $\lambda_3 \square 630$ nm (red light), $2\Delta\lambda_1 \square 20$ nm, $2\Delta\lambda_2 \square 20$ nm and $2\Delta\lambda_3 \square 20$ nm. Generally, the RGB color filters are not effective for the filtering function and fail to overcome the image overlapped phenomenon if the value of $\Delta\lambda_1$、$\Delta\lambda_2$、$\Delta\lambda_3$ is too large. In addition, it is no necessary to select $\lambda_1$、$\lambda_2$、$\lambda_3$ in the visible light spectrum but in the infrared spectrum if the proper infrared light sources and infrared bandpass filters are used.

FIG. 5(e) shows the arrangement of RGB color filters on a 1D optical sensor array. As to a 1D optical sensor array 12, the RGB color filters, based on an unit of pixel, can be alternately arranged in a sequence of R-G-B. Therefore, the alternately arranged RGB color filters can separate the mentioned three point light sources with $\lambda_1 \square 450$ nm (blue light), $\lambda_2 \square 550$ nm (green light) and $\lambda_3 \square 630$ nm (red light) and individually form an image onto the R、G、B pixel (only red light used for illustrating the optical separating and image forming effect in the figure). The advantage of this method is to process three formed images at the same time by using one 1D optical sensor array only and the drawback is the measurable spatial resolution of the point light source is reduced to one third.

Figures 5F, 5G, 5H:
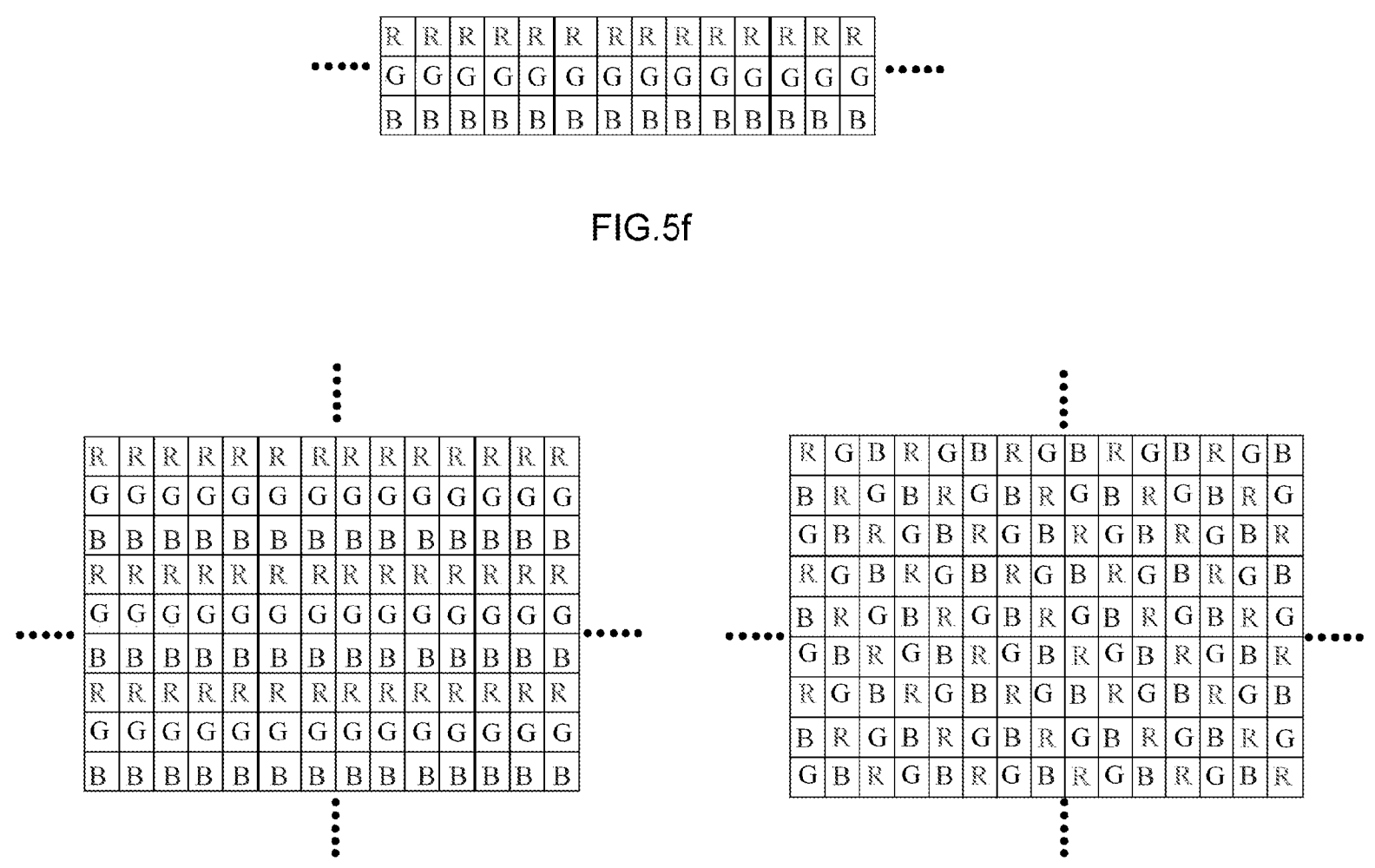

In order to improve the spatial resolution, as shown by FIG. 5(f), a 1D three color optical sensor array (refer to SONY/CCD/ILX516K) is used. As to three point light sources with $\lambda_1 \square 450$ nm (blue light), $\lambda_2 \square 550$ nm (green light) and $\lambda_3 \square 630$ nm (red light), three RGB color filters with different filtering wavelength are individually attached to three 1D optical sensor arrays, so as to achieve the purpose of wavelength modulation.

Figure 5I:
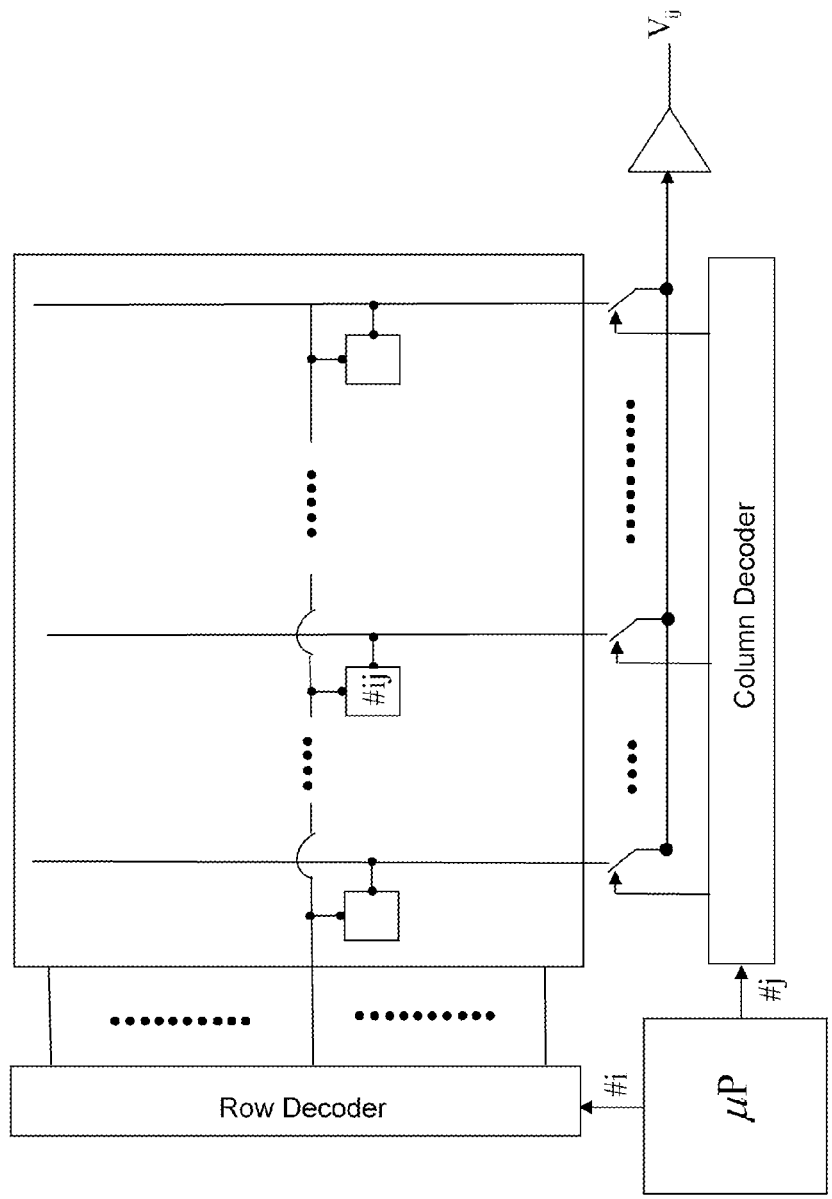
FIG. 5(i) shows the schematic view of the random access scanning process in a 2D color optical sensors array.

In addition, the currently existing 2D color CCD or CMOS optical sensors array has been produced massively and used by the digital cameras. When considering the cost, the current 2D color CCD or CMOS optical sensors array can replace the 1D CCD or CMOS optical sensors array. Taking the advantage of massive production of 2D color CCD or CMOS optical sensors array but changing the arrangement of color filters and the scanning process of image, 2D color CCD or CMOS optical sensors array can be used to achieve the purpose of wavelength modulation also. FIG. 5(g) shows the arrangement of RGB color filters in a 2D color CCD or CMOS optical sensors array. The RGB color filters, based on an unit of row, are alternately arranged in a sequence of R-G-B. FIG. 5(h) shows another arrangement of RGB color filters. In addition, a scanning process of a 2D color CCD or CMOS optical sensors array is shown by FIG. 5(i). By utilizing a microprocessor (μP), a row decoder and a column decoder, a scanning process can read any pixel #ij (that is ith row and jth column) directly to achieve the purpose of random access.

2. Process of Background Light

In the aforementioned US patents, only Reymond and Schuiz describe the process of measured data which is limited to the elimination of background light. As the description above, the process utilizes a hardware or a software method to achieve the effect of background light elimination by a process of threshold comparison. Generally, the condition required by the process of threshold comparison is that the background light must be a constant DC value which is independent of time. However, this method is ineffective if the background light vary in the space and time frame. In addition, as for the further process of measured data regarding the background light interference, there is no discussion in both Reymond's and Schuiz's patents.

Elimination of Dynamic Background Light

Figure 6A:
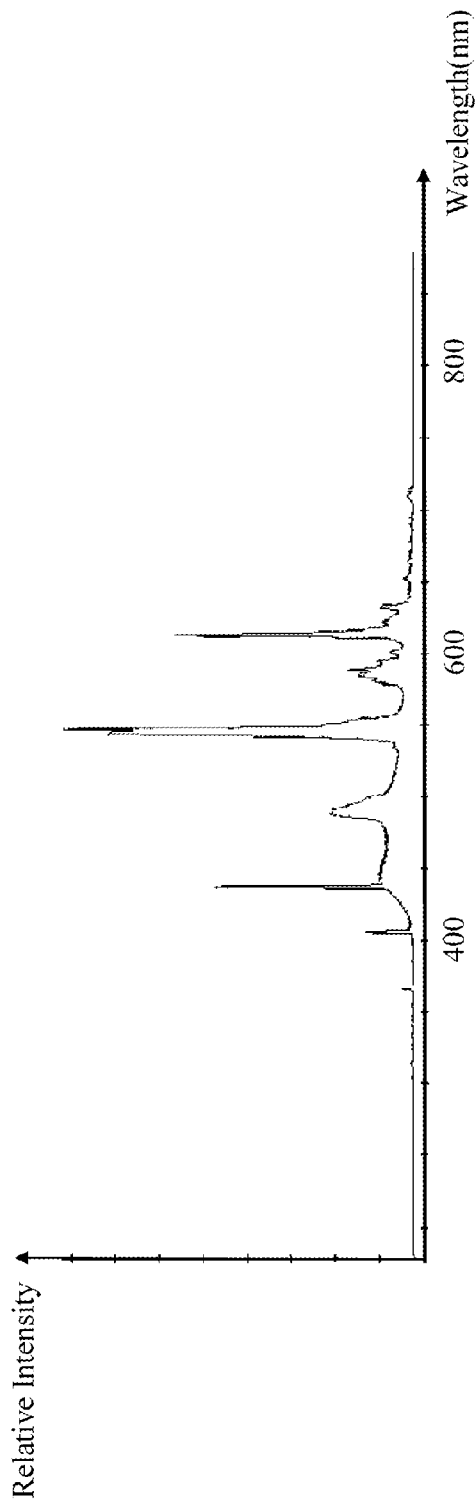
FIGS. 6(a) and 6(b) show the light emission spectrum both of fluorescent and Halogen lamp.
Figure 6B:
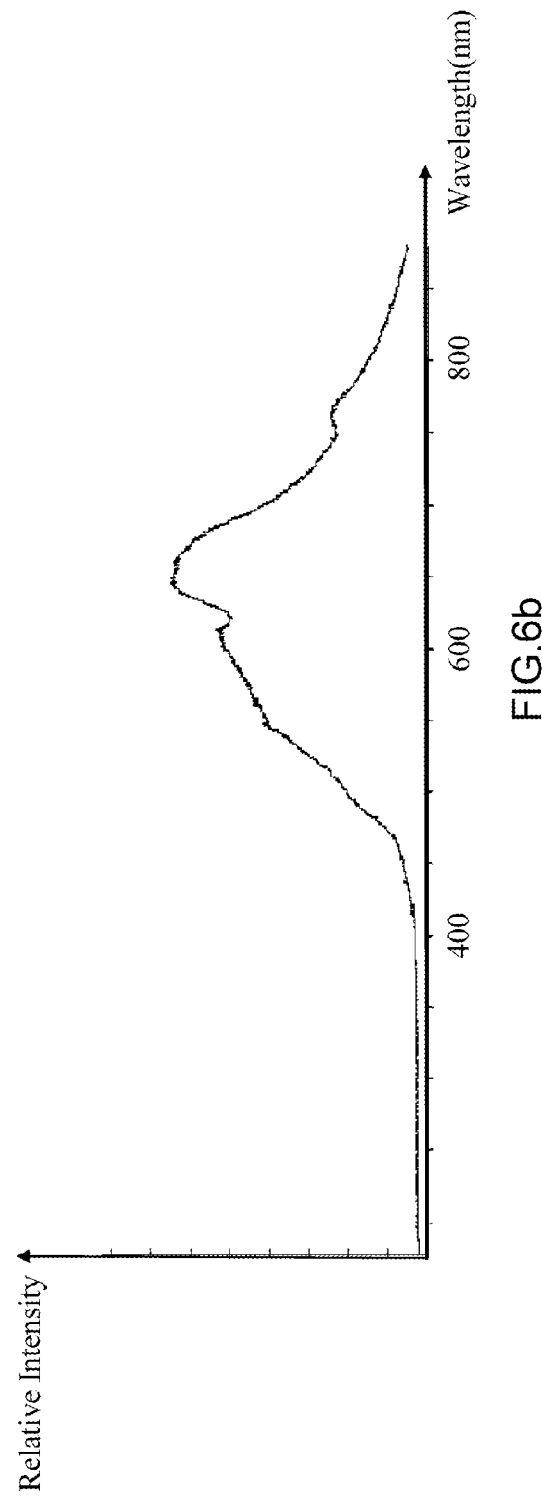

As to a regular indoor environment, the background light usually comes from the fluorescent lamp and Halogen lamp (or a tungsten lamp). FIG. 6(a) and FIG. 6(b) show the light emission spectrum both of fluorescent and Halogen lamp. Basically, these light sources cause problems such as the unstable, overlap and saturation phenomenon to the image signal sensed by the optical sensor array. Therefore, a term of ambient light interference phenomena is given to represent these phenomena. The phenomena produce an ambient light interference noise on the optical sensor array. As to the ambient light interference noise, the method of threshold comparison is completely ineffective and fails to obtain the correct image signals. Methods of eliminating the ambient light interference noise are given and described as follow.

At the time $t_k$, the image signal $I(x,t_k)$ produced by the 1D optical sensor array is a superposed signal composed of an image signal $S(x,t_k)$ formed by the point light sources and an ambient light interference noise $N(x,t_k)$. The relation can be described as following equations.

$$I(x, t_k) = S(x, t_k) + N(x, t_k) \quad (6)$$

$$S(x, t_k) = \sum_{m=0}^{M-1} S(x_m, t_k) \quad (7)$$

$$N(x, t_k) = \sum_{m=0}^{M-1} N(x_m, t_k) \quad (8)$$

Where, $S(x,t_k)$ is the effective image signal formed by a plurality of point light sources, M is the total number of pixel on 1D optical sensor array and may have a value of $2^\alpha$ (for example, $\alpha=10$, $M=2^{10}=1024$), and $x_m$ is the position of mth pixel on the sensor.

In general, the ambient light interference noise $N(x,t_k)$ mostly comes from the ambient light sources and the reflecting light sources of the ambient light produced by other objects, and partially is generated by the dark current of the optical sensor and the electric noise produced by the circuit. In addition, because of the phenomenon, such as (1) the intensity of the ambient light source is not a constant value but has an AC feature because of the use of AC power source, (2) the users may adjust the intensity of the ambient light source and even turn on and off the ambient light source at any time, (3) the movement of user's body may directly interfere the ambient light source if the ambient light source is disposed at a position with the same height as the optical sensor and a position in the back position of the user, in the time frame, the ambient light interference noise $N(x,t_k)$ is not a constant value but a time dependent function. Especially interference caused by (3) deteriorates the stability of $N(x,t_k)$. These are the reasons why the threshold comparison method is ineffective. Therefore, the signals generated by such phenomenon refer to as the time dependent ambient light interference signal.

In addition, the lamp and its lampshade may have a specific geometric structure and objects with high reflectivity (such as mirror and metal button on the clothing) exist in the space such that these light sources with specific geometric structures may form an image signal, being transformed by a 1D optical lens, which is similar with the effective image formed by the point light source, and the worse is that the interference signal is overlapped with the effective image signal directly. This phenomenon is also another reason that causes the threshold comparison method ineffective. Therefore, the signals generated by such phenomenon refer to as the space dependent ambient light interference signal. Hereinafter, both time and space dependent ambient light refers to as the dynamic background light and its image signal refers to as dynamic background light signal.

A real time elimination method of time dependent ambient light interference signal and a method of Fourier signal process (that is the elimination method of space dependent ambient light interference signal) being disclosed hereinafter, further cooperating with a threshold comparison method and/or a profile detection method, can effectively solve the problem of dynamic background light interference and obtain the effective image signal. Hereinafter, both the real time elimination method of time dependent ambient light interference signal and the method of Fourier signal process refer to as the elimination method of dynamic background light signal.

Elimination Method of Time Dependent Ambient Light Interference Signal

Figure 5J:
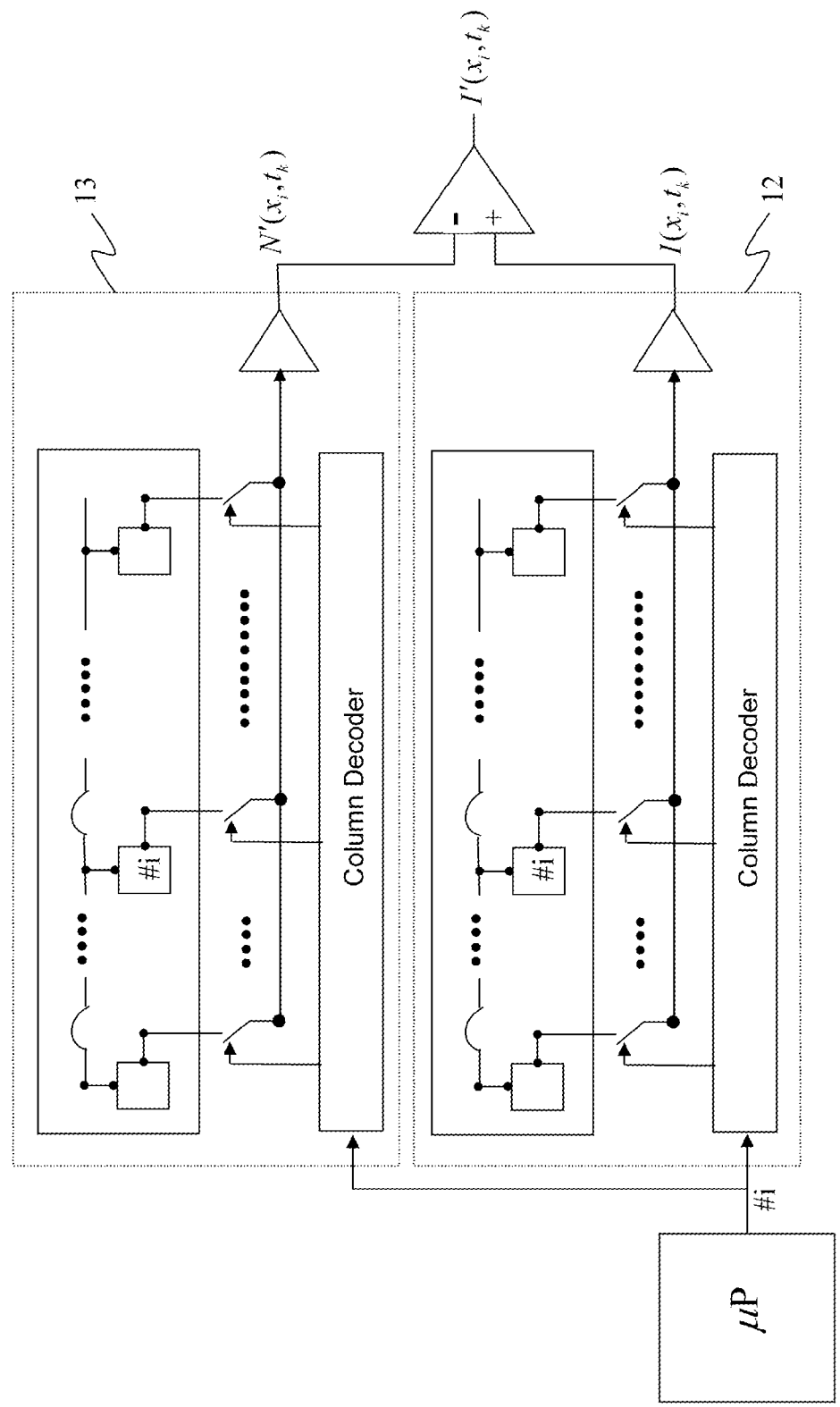
FIGS. 5(j) and 5(k) show the schematic view of the hardware method for eliminating the dynamic background light interference
Figure 5K:
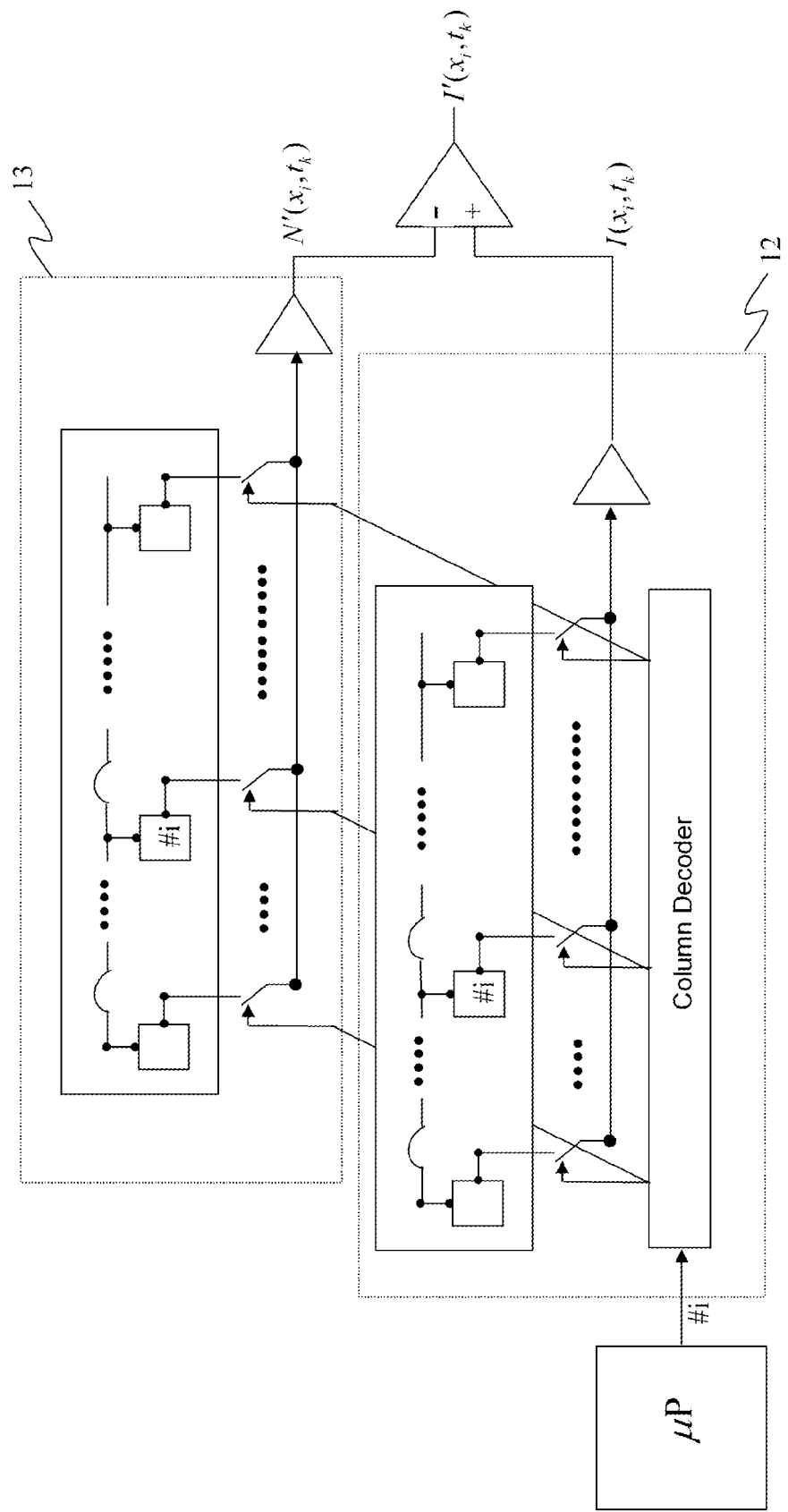

Since the optical sensor array has a characteristic of linear superposition and the 1D lens has a characteristic of forming line image, by taking the advantage of using one more 1D optical sensor array 13, as shown in FIG. 5(j) and FIG. 5(k), the dynamic background light signal $N'(x,t_k)$ can be obtained at the same time, then subtract $N'(x,t_k)$ from $I(x,t_k)$ in equation (6) to obtain:

$$I'(x,t_k) = I(x,t_k) - N'(x,t_k) \quad (9)$$

Substitute equation (6) into equation (9) and obtain:

$$I'(x,t_k)=S(x,t_k)+\Delta N(x,t_k) \tag{10}$$

Wherein, $$\Delta N(x,t_k)=N(x,t_k)-N'(x,t_k) \tag{11}$$

Herein, by a hardware method, the signal $N'(x_m,t_k)$ is obtained by using another 1D optical sensor array 13. Hereinafter, the 1D optical sensor array 13 refers to as the noise measurement 1D optical sensor array while the 1D optical sensor array 12 refers to as the signal measurement 1D optical sensor array. As for the noise measurement 1D optical sensor array 13, a proper optical filter (not shown in the figure) must be attached and used to block out the point light sources but transmit the ambient light sources, and its arrangement must be as close as to and parallel to the signal measurement 1D optical sensor array 12. In addition, the scanning and reading process of the noise measurement 1D optical sensor array 13 is synchronous with the scanning and reading process of the signal measurement 1D optical sensor array 12. Also, an electrical amplifier installed in the scanning and reading circuit is used to amplify the dynamic background light signal to a proper magnitude for obtaining following equation:

$$\Delta N(x,t_k)=DC+\delta n(x,t_k) \tag{12}$$

Such that equation (10) become:

$$I'(x,t_k)\square S(x,t_k)+\delta n(x,t_k)+DC \tag{13}$$

Wherein, DC is a direct current approximated signal having low frequency characteristics and $\delta n(x,t_k)$ is treated as a space dependent ambient light interference signal having high frequency characteristics. In addition, the following condition can be achieved by increasing the power of the point light sources properly.

$$\delta n(x,t_k)\square S(x,t_k) \tag{14}$$

A threshold comparison method is then applied to obtain the effective image signal $S(x,t_k)$. The so called threshold comparison method is a method that determines a proper value greater than the value $DC+\delta n(x,t_k)$ in equation (13), so as to obtain the effective image signal $S(x,t_k)$ by utilizing a comparison method. In addition, as for the point light sources adopting the intensity modulation method, a profile detection method is more effective to obtain the effective image signal $S(x,t_k)$. The so called profile detection method is a method that utilizes the characteristics of the image signal waveform to obtain the effective image signal $S(x,t_k)$. When comparing with background light sources, since the emitting power per unit area of the point light source used in the present invention is much larger than the background light sources and the emitting size is much smaller than the background light sources, the waveform of the image signal has a characteristic of sharp peak. In present invention, the standard deviation $\sigma$ of the image signal is a relative small value, such as 20~30 μm, and the central intensity $I_0$ is a relative large value, and the slope of the image signal waveform is also a relative large value when comparing with the background light sources. Therefore, the standard deviation $\sigma$, the central intensity $I_0$ and the slope of the waveform can be used to obtain the effective image signal $S(x,t_k)$.

Generally, since the electric power used by the point light sources is provided by a regular battery, as the above description, the S/N ratio can be increased by increasing the emitting power of the point light sources, such that results in the increase of power consumption and the reduction of the battery's life time. Under a condition without increasing the emitting power, a signal processing method must be used to reduce $\Delta N(x,t_k)$, so as to achieve the purpose of obtaining higher S/N ration.

(2) Elimination Method of Space Dependent Ambient Light Interference Signal (Method of Fourier Signal Process)

The well known Fourier Optics is used to eliminate the useless geometric structures or noises in the spatial domain, so as to obtain the valuable geometric structures. The basic principle of Fourier's process is to remove those frequencies characterized by the useless geometric structures or noises in the frequency domain, so as to achieve the purpose of Fourier Optics. Therefore, technique of Fourier Optics can be used to reduce $\Delta N(x,t_k)$, so as to achieve the purpose of obtaining higher S/N ration. Apply a Fourier transformation to equation (10) and obtain:

$$I'(\omega_n,t_k)=S(\omega_n,t_k)+\Delta N(\omega_n,t_k) \tag{15}$$

Wherein, $$S(\omega_n, t_k) = \sum_{m=0}^{M-1} S(x_m, t_k)e^{-j\frac{2\pi}{M}mn} \tag{16}$$

$$\Delta N(\omega_n, t_k) = \sum_{m=0}^{M-1} \Delta N(x_m, t_k)e^{-j\frac{2\pi}{M}mn} = \sum_{m=0}^{M-1}[DC+\delta n(x_m, t_k)]e^{-j\frac{2\pi}{M}mn} \tag{17}$$

As the aforementioned Fourier's method, a bandpass filtering function $BPF(\omega_n)$ is used to reduce the low frequencies generated by DC signal and the high frequencies generated by $\delta n(x,t_k)$ signal in the frequency domain, and an inverse Fourier transform is then applied to obtain a clean and approximative image signal of the point light sources. Therefore, apply a bandpass filtering and inverse Fourier transforming operations to equation (15) and obtain:

$$I'(x_m, t_k) = \sum_{n=0}^{M-1} e^{j\frac{2\pi}{M}mn}\{[S(\omega_n, t_k) + \Delta N(\omega_n, t_k)] \times BPF(\omega_n)\} \tag{18}$$

Equation (18) is simplified as follow:

$$I'(x_m,t_k)=S'(x_m,t_k)+\delta'n(x_m,t_k) \tag{19}$$

Wherein, $$S'(x_m, t_k) = \sum_{n=0}^{M-1} e^{j\frac{2\pi}{M}mn}\{S(\omega_n, t_k) \times BPF(\omega_n)\} \tag{20}$$

$$\delta'n(x_m, t_k) = \sum_{n=0}^{M-1} e^{j\frac{2\pi}{M}mn}\{\Delta N(\omega_n, t_k) \times BPF(\omega_n)\} \tag{21}$$

While the bandpass filtering function is:

$$BPF(\omega_n) \equiv \begin{cases} 0 & \text{when } \omega_n < \omega_L \\ A & \text{when } \omega_L \le \omega_n \le \omega_H \\ 0 & \text{when } \omega_H < \omega_n \end{cases} \tag{22}$$

In other words, in the frequency domain, the coefficients of frequencies lower than $\omega_L$ and the coefficients of frequencies higher than $\omega_H$ are removed, namely most of the characteristic frequencies of $\Delta N(\omega_n,t_k)$ are removed, while the rest of coefficients are multiplied by a real value A. The image signal $S'(x_m,t_k)$ can be magnified if A>1.0, so as to obtain $\delta'n(x_m, t_k) \square S'(x_m,t_k)$ or a higher S/N ratio, and then obtain the following result:

$$I'(x_m,t_k) \square S'(x_m,t_k) \quad (23)$$

Finally, the threshold comparison and/or the profile detection method are used to obtain the effective image signal $S(x,t_k)$. As the aforementioned dynamic background light signal elimination method, the method mainly uses another noise measurement 1D optical sensor array to obtain the dynamic background light signal. Unfortunately, this method will increase the hardware's cost and complexity. A software method, referred to as the approximated real time elimination method of time dependent ambient light interference signal, is disclosed as follow.

(3) Approximated Real Time Elimination Method of Time Dependent Ambient Light Interference Signal The so called approximated real time elimination method of time dependent ambient light interference signal is a method that uses a software method, instead of using a noise measurement 1D optical sensor array, to achieve the purpose of reducing the time dependent ambient light interference signal. According to the above description, as for the time dependent ambient light interference, the background light signal may deform and waggle severely when the user's body interfere the light source of lamp directly, such that a correct image signal of the point light sources is hardly obtained. When comparing the scanning rate of a 1D optical sensor array (for instance, $10^{-3}$ sec/scan), the moving speed of a user's body is relative slow. For two consecutively scanned image signals $I(x,t_k)$ and $I(x,t_{k-1})$, expressed as follow:

$$I(x,t_k)=S(x,t_k)+N(x,t_k) \quad (24)$$

$$I(x,t_{k-1})=S(x,t_{k-1})+N(x,t_{k-1}) \quad (25)$$

The variation of the dynamic background light signal $N(x, t_k)$ and $N(x,t_{k-1})$ at the time $\Delta t=t_k-t_{k-1}$ can be treated as a relative small magnitude when comparing with the image signal $S(x,t_k)$. Therefore, subtract equation (25) from equation (24) and obtain:

$$I'(x,t_k)=I(x,t_k)-I(x,t_{k-1})=\Delta S(x,t_k)+\Delta N(x,t_k) \quad (26)$$

$$\Delta S(x,t_k)=S(x,t_k)-S(x,t_{k-1}) \quad (27)$$

$$\Delta N(x,t_k)=N(x,t_k)-N(x,t_{k-1}) \quad (28)$$

Wherein, $$\Delta S(x, t_k) = \begin{cases} G(\mu_k) - G(\mu_{k-1}), & \text{when point light sources are in moving status} \\ 0, & \text{when point light sources are in static status} \end{cases} \quad (29)$$

$$\Delta N(x, t_k) = N(x, t_k) - N(x, t_{k-1}) = \delta n(x, t_k) \quad (30)$$

In the approximated real time elimination method of time dependent ambient light interference signal, equation (29) and (30) describe the features of both the image signal and the dynamic background light signal. The image signal is presented by the subtraction of two Gaussian signal $G(\mu_k)$ and $G(\mu_{k-1})$ at two different position when the point light sources are in the moving status, while the image signal becomes zero when the point light sources are in the static status. In addition, signal $\delta n(x,t_k)$ contained in the dynamic background light signal has the same feature with equation (12). Therefore, the aforementioned method of Fourier signal process can be used to eliminate the space dependent ambient light interference signal. In case of the static status, since the image signal is zero, the original image signal is no way to be retrieved when equation (29) is processed by the Fourier signal process. In order to solve this problem, a tracking method can be used to predict the current position of point light sources by referring to the previously measured position data.

3. Data Process (Calculation of Spatial Resolution and Mean Position)

Figure 7A:
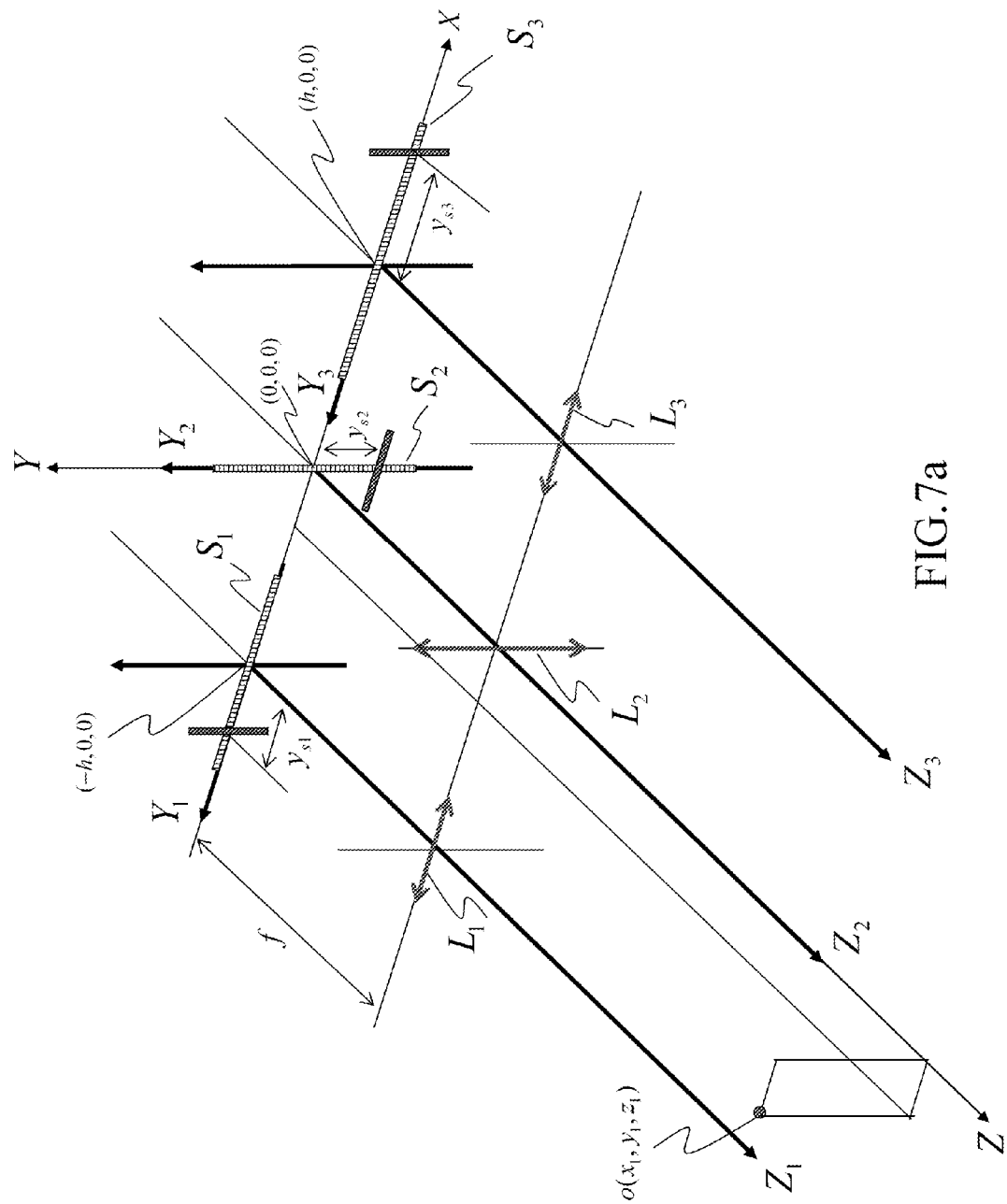
FIG. 7(a) shows the schematic view of an optical system adopted by Reymond.

With reference to FIG. 7(a) for the schematic view of an optical system adopted by Reymond, three linear sensor arrays $S_1, S_2, S_3$ are installed in a world coordinate system O(X, Y, Z), and their centers are disposed at (−h, 0, 0), (0, 0, 0), (h, 0, 0), and the direction of their long axis are shown in the figure. Further, three 1D lenses $L_1, L_2, L_3$ with equal focal length f are installed, and their optical axis directions are $Z_1, Z_2, Z_3$ respectively, and their focusing directions are shown in the figure. For a point light source $o(x_1, y_1, z_1)$, the image mean position on $S_1, S_2, S_3$ are $y_{s1}, y_{s2}, y_{s3}$ respectively. In addition, the visual axis of this optical system is Z axis of the world coordinate system O(X, Y, Z). Therefore, the spatial position of the point light source $o(x_1, y_1, z_1)$ can be calculated by the following positioning calculation equation (Refer to the aforementioned three R.O.C. patents for the details of the calculation).

$$x_1 = \frac{y_{s1} + y_{s3}}{y_{s1} - y_{s3}} h; \quad (31)$$

$$y_1 = -\frac{2h}{y_{s1} - y_{s3}} y_{s2} \quad (32)$$

$$z_1 = \left(1 + \frac{2h}{y_{s1} - y_{s3}}\right) f \quad (33)$$

Where $f, h$ are known, and $y_{s1}, y_{s2}, y_{s3}$ are measured values.

As to the positioning error of the optical system, the error can be evaluated by the following equations.

$$\Delta x_1 = \frac{(z_1 - f)}{f} \Delta y_{s1} \quad (34)$$

$$\Delta y_1 = -\frac{(z_1 - f)}{f} \Delta y_{s2} \quad (35)$$

$$\Delta z_1 = -\frac{(z_1 - f)^2}{hf} \Delta y_{s1} \quad (36)$$

Equations (34) to (36) clearly show that the errors $\Delta x_1, \Delta y_1, \Delta z_1$ of the positions of the point light source in each direction are determined by the optical parameters $f, h$, longitudinal distance $z_1$, and measured errors $\Delta y_{s1}, \Delta y_{s2}, \Delta y_{s3}$. Therefore, the $\Delta x_1, \Delta y_1, \Delta z_1$ obtained from the smallest $\Delta y_{s1}, \Delta y_{s2}, \Delta y_{s3}$ are defined as the spatial resolutions of the optical system.

From the description above, under a condition of no dynamic background light interference, after a point light source is transformed through a 1D optical lens onto a linear sensor array, the effective image intensity I(x) is close to a Gaussian distribution as shown in Equation (1). Since the linear sensor array is composed of a row of discrete photo-sensitive pixels with a width and a gap as shown in FIG. 3(a), and the actual measured image signal I(x) becomes:

$$I(x) = \sum_i \bar{I}(x_i)\Delta w \qquad (37)$$

Where, $\bar{I}(x_i)$ is the measured mean value per unit length of the $i^{th}$ pixel which depends on several physical parameters such as the pixel size, photosensitivity, intensity and wavelength of incident light and ambient temperature, and $\Delta w$ is the mean width of a pixel. If a position $x_i$ of the maximum $\bar{I}(x_i)$ (which is the position of the brightest sensed pixel) is obtained and used as a measured value of $y_{s1}, y_{s2}, y_{s3}$, then the minimum measuring error $\Delta y_{s1}, \Delta y_{s2}, \Delta y_{s3}$ is the width $\Delta w$ of the single pixel. An example is used for illustrating the evaluation of a spatial resolution as follows.

Figure 7B:
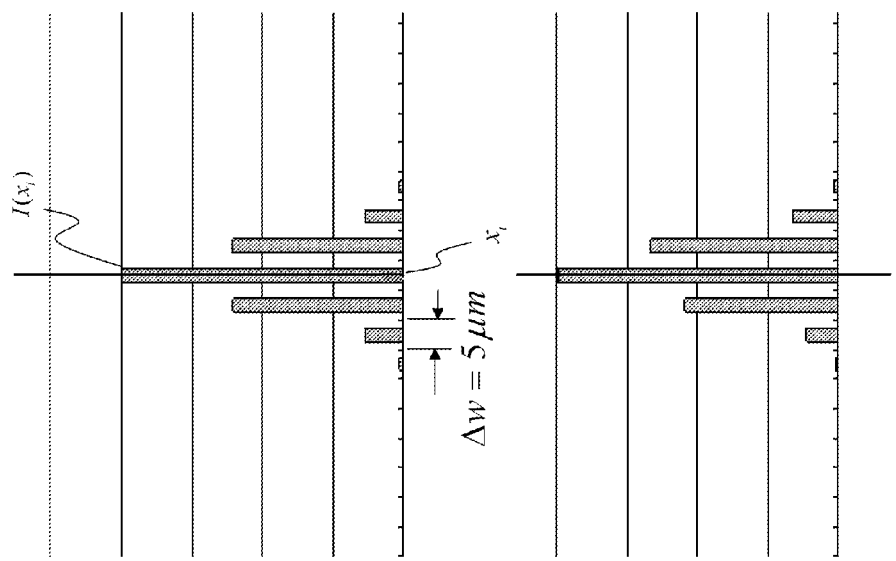
FIG. 7(b) shows the change of image signal due to the tiny displacement of a point of light source.

Assumed that each parameter is known as follows:

$f$=20 mm˙$h$=200 mm˙$Z_1$=2000 mm $\Delta y_{s1} = \Delta y_{s2} = \Delta y_{s3} = \Delta w \square 5$ μm Substitute the foregoing parameters into Equations (34) to (36) to obtain $\Delta x_1 \square 0.5$ mm-$\Delta y_1 \square 0.5$ mm-$\Delta z_1 \square 5$ mm If the position of the brightest sensed pixel is used as an image mean position, then the width $\Delta w$ of the pixel determines the spatial resolution. In FIG. 7(b) shows the change of image signal when $\Delta w$=5 μm and the displacement of the point light source is 0.5 μm. The upper figure shows an image signal before moving, and the lower figure shows an image signal after moving. If the displacement of the point light source is smaller than the width $\Delta w$ of a pixel, the position of the brightest sensed pixel may remain unchanged, and thus will not change the positioning calculation result. As to the tiny variation of the image signal in between the pixels, it is necessary to use the Gaussian Fitting or the following statistical calculation equation for obtaining the mean position μ.

$$\mu = \frac{\sum_{i=1}^{M} x_i \bar{I}(x_i)}{\sum_{i=1}^{M} \bar{I}(x_i)} \qquad (38)$$

Where, N is the total number of sensed pixels of the linear sensor array, and $\bar{I}(x_i)$ is the measured value of the $I^{th}$ sensed pixel. In general, a digital value is obtained, after an analog-to-digital converter (ADC) converts the analog voltage value $\bar{I}(x_i)$ of the sensed pixel. If a 10-bit ADC is used, the inputted analog voltage value can recognize 1024-level tiny variation easily. Therefore, the aforementioned two methods of calculating the average position μ can improve the resolution of the 3D position measurement up to the order of micron (μm). Further, if the distance of $z_1$ is reduced to a relative small value, the resolution can be improved up to the order of nanometer (nm). Thus, the present invention can be applied for positioning a non-contact precision measurement instrument.

4. Extension of System Configurations (Blind Spot Compensation, Viewing Angle Expansion, and Visual Axis Tracking)

As known, any optical system has the issues of blind spots and limited viewing angle. The 1D optical positioning system also has these issues. In view of domestic and foreign patents, no solution of these issues has been given. In FIG. 8(a), the maximum viewing angle 51 of the 1D optical positioning system 50 limits the movable range of the point light source 52 (The present invention only uses the 1D or the horizontal viewing angle as the example for illustration).

Figure 8B:
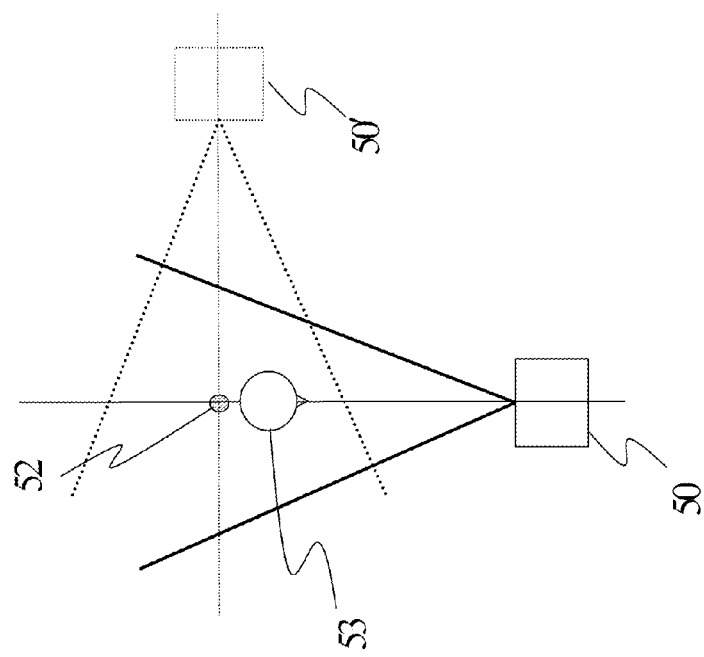
FIG. 8(b) shows the schematic view of the solution of a blind spot.

With reference to FIG. 8(b) for the solution of a blind spot, if the point light source 52 is sheltered by an obstacle 53 (such as user's body), one or more 1D optical positioning system 50' can be installed at appropriate positions for compensating the blind spot problem.

Figure 8C:
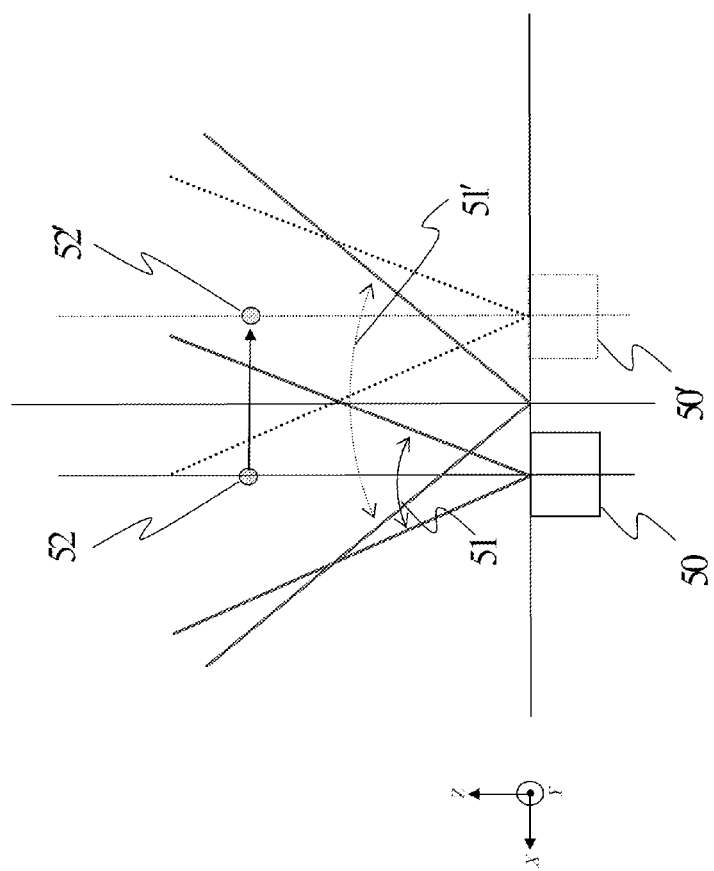
FIG. 8(c) shows the schematic view of a method of viewing angle expansion.

With reference to FIG. 8(c) for a schematic view of a viewing angle expansion method, one or more 1D optical positioning systems 50' can be installed at appropriate positions in the space for expanding the viewing angle 51'.

With reference to FIG. 8(d) for a schematic view of a visual axis tracking method, if the point light source 52' move out of the original range of the viewing angle 51, the 1D optical positioning system 50 can predict the movement of the point light source 50 and rotate its own visual axis 54 to an appropriate angle 54', such that the point light source 52' can move inside the new range of viewing angle 51'.

Figure 8E:
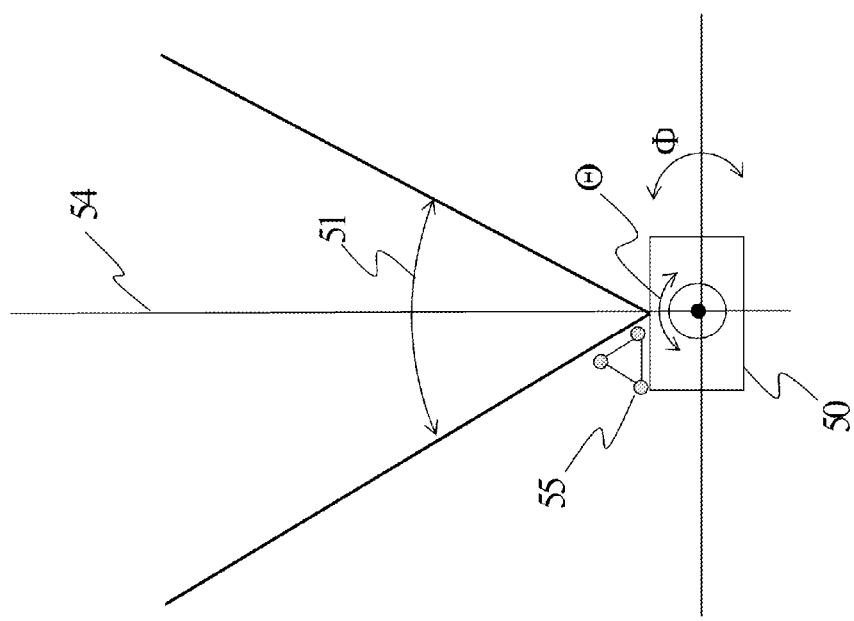
FIG. 8(e) shows the schematic view of a 1D optical positioning system having the functions of rotating the visual axis and being positioned.

To achieve the purposes of a blind spot compensation, a viewing angle expansion, and a visual axis tracking for overcoming the issues as shown in FIG. 8(b) to 8(d), the 1D optical positioning system 50 as shown in FIG. 8(e) must have the function of rotating the visual axis and being positioned. The function of the rotating visual axis is performed by the known prior art such as a rotating mechanism, a motor, and an angular measurement, and can rotate the visual axis 54 horizontally (which is a rotation of an angle Θ with respect to the y-axis), and vertically (which is a rotation with respect to the x-axis, and rotated at an angle Φ). The function of being positioned uses a plurality of point light sources 55 (hereinafter referred to as pilot point light sources) installed on a mechanical casing of the 1D optical positioning system 50 to achieve the mutual positioning purpose in between a plurality of 1D optical positioning systems 50. In other words, if the blind spot compensation and the viewing angle expansion are conducted or when it is necessary to place a plurality of 1D optical positioning systems 50 at any position in the space, the positioning measurement of the pilot point light sources 55 can be utilized to achieve the purpose of measuring the position and the visual axis angle of the plurality of 1D optical positioning systems 50.

5. Extension of System Applications (1) Applications of Virtual Input Device

In the present invention, the virtual input device adopts a device simulated input method to substitute a physical input device completely or partially without using a physical mechanical device such as a mouse, a keyboard, a joystick, a remote control or a touch screen when operating a conventional computer, a PDA, a mobile phone, a game player or a television. The following physical input devices are used for illustrating the virtual input method below.

Figure 9A:
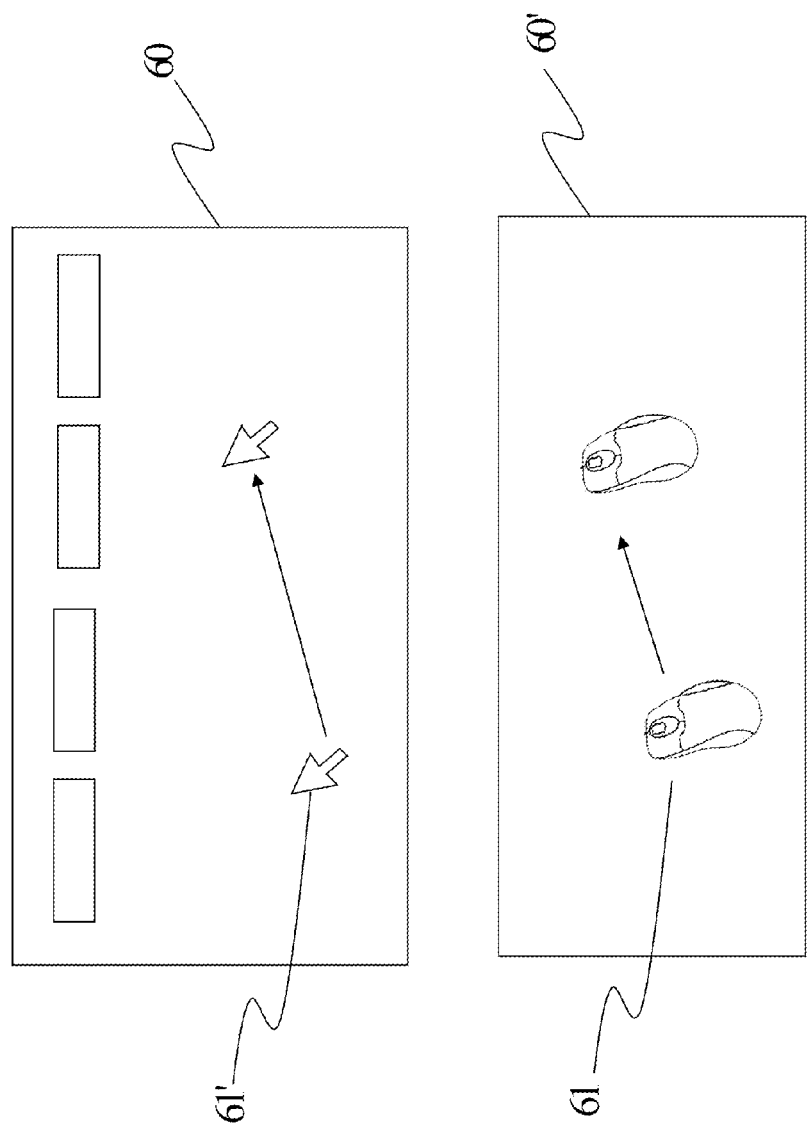
FIG. 9(a) shows the schematic view of an application of a general mouse.

With reference to FIG. 9(a) for a schematic view of a general mouse operated on a displayed screen 60 (hereinafter referred to as a physical operating screen) under the Windows operating system environment, a mouse 61 is moved, pressed, released, clicked or double clicked to achieve Windows operations. In addition, a graphic cursor 61' is used on the physical operating screen 60 to mark and align a corresponding position of the mouse 61. As to the operation of mouse, a gesture input method used for replacing mouse operations is disclosed by R.O.C. Pat. Application No.: 096116210. However, only a single point light source is used in the patent to simulate the mouse operation.

In the device simulated input method, a virtual input device corresponding to a physical input device is used to simulate and recognize the operation of a hand or fingers required by a physical input device to achieve the virtual input effect. The method provides a procedure of virtual operating screen correspondence, a procedure of virtual device geometric structure definition and operating fingers correspondence and a procedure of operating gestures definition and recognition. A mouse having a left button, middle button, a right button and a roller operated by three fingers is used for illustrating and describing the device simulated input method, and then the similar description will be given for other physical input devices later.

Figure 9B:
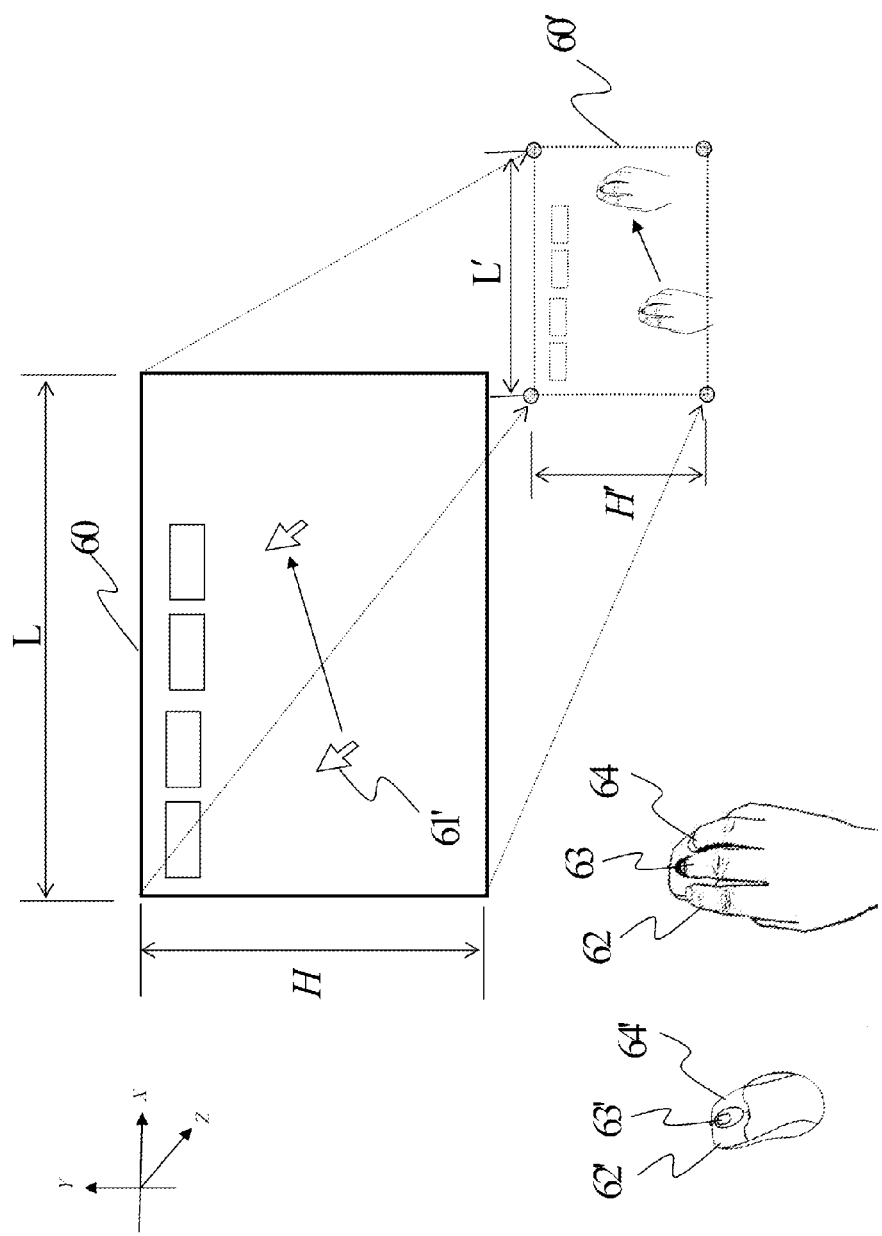
FIG. 9(b) shows the schematic view of a mouse simulated input method.

With reference to FIG. 9(b) for a schematic view of a mouse simulated input device, the following procedures are described.

Procedure of Virtual Operating Screen Correspondence

As to a physical operating screen 60 with an actual dimensions of L (Length)×H (Width), a virtual operating screen 60' with dimensions L'×H' can be defined at any position in the space, and the virtual operating screen 60' has a spatial corresponding relationship with the physical operating screen 60, and the relationship is a one-to-one and proportional relation. In other words, L'=m×L and H'=n×H, where m-n are real numbers greater than 1, equal to 1, or smaller than 1. Only if a point light source on a finger is moved on the virtual operating screen 60', a one-to-one correspondence can be found on the physical operating screen 60. In addition, the virtual operating screen 60' can be set in air, or any fixed surface (such as a desktop or a wall that facilitates the operation by fingers).

Procedure of Virtual Device Geometric Structure Definition and Operating Fingers Correspondence The physical position, size and motion of the function keys on the virtual device and the correspondence relation between and the fingers and the virtual function keys are defined. The defined physical position, size and motion of the virtual function keys are used to determine the interaction between the fingers and the virtual function keys, namely to determine whether or not the fingers are pressed on the virtual function keys for an input operation; and the correspondence relation between the fingers and the virtual function keys correlates the operated function keys with the operating fingers. For example, an index finger 62 of a right hand corresponds to a left button 62', and a middle finger 63 of a right hand corresponds to a middle button and a roller 63', and a ring finger 64 of a right hand corresponds to a right button 64'. In an actual operation of the virtual input, a user's hand is equivalent to hold a virtual mouse with substantially the same physical structure and size of a real mouse, and operate the virtual mouse on a virtual operating screen 60'. In addition, the correspondence relation between the fingers and the virtual function keys varies with the user's operating habit. The correspondence relation can be one-to-many correspondence relation, such that a single finger can be used to operate a plurality of function keys.

Procedure of Operating Gestures Definition and Recognition

According to the description in R.O.C. Pat. Application No. 096116210, the basic principle, when using a device simulated input method to simulate the operating gestures such as moving, pressing, releasing, clicking or double clicking a mouse, is to utilize a plurality of consecutive gesture units to respectively define the operating gesture of a index finger, middle finger and ring finger. Each single gesture unit is composed of three consecutive physical states such as a temporary hold state, a specific movement state, and a temporary hold state. For instance, the gesture of pressing left button by a index finger 62 can be defined as three consecutive physical states which comprise a temporary hold state, a downward short straight-line movement state, and a temporary hold state, and the gesture of releasing left button by a index finger 62 can be composed of a temporary hold state, a upward short straight-line movement state, and a temporary hold state, and the gesture of clicking left button by a index finger 62 can be composed of two consecutive gestures such as a pressing gesture and a releasing gesture, and the gesture of double clicking left button by a index finger 62 can be composed of two consecutive clicking gesture. As to the middle and right button, the gesture definition is same as the left button. As for gesture definition of roller, the consecutive physical states of the middle finger 63 comprise a temporary hold state, a forward or backward short straight-line movement state, and a temporary hold state. As for the position of cursor 61', it can be defined and corresponded to the group center coordinate (refer to the description below) of three fingers which are in a relatively static state. It is certain that the operating gestures of a mouse defined above are available for the emulation of a regular 2D mouse and satisfy user's operation habit. However, the definition of gestures can be different and also defined by a general gesture according to the description in R.O.C. Pat. Application No.: 096116210.

With reference to FIG. 9(c) for a schematic view of a remote control simulated input device, since the operation of a remote control is simple, and generally adopts a single key operation with the use of a single finger to do the operation similar to a mouse. As to the remote control, the purpose of virtual input can be achieved simply by providing a virtual operating screen 60', defining the geometric structure of the virtual device 75, corresponding a single finger 74 to all function keys, and displaying an assisted graphic image of a cursor 74' corresponding to the operating finger and a remote control 76 on the physical operating screen 60. With the assistance of the corresponding cursor 74', the finger 74 can be moved to any function key for pressing or releasing the key to achieve the virtual input effect of a remote control. In addition, by taking the advantage of virtual reality technology, the geometric structure of the virtual device 75 can be visually displayed as a virtual stereo image and the operating finger 74 can directly operate the virtual geometric structure of the device 75. Further, the operating finger 74 can also be visualized virtually, so as to improve the convenience of operation by using the virtual finger to operate the virtual geometric structure of the device 75.

With reference to FIG. 9(d) for a schematic view of a touch screen simulated input device, the operation of a general physical touch screen is very simple and use a single finger to do an operation on the physical operating screen 60 which is similar to the operation of a mouse. As to the touch screen simulated input device, the purpose of virtual input can be achieved simply by defining a virtual operating screen 60' and using the single finger 74 to operate the physical operating screen 60 with the assistance of a cursor 74' which corresponds to the operating finger. In addition, by taking the advantage of virtual reality technology, the virtual operating screen 60' can be visually displayed as a virtual stereo image and the operating finger 74 can directly operate the virtual operating screen 60'. Further, the operating finger 74 can also be visualized virtually, so as to improve the convenience of operation by using the virtual finger to operate the virtual operating screen 60'.

With reference to FIG. 9(e) for a schematic view of a keyboard simulated input device, although a general keyboard comes with many press keys, and multiple keys can be operated simultaneously, the device simulated input method is basically similar to the operation of a remote control and simply requires a virtual operating screen 60' for defining the geometric structure of a virtual device 80, a correspondence relationship which corresponds a plurality of (for instance three) single finger 74 to all function keys, and an assisted graphic image 85 of a keyboard displayed on the physical operating screen 60. With the assistance of a plurality of cursors 74', each of the cursors 74' corresponds to a operating finger 74, the finger 74 can be moved onto the key for pressing or releasing operation, so as to achieve the virtual input effect of a keyboard. In addition, the virtual operating screen 60' can be defined on a fixed physical surface such as a desktop, and a printing matter (for example a piece of paper printed with the keyboard) of a keyboard is placed on the physical surface, so that the assisted graphic image 85 is no longer needed, and users can operate the printing matter in a similar way of operating a real keyboard to achieve the virtual keyboard input effect. In addition, by taking the advantage of virtual reality technology, the geometric structure of the virtual device 80 can be visually displayed as a virtual stereo image and the operating fingers 74 can directly operate the virtual geometric structure of the device 80. Further, the operating fingers 74 can also be visualized virtually, so as to improve the convenience of operation by using the virtual fingers to operate the virtual geometric structure of the device 80.

(2) Applications of Simulator

The applications of the virtual input are described above. The 1D optical positioning device of the present invention is capable of measuring the positions of a plurality of point light sources at a high computing speed, a high spatial resolution, and a low manufacturing cost. Further, the use of a plurality of 1D optical positioning devices is able to expand the measuring scope of the point light sources and compensate the blind spots. These characteristics can also be are used in the area of the simulator as follows:

With an appropriate number and a fixed method, a plurality of point light sources (for instance, three) are installed to a physical racket-shaped object (such as a tennis, badminton, table tennis racket), a physical rod-shaped object (such as a baseball or softball bat), a physical stick-shaped object (such as a golf club, a hockey stick, a pool stick, a spear or a sword), a physical glove-shaped object (such as a baseball, softball or boxing glove), a physical spherical object (such as a baseball, softball, basketball, soccer, volleyball, or bowling ball), a physical toy (such as a toy gun), a physical remote control toy (such as a remote control car, remote control plane or remote control helicopter), a physical remote control (such as a remote control of a home video game player). As to a plurality of point light sources installed on a physical object, the 1D optical positioning device of the present invention is capable of measuring the positions of those point light sources in real time, so as to obtain the trajectory and other physical quantity of the physical object. In addition, taking the advantage of virtual reality technology, a virtual object is defined in the virtual space and its motion is corresponded to the motion of the physical object (such as a racket). In conformity with physical laws, the virtual object is able to interact with other virtual object (such as a ball) in a lively and natural way (such as striking the ball), so as to achieve the simulating purpose of sports, shooting, driving and flying.

Figure 10:
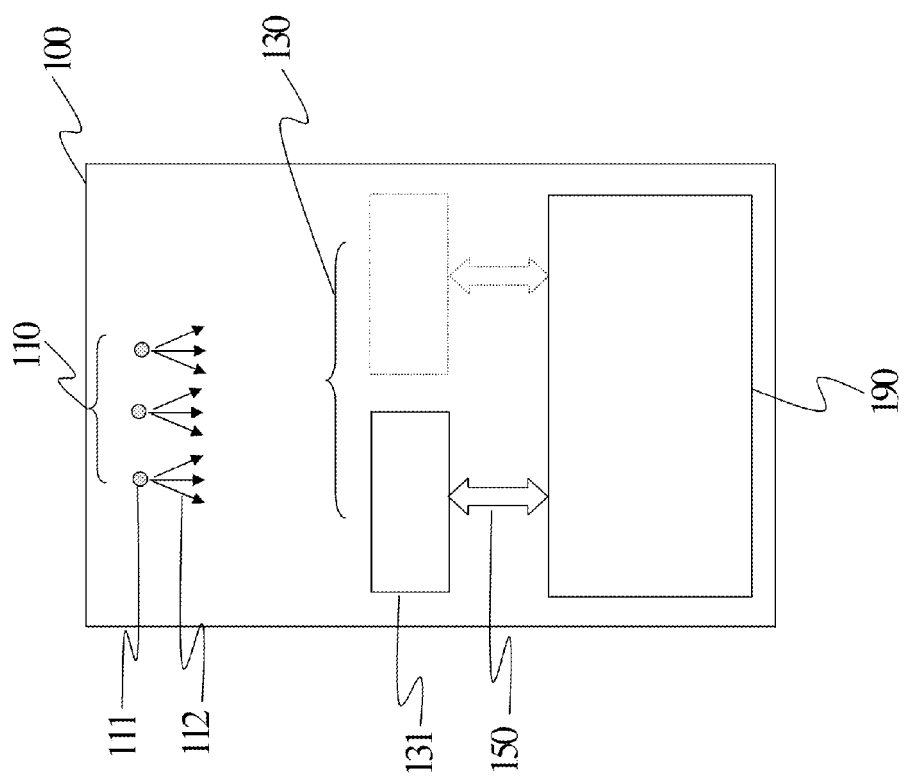
FIG. 10 shows the schematic view of the first preferred embodiment in the present invention.
Figure 11D:
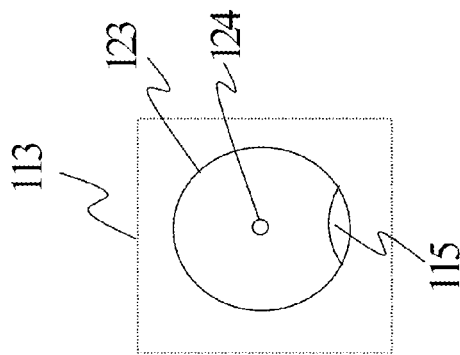
FIG. 11(d) shows the schematic view of a light scattering component.
Figure 11C:
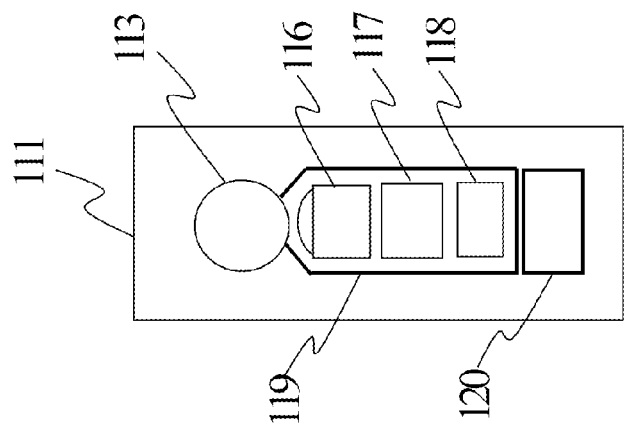
FIG. 11(c) shows the schematic view of an assembly of a single point light source.
Figure 11B:
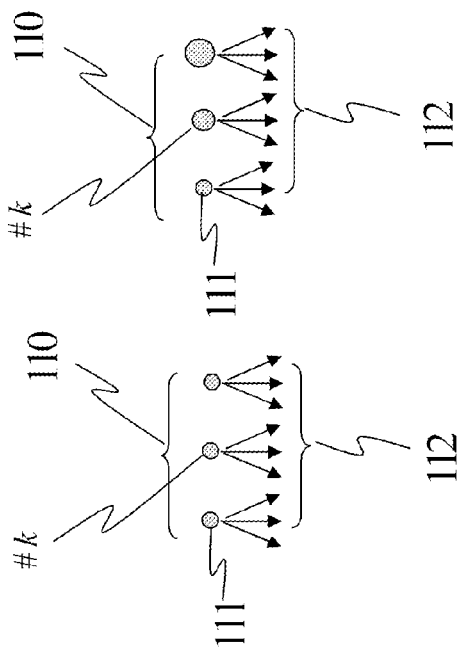
FIG. 11(b) shows the schematic view of a plurality of point light sources with geometric unique characteristics.
Figure 11A:
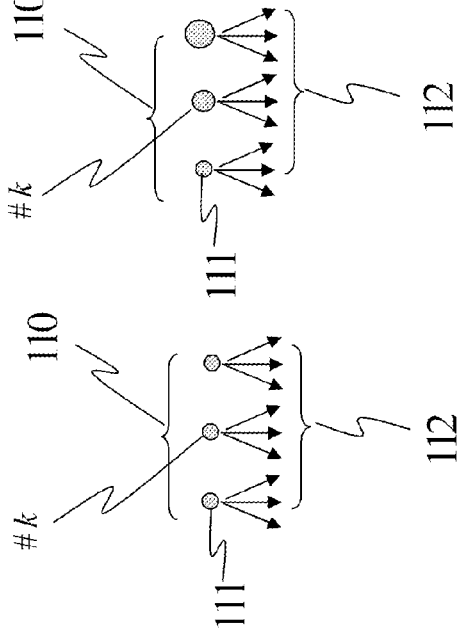
FIG. 11(a) shows the schematic view of a plurality of point light sources with intensity unique characteristics.
Figure 11K:
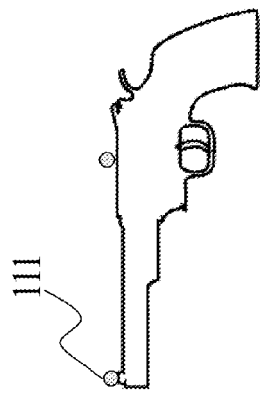
Figure 11N:
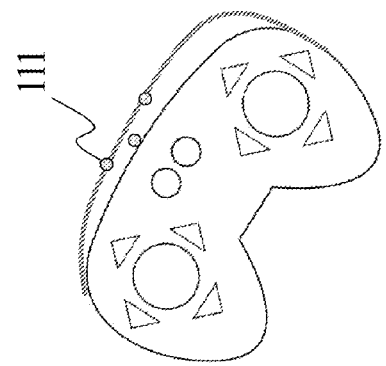
Figure 11J:
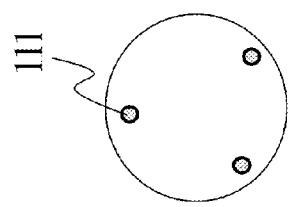
Figure 11M:
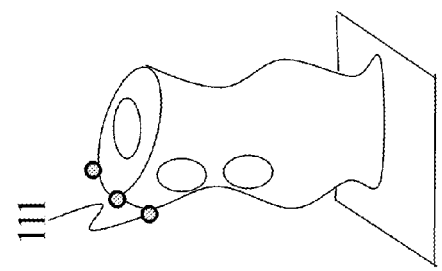
Figure 11I:
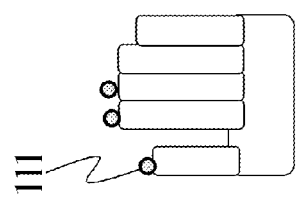
Figure 11L:
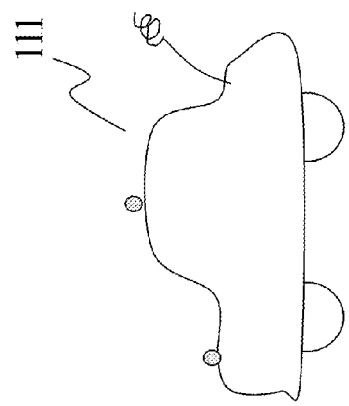

With reference to FIG. 10 for a schematic view of a first preferred embodiment in the present invention, as for the unique characteristics of the point light sources, a device 100 of the first preferred embodiment mainly adopts the intensity modulation method or geometric modulation method to achieve the purpose of virtual input device and simulator by measuring and analyzing the 3D motion of a plurality of point light sources. The device 100 comprises a plurality of point light sources with unique characteristics 110, a plurality of 1D optical positioning devices with a visual axis tracking function 130 and a control analysis unit 190 having a control analysis procedure. In the plurality of point light sources with unique characteristics 110, each point light source 111 simultaneously and continuously emits a spot-like scattering light source 112 with unique physical properties. In the plurality of 1D optical positioning devices 130, each 1D optical positioning devices 131 measures the 3D positions of all point light source 111 and output a set of physical quantities 150 after receiving a synchronization enable signal 150 and simultaneously receiving all spot-like scattering light sources 112. In addition, each 1D optical positioning devices 131 is equipped with the visual axis tracking and positioning function and is able to automatically track the central group coordinate of that plurality of point light sources and the coordinate of any one of that plurality of point light sources (refer to the description below), and output an angular direction 150 of its own visual axis, so as to achieve the visual axis tracking purpose, and is also able to receive an angular direction of its own visual axis, so as to achieve the visual axis positioning purpose. The control analysis unit 190 has the control analysis procedure, and the control analysis procedure is a software procedure, and the control analysis unit 190 is connected to control all 1D optical positioning devices 131, and mainly outputs a synchronization enable signal 150 for synchronously starting all 1D optical positioning devices 131 to do the 3D position measurement, and also outputs a set of angular direction of visual axis 150 for setting the angular direction of visual axis of each 1D optical positioning devices, so as to achieve the visual axis positioning purpose for all 1D optical positioning devices, and receive all physical quantity and angular direction of visual axis 150 to simulate an input function of a physical input device, so as to achieve the virtual input purpose, and also to simulate the motion of a physical object, so as to achieve the purpose of simulator.

With reference to FIG. 11(*a*) for a schematic view of a plurality of point light sources with unique intensity characteristic, each point light source 111 of the plurality of point light sources with unique intensity 110 has the same light emitting radius but different light emitting intensity. In other words, each point light source has a unique characteristic of light intensity, and all point light sources emit lights continuously at the same time. For simplicity, each point light source has a unique serial number #k.

With reference to FIG. 11(*b*) for a schematic view of a plurality of point light sources with unique geometric characteristic, each point light source 111 of the plurality of point light sources with unique geometric size 110 has a different light emitting radius but the same light emitting intensity. In other words, each point light source has unique geometric characteristic, and all point light sources emit lights continuously at the same time. For simplicity, each point light source has a unique serial number #k.

With reference to FIG. 11(*c*) for a schematic view of an assembly with a single point light source, the point light source 111 comprises a light scattering component 113, a light emitting source 116, an electronic control circuit 117, a battery 118, a point light source fixation mechanism 119, and a device fixation mechanism 120. The light scattering component 113 is an object that can uniformly scatter the incident light along all angular directions. The light emitting source 116 is composed of one or multiple LED or semiconductor laser diodes for emitting visible light or non-visible light. The electronic control circuit 117 including a power switch and a circuit of a constant current source provides the function of a power switch and a constant current source which is supplied to the light emitting source 116 for obtaining a specific and stable brightness of the emitted light. In addition, the point light source fixation mechanism 119 is a mechanical mechanism for installing and fixing the light scattering component 113, the light emitting source 116, the electronic control circuit 117, and the battery 118.

The device fixation mechanism 120 can fix the point light source fixation mechanism 119 on an object as shown in FIGS. 11(*e*) to 11(*n*). The object can be fingers of a hand, a forehead of a head, or an instep of a foot as shown in FIG. 11(*e*); a racket-shaped object such as a tennis, badminton, table tennis racket as shown in FIG. 11(*f*); a rod-shaped object such as a baseball or softball bat as shown in FIG. 11(*g*); a stick-shaped object such as a golf club, a hockey stick, a pool stick, a knife, a sword or a spear as shown in FIG. 11(*h*); a glove-shaped object such as a baseball, softball, or boxing glove as shown in FIG. 11(*i*); a spherical object such as a baseball, softball, basketball, soccer, volleyball or bowling ball as shown in FIG. 11(*j*); a toy such a toy gun as shown in FIG. 11(*k*); a remote control toy such as a remote control car, a remote control plane or a remote control helicopter as shown in FIG. 11(*l*); a joystick as shown in FIG. 11(*m*); or a remote control of a home video game player as shown in FIG. 11(*n*).

With reference to FIG. 11(*d*) for a schematic view of a light scattering component, the light scattering component 113 is comprised of a transparent optical guide material 123 and a scattering material 124. The transparent optical guide material 123 can be any shape, preferably a spherical shape, and can be made of any transparent material, preferably a glass or a plastic material. The scattering material 124 is installed inside the transparent optical guide material 123 and the most preferred scattering material 124 is a randomly distributed powder with light reflecting capability, or a randomly distributed transparent powder, or a randomly distributed tiny air bubbles, or a smaller and transparent ball. In addition, the optical index of the scattering material 124 is smaller than the optical index of the transparent optical guide material 123. Further, a light incident window 115 with proper size and shape disposed at an appropriate position on the transparent optical guide material 123 allows the incident light emitted from the light emitting source 116 to enter the transparent optical guide material 123 through a better angle.

With reference to FIG. 12(*a*) for a schematic view of a single 1D optical positioning device with visual axis tracking function, the single 1D optical positioning device 131 with a visual axis tracking function comprises a plurality of linear positioning sensors 132, a positioning calculation control microprocessor 145, a signal transmission interface 146, a group of pilot point light sources 160, a 1D optical positioning device fixation mechanism 170, and a two-axis angular control device 180. For simplicity, the single 1D optical positioning device 131 has a unique serial number #i and the single linear positioning sensor 133 has a unique serial number #j.

As for each linear positioning sensor 133(#j), after simultaneously receiving all scattering light source 112 emitted by the point light source 111(#k ) and a synchronization scan signal SYNC, each linear positioning sensor 133(#i) can calculate and output a group of image mean position 139 (having a value of $\mu_{ijk}$). In a more specific way, the image mean position 139 ($\mu_{ijk}$) is defined as the mean position of the line image of a point light sources 111(#k ) formed by the linear positioning sensor 133(#j) in the 1D optical positioning device 131(#i ).

The positioning calculation control microprocessor 145 contains a positioning calculation and control procedure and is connected to control all linear positioning sensor 133(#j) and the two-axis angular control device 180. After receiving the synchronization enable signal ENABLE outputted by the control analysis procedure 190 through the signal transmission interface 146, the positioning calculation and control procedure outputs a periodic synchronization scan signal SYNC, and after obtaining all image mean positions 139 ($\mu_{ijk}$), the positioning calculation and control procedure calculates and outputs the physical quantity $P_i$, group physical quantity $\overline{P}_i$, relative physical quantity $R_i$, and other physical quantities $F_i$ of all point light sources 111(#k). In addition, the positioning calculation and control procedure in the microprocessor 145 is capable of changing the visual axis angle $(\Theta_i, \Phi_i)$ of the 1D optical positioning device 131(#i). In other words, by receiving a new visual axis angle $(\Theta_i, \Phi_i)$, or by calculating and outputting a new visual axis angle $(\Theta_i, \Phi_i)$ according to the physical quantity $P_i$ or the group physical quantity $\overline{P}_i$, the positioning calculation and control procedure can calculate and output two angular driving signals $(\Theta_{ia}, \Phi_{ia})$. In the meantime, two angular electric signals $(\Theta_{is}, \Phi_{is})$ is received and used for the feedback control of the angle to achieve the tracking and precise positioning of the visual axis angle. Therefore, the way of using an externally generated new visual axis angle $(\Theta_i, \Phi_i)$ to change the visual axis angle is known as the visual axis positioning function and the way of using a new visual axis angle $(\Theta_i, \Phi_i)$ generated by the group physical quantity $\overline{P}_i$ to change the visual axis angle is known as the visual axis tracking function.

As described above, the physical quantity $P_i$ of each point light source 111(#k) are physical quantities comprising 3D position coordinates $(x_{ik}, y_{ik}, z_{ik})$, a displacement $(\Delta x_{ik}, \Delta y_{ik}, \Delta z_{ik})$, a velocity $(v_{xik}, v_{yik}, v_{zik})$, an acceleration $(\alpha_{xik}, \alpha_{yik}, \alpha_{zik})$ of the point light source 111(#k ). The group physical quantity $\overline{P}_i$ comprises group center coordinates $(\overline{x}_i, \overline{y}_i, \overline{z}_i)$, a group average displacement $(\overline{\Delta x}_i, \overline{\Delta y}_i, \overline{\Delta z}_i)$, a group average velocity $(\overline{v}_{xi}, \overline{v}_{yi}, \overline{z}_{zi})$, and a group average acceleration $(\overline{\alpha}_{xi}, \overline{\alpha}_{yi}, \overline{\alpha}_{zi})$ defined as follows:

Group Center Coordinates:

$$\overline{x}_i = \sum_{k=1}^{N} x_{ik}/N, \ \overline{y}_i = \sum_{k=1}^{N} y_{ik}/N, \ \overline{z}_i = \sum_{k=1}^{N} z_{ik}/N \qquad (39)$$

Group Average Displacement:

$$\overline{\Delta x}_i = \sum_{k=1}^{N} \Delta x_{ik}/N, \ \overline{\Delta y}_i = \sum_{k=1}^{N} \Delta y_{ik}/N, \ \overline{\Delta z}_i = \sum_{k=1}^{N} \Delta z_{ik}/N \qquad (40)$$

Group Average Velocity $$\overline{v}_{xi} = \sum_{k=1}^{N} v_{xik}/N, \ \overline{v}_{yi} = \sum_{k=1}^{N} v_{yik}/N, \ \overline{v}_{zi} = \sum_{k=1}^{N} v_{zik}/N \qquad (41)$$

Group Average Acceleration $$\overline{a}_{xi} = \sum_{k=1}^{N} a_{xik}/N, \ \overline{a}_{yi} = \sum_{k=1}^{N} a_{yik}/N, \ \overline{a}_{zi} = \sum_{k=1}^{N} a_{zik}/N \qquad (42)$$

Where, N is the number of point light sources.

Further, the physical quantity $P_i$ of each point light source 111(#k) and the group physical quantity $\overline{P}_i$ can be used for calculating a relative physical quantity $R_i$ which is a physical quantity describing a physical status constructed between two of the point light sources or a physical status constructed between each point light source and the group center coordinates. Thus, the relative physical quantity $R_i$ can be a relative position, a relative velocity, a relative acceleration, angle, angular velocity, angular acceleration or plan vector constructed by the point light sources. If the mass of each point light source is given, other physical quantities $F_i$ including the force, torque, centripetal force, momentum and kinetic energy can be calculated also.

The signal transmission interface 146 can be a cable or a wireless transmitting device for linking the positioning calculation control microprocessor 145 with the control analysis procedure to transmit physical quantities $P_i$, $\overline{P}_i$, $R_i$, $F_i$, the visual axis angles $(\Theta_i, \Phi_i)$ and the synchronization enable signal ENABLE.

The pilot point light sources 160 is composed of a plurality of point light sources and installed and fixed at a known position of the 1D optical positioning device fixation mechanism 170, and is used for the position measurement and the visual axis angle positioning of the 1D optical positioning device 131(#i).

In FIG. 12(b), a reference coordinates system $(\vec{X}_i, \vec{Y}_i, \vec{Z}_i)$ is virtually set at an appropriate position of each 1D optical positioning device 131(#i) wherein $(X_{i0}, Y_{i0}, Y_{i0})$ is the origin coordinates of the coordinates system and $\vec{Z}_i$ axis indicates the visual axis. Since the pilot point light sources 160 are installed and fixed at known positions, therefore, the position of the origin coordinates $(X_{i0}, Y_{i0}, Y_{i0})$ and the visual axis angle $(\Theta_i, \Phi_i)$ can be obtained by the measurement of the positions of the point light sources 160.

Figure 12C:
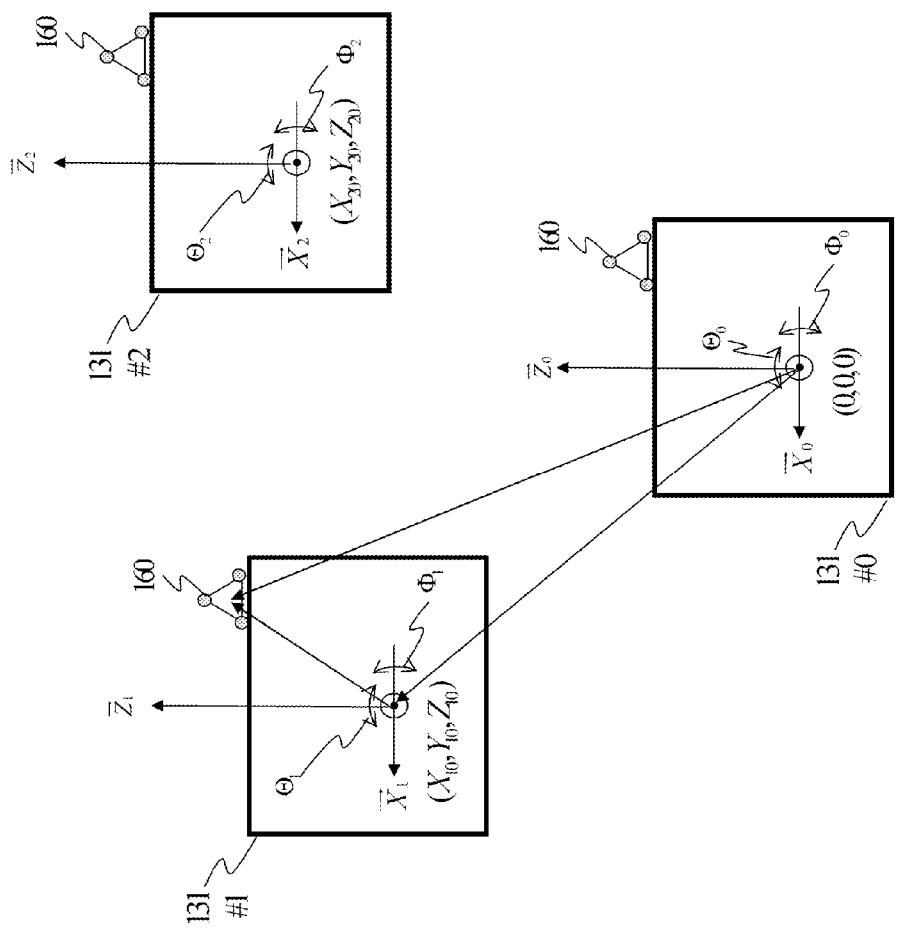
FIG. 12(c) shows a coordinate relationship between the master and client 1D optical positioning device.

With reference to FIG. 12(c), before the actual operation of all 1D optical positioning devices 131 (such as #0, #1, #2), the control analysis procedure 1-90 must select one of the 1D optical positioning devices 131 (such as #0) as a master positioning device and set $(\vec{X}_0, \vec{Y}_0, \vec{Z}_0)$ as a world coordinates system and set (0, 0, 0) as its original coordinate, while define the rest of 1D optical positioning devices 131 (such as #1,#2) as the client positioning devices. Then, the master positioning device(#0) is used to measure the position of the pilot point light sources 160 installed on the client positioning devices(#1,#2), so as to obtain the original coordinates, such as $(X_{10}, Y_{10}, Z_{10})$ and the visual axis angle, such as $(\Theta_1, \Phi_1)$ and $(\Theta_2, \Phi_2)$, of each client positioning devices(#1,#2).

With reference to FIG. 12(a), two-axis angular control devices 180 are composed of two actuators 181, two angular sensors 182 and a two-axis rotation mechanism (not shown in the figure). After receiving the angular driving signal $(\Theta_{ia}, \Phi_{ia})$, the two-axis angular control device 180 drives the two actuators 181 to rotate the two-axis rotation mechanism and the two angular sensors 182 according to the magnitude of the angular driving signal $(\Theta_{ia}, \Phi_{ia})$. While the two angular sensors 182 can output and feed back two angular electric signals $(\Theta_{is}, \Phi_{is})$ according to the magnitude of the actual rotation, so as to achieve the angular positioning effect for the two-axis rotation mechanism. Thus the two-axis rotation mechanism can rotate the 1D optical positioning device fixation mechanism 170 and change the visual axis angle $(\Theta_i, \Phi_i)$ of the 1D optical positioning device 131(#i).

With reference to FIG. 12(a), the 1D optical positioning device fixation mechanism 170 is a mechanical mechanism for installing and fixing the plurality of linear positioning sensors 132, the positioning calculation control microprocessor 145, the signal transmission interface 146, and the pilot point light sources 160, and can be connected to the two-axis rotation mechanism of the two-axis angular control device 180, so as to achieve the two-axis rotation effect.

Figure 12D:
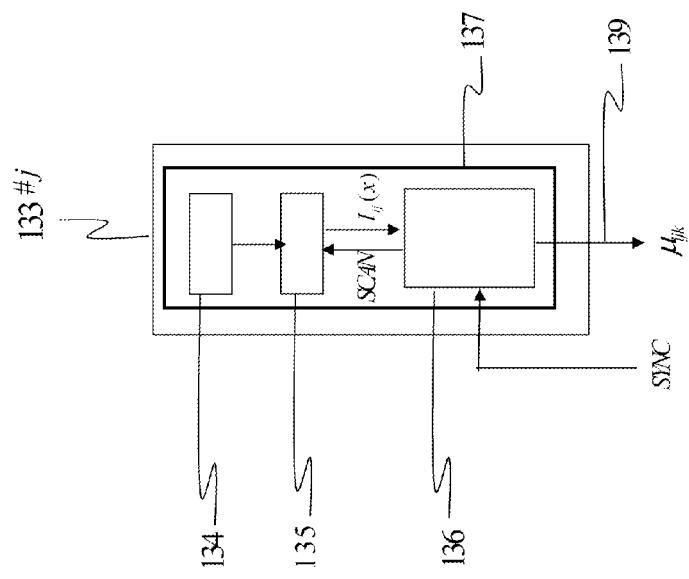
FIG. 12(d) shows the schematic view of a linear positioning sensor assembly.

With reference to FIG. 12(d) for a schematic view of an assembly of a linear positioning sensor 133(#j), the assembly comprises a 1D optical element 134, a linear optical sensor 135, a signal processing microprocessor 136, and a linear positioning sensor fixation mechanism 137.

The 1D optical element 134 is composed of a filter, a linear aperture, and 1D optical lens (not shown in the figure) for forming a line image from a point light source 112. The linear optical sensor 135 is composed of a linear optical sensor array, an electronic scan and read circuit and an analog-to-digital converter (ADC) (not shown in the figure). According to the received scanning timing signal SCAN, the electronic scan and read circuit sequentially and continuously read and output the analog voltage sensed by each photosensitive pixel, then uses the analog-to-digital converter (ADC) to convert the analog voltage and output a digital voltage. As described above, the outputted digital voltage becomes an image superposed signal $I_{ij}(x)$, wherein the subscripts i and j have the same definitions as the #i,#j.

The signal processing microprocessor 136 is connected to control the linear optical sensor 135. The signal processing microprocessor 136 starts to execute a signal processing procedure to output a scanning timing signal SCAN according to the received synchronization scan signal SYNC and read the image superposed signal $I_{ij}(x)$, so as to calculate and output the image mean position $139(\mu_{ijk})$ of all point light sources. The signal processing procedure comprises a synchronous data acquisition procedure, a dynamic background light signal elimination procedure and an image signal recognition and correspondence procedure.

According to the timing of the received synchronization scan signal SYNC, the synchronous data acquisition procedure outputs a scanning timing signal SCAN at a proper time later after the synchronization scan signal SYNC, so as to obtain and record the image superposed signal $I_{ij}(x)$ which contains the effective image signal formed by all point light sources and the dynamic background light signal.

The dynamic background light signal elimination procedure comprising an elimination procedure of time dependent ambient light interference signal and an elimination procedure of space dependent ambient light interference signal is able to reduce the dynamic background light signal from the image superposed signal $I_{ij}(x)$, so as to output an effective image signal of all point light sources.

The image signal recognition and correspondence procedure mainly utilizes a threshold comparison and/or a profile detection method to analyze and recognize the effective image signal of all point light sources and obtain the correspondence relationship. As for the profile detection method, the method uses the characteristics of the effective image signal such as the standard deviation $\sigma$, the central intensity $I_0$ and the slope of the waveform to achieve the purpose of analysis, recognition and correspondence. In addition, when the geometric modulation is adopted by the point light sources, a method of deduction and a Gaussian Fitting are used to analyze and recognize the effective image signal of all point light sources and obtain the correspondence relationship.

As for the calculating process of the image mean position, several analytic processes such as the analysis of the position of the brightest sensed pixel, the analysis of Gaussian Fitting and the analysis of statistics are applied to each analyzed and recognized effective image signal for calculating and outputting each image mean position ($\mu_{ijk}$).

Further, the linear positioning sensor fixation mechanism 137 is a mechanical mechanism for installing and fixing the 1D optical element 134, the linear optical sensor 135 and the signal processing microprocessor 136, and is installed and fixed into the 1D optical positioning device fixation mechanism 170.

With reference to FIGS. 12(e) to 12(i) for schematic views of a geometric structural relation among the 1D optical positioning device fixation mechanism 170, the linear positioning sensor fixation mechanism 137 and the pilot point light sources 160.

In FIG. 12(e), the 1D optical positioning device fixation mechanism 170 is a triangular geometric structure, preferably an equilateral triangle structure. The linear positioning sensor fixation mechanism 137 can be installed at the vertices or the middle of three sides of the triangular device 170. In other words, the relative installed positions of three linear positioning sensors133 constitute a triangular geometric structure. In addition, the linear positioning sensor 133(#j) can be set to any angle by the rotation about its optical axis. In other words, the direction of a long axis of the 1D optical lenses in three linear positioning sensors133 can be set to any angle.

The pilot point light source 160 composed of a plurality of point light sources can be installed at any position of the triangular 1D optical positioning device fixation mechanism 170, and preferably having three point light sources, and the installed position is preferably at the vertices or the middle of three sides of the triangular.

A connecting structure 171 can be installed at the vertices of the triangular 1D optical positioning device fixation mechanism 170, and the connecting structure 171 includes a structure which can connect or detach (not connect) two sides of a triangle, and can freely adjust the angle included between any two sides of the triangle. For example, the triangular geometric structure can be transformed into a linear structure.

In the improvement of the preferred embodiment as shown in FIG. 12(f), a connecting mechanism is added to the middle of any one of three sides such that an extra linear positioning sensor is installed and the extra linear positioning sensor is installed at the center of the triangle.

With reference to FIG. 12(g) for another improvement of the foregoing embodiment, the triangular geometric structure is changed to a quadrilateral geometric structure, preferably an equilateral quadrilateral structure, and the number of installed linear positioning sensors is increased to four.

With reference to FIG. 12(h) for another improvement of the foregoing embodiment, the triangular geometric structure is changed to a pentagonal geometric structure, preferably an equilateral pentagon, and the number of installed linear positioning sensor is increased to five.

With reference to FIG. 12(i) for another improvement of the foregoing embodiment, the triangular geometric structure is changed to a hexagonal geometric structure, preferably an equilateral hexagon structure, and the number of installed linear positioning sensor is increased to six. Of course, such structure can be expanded to a n-sided polygonal geometric structure.

Figure 12J:
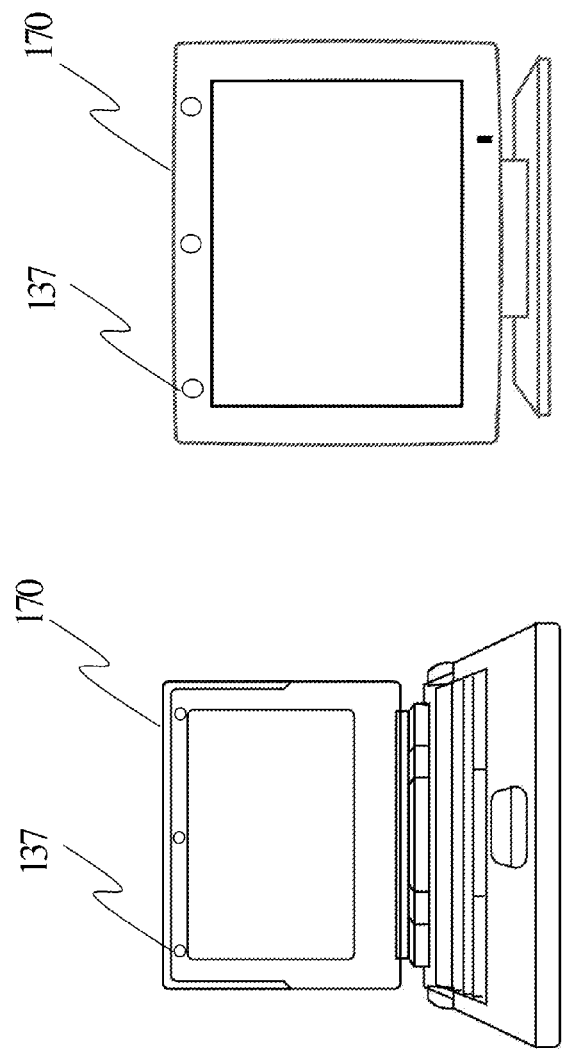
FIGS. 12(j) shows the casing of other conventional device for the installation of the linear positioning sensor fixation mechanism.

In FIG. 12(j), the 1D optical positioning device fixation mechanism 170 can be a casing of other conventional devices such as a notebook computer, a video game player, a PDA, a mobile phone, a liquid crystal display, a plasma display, a television, a projector, an optical camera, an optical camcorder, an optical telescope, an automobile or a motorcycle (the figure only shows the casings of a notebook computer and a liquid crystal display). In the present invention, the plurality of linear positioning sensors 132, a positioning calculation control microprocessor 145, a signal transmission interface 146 and the pilot point light sources 160 can be installed on the casing of the aforementioned conventional devices to achieve the effects of a 3D position measurement, a virtual input, or a simulator.

Figure 13A:
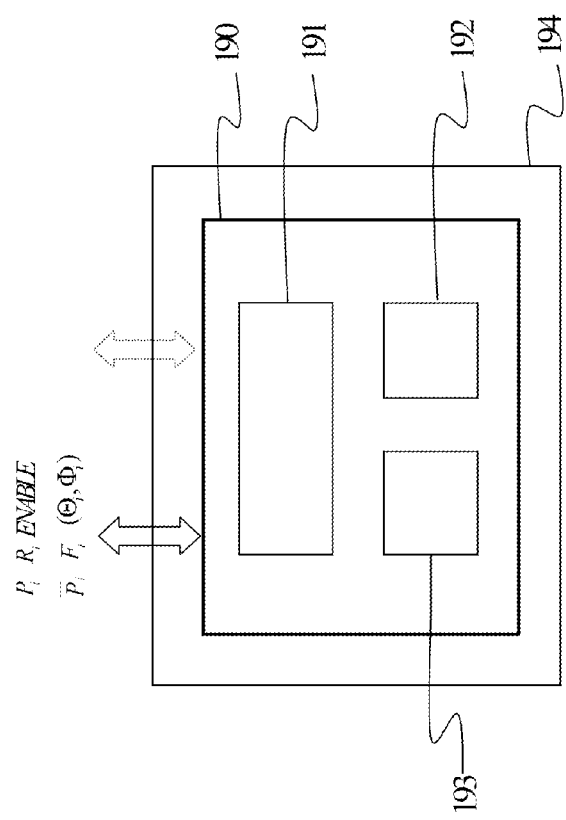
FIG. 13(a) shows a schematic view of a control analysis procedure.

With reference to FIG. 13(a) for a schematic view of a control analysis procedure, the control analysis procedure is a software procedure and comprises an coordinate alignment and synchronization calibration procedure 191, a device simulated input procedure 192 and simulator procedure 193. The control analysis procedure can be integrated and installed in other devices 194 such as a personal computer, a notebook computer, a PDA, a mobile phone, or a video game player and a video playing and a converting equipment (DVD or STB), and uses an electronic system such as a microprocessor in the mentioned device 194 to execute three procedures.

Figure 13B:
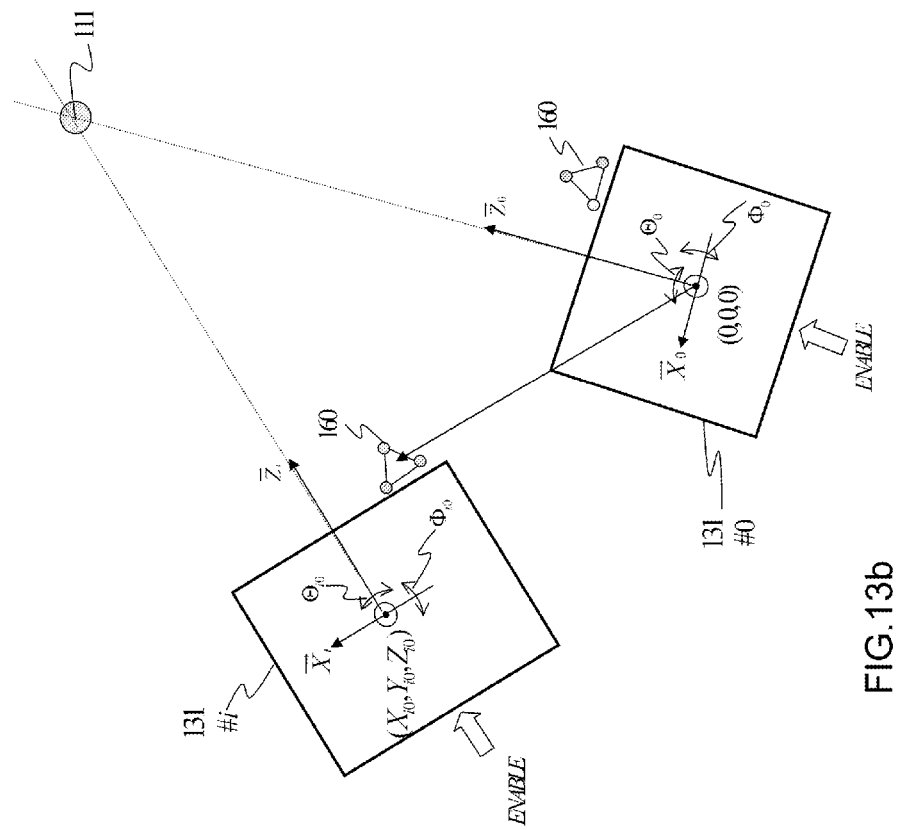
FIG. 13(b) shows a schematic view of a coordinate alignment and synchronization calibration procedure.

With reference to FIG. 13(b) for a schematic view of a coordinate alignment and synchronization calibration procedure, the procedure 191 comprise a visual axis reset procedure, a coordinate transformation setting procedure and a synchronous timing calibration procedure, so as to obtain the coordinate transformation relationship between each 1D optical positioning device, and compensate the positioning error caused by the coordinate transformation, and correct the error of synchronous timing.

By utilizing the visual axis control procedure installed in the 1D optical positioning device 131 with a visual axis tracking function, the visual axis reset procedure can point the visual axes of 1D optical positioning device 131 all at a positioning point light source 111 and thus set the angles of each visual axes at zero degree, i.e. ($\Theta_i=0,\Phi_i=0$). The coordinate transformation setting procedure selects one of the 1D optical positioning device 131 as a master positioning device 131(#0) and selects the others as client positioning devices 131(#i). In such a way that the mater positioning device(#0) measures the position of the positioning point light source 111 and each pilot point light sources 160 of all client positioning devices(#i), and each client positioning device(#i) measures the position of the positioning point light source 111, the coordinate transformation relationship between the master positioning device(#0) and the client positioning devices(#i) and the compensation of the positioning error are obtained. In addition, the synchronous timing calibration procedure periodically outputs a synchronization enable signal ENABLE in a proper cycle of time interval, such that all positioning device 131 can be calibrated to execute the positioning calculation and control procedure synchronously.

In addition, in FIG. 13(a), the device simulated input procedure 192, mainly comprising a procedure of virtual operating screen correspondence, a procedure of virtual device geometric structure definition and operating fingers correspondence and a procedure of operating gestures definition and recognition, simulates and recognizes the operation of a hand or fingers required by a physical input device, so as to achieve the virtual input effect.

As to a physical operating screen with an actual dimensions, the procedure of virtual operating screen correspondence defines a virtual operating screen at any position in the space. The virtual operating screen has a spatial corresponding relationship with the physical operating screen, and the relationship is a one-to-one corresponding relation such as a magnifying corresponding relation, an equivalent corresponding relation and a shrinking corresponding relation. In addition, by taking the advantage of virtual reality technology, the virtual operating screen can be visually displayed as a virtual stereo image.

As to a physical input device, the procedure of virtual device geometric structure definition and operating fingers correspondence defines a geometric structure of a virtual device, a physical position and size of the virtual function keys and the physical motion of the virtual function keys; and corresponds the operating fingers to the virtual function keys. In addition, by taking the advantage of virtual reality technology, the geometric structure of the virtual device and operating fingers can be visually displayed as a virtual stereo image.

According to the physical motion of the virtual function keys, the procedure of operating gestures definition and recognition defines the physical movement quantities of the operating fingers. The physical movement quantities are a set of consecutive time dependent physical quantities. The set of physical quantities contains the physical quantities, group physical quantities, relative physical quantities and other physical quantities of all point light sources. According to these predefined physical quantities, the gestures of operating fingers can be recognized by measuring and analyzing the motion of point light sources installed on the fingers, so as to achieve the device simulated input purpose.

With reference to FIG. 13(a), the simulator procedure 193 measures the positions of those point light sources installed on a physical object in real time, so as to calculate the trajectory and physical movement quantities of the physical object. In addition, taking the advantage of a virtual image and physical laws, the physical object (such as a racket) and a virtual image (such as a ball) can do an interaction (such as striking the ball) in a lively and natural way, so as to achieve the simulation purpose of sports, shooting, driving and flying.

Further, the simulator procedure 193 measures the positions of those point light sources installed on a physical object in real time, so as to calculate the trajectory and physical movement quantities of the physical object. In addition, taking the advantage of virtual reality technology, a virtual object is defined in the virtual space and its motion is corresponded to the motion of the physical object (such as a racket). In conformity with the physical laws, the virtual object is able to interact with other virtual object (such as a ball) in a lively and natural way (such as striking the ball), so as to achieve the simulating purpose of sports, shooting, driving and flying.

Figure 14:
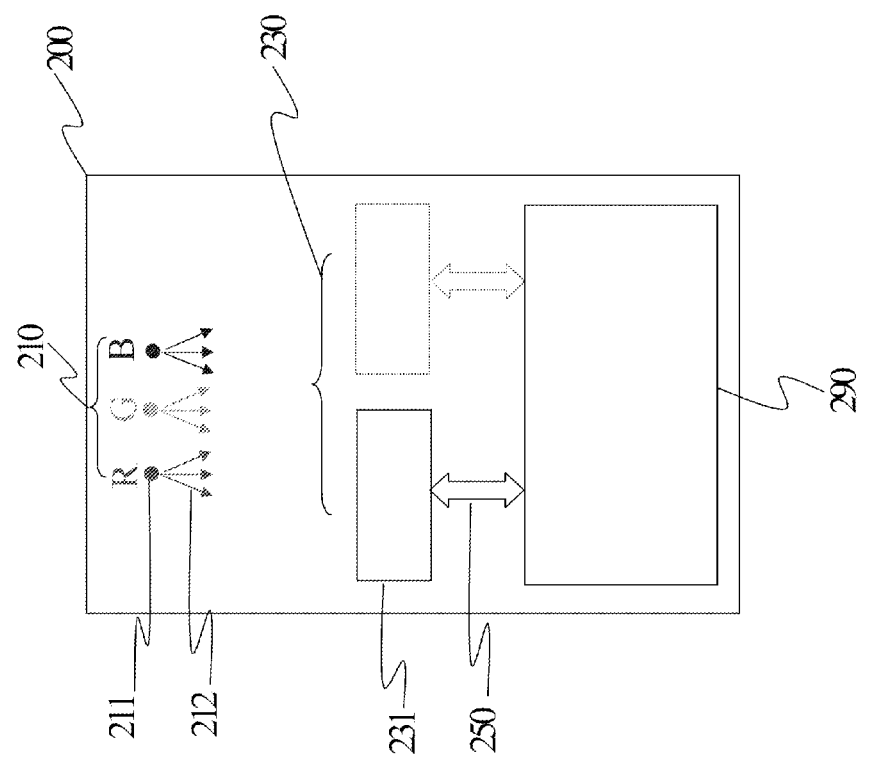
FIG. 14 shows the schematic view of the second preferred embodiment in the present invention.

With reference to FIG. 14 for a schematic view of a second preferred embodiment, as for the unique characteristic of the point light sources, a device 200 of the second preferred embodiment mainly adopts the wavelength modulation method and has a same system structure as the one disclosed in the first preferred embodiment. Only the difference is described as follow.

The device 200 in the present embodiment mainly comprises a plurality of point light sources with unique wavelength 210, a plurality of 1D optical positioning devices with a visual axis tracking function 230 and a control analysis procedure 290. For clear illustration, R, G and B are used as an example to illustrate the unique characteristic of wavelength for the point light source 211.

The difference is described as follow:

(1) As for the plurality of point light sources with unique wavelength 210, each point light source has a different light emitting wavelength and all point light sources emit light simultaneously and continuously (refer to the above descriptions related to FIG. 5(d)).

(2) As for the linear optical sensor (not shown in the figure), which is installed in the linear positioning sensor in each 1D optical positioning devices with a visual axis tracking function 231, is composed of one or a plurality of 1D color optical sensor arrays or a 2D color optical sensor array. Different color filters are attached onto the photosensitive pixels of 1D or 2D color optical sensor array and used to filter and separate those multiple point light sources with different emitting wavelengths. Namely, each color filter allows its corresponding point light source to transmit but block out non-corresponding point light sources (refer to the above descriptions related to FIG. 5(e), FIG. 5(f) and FIG. 5(g)).

In addition, according to the unique characteristics, the composition of the unique characteristics of the plurality of point light sources can be a combination of the uniqueness of intensity, geometric size and wavelength. In other words, such a combination is an application integrated by the first and second embodiment. For instance, as to three sets of point light sources, each set of point light sources is composed of a plurality of point light sources; and as to the composition of the unique characteristics, each set has the unique wavelength characteristics (such R, G, B wavelength), while each point light source in each set may have the unique intensity characteristics or unique geometric size characteristics. Principle and effect of such combination has been disclosed in the above description and it is no necessary to repeat it again.

Figure 15A:
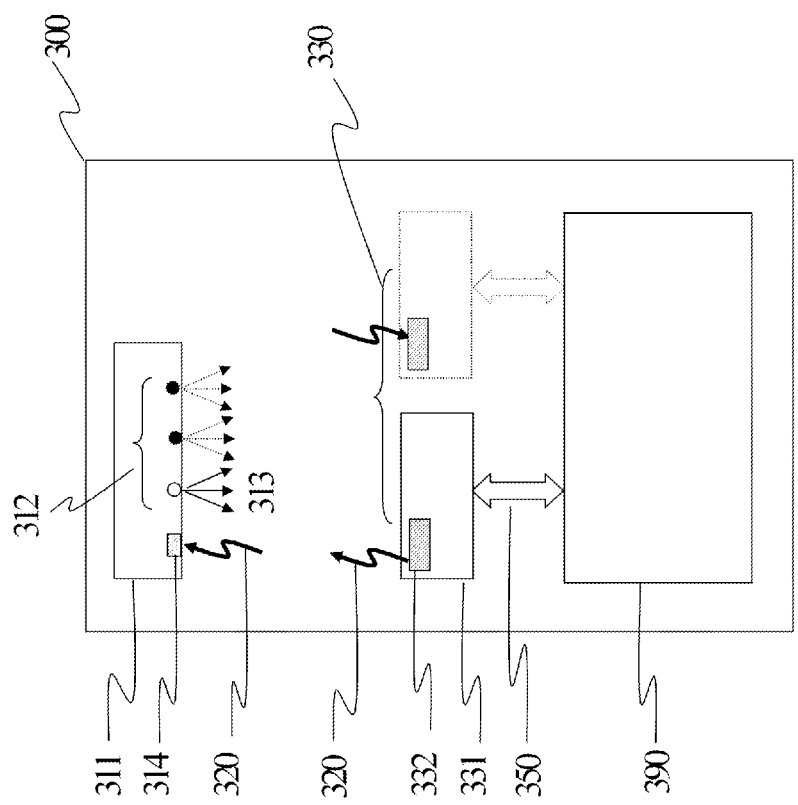
FIG. 15(a) shows the schematic view of the third preferred embodiment in the present invention.

With reference to FIG. 15(a) for a schematic view of the third preferred embodiment, as for the unique characteristics of the point light sources, the present embodiment mainly adopts an improved method of a time modulation, namely Master/Client Wireless Synchronization Method, and has a same system structure as the one disclosed in the first preferred embodiment. Only the difference is described as follow.

The device 300 in the present embodiment mainly comprises a module device of multiple point light sources 311, a plurality of 1D optical positioning devices with a visual axis tracking function 330 and a control analysis procedure 390. For the clear illustration, a white circle is used as an example to illustrate the unique characteristic of emitting time for the point light sources 312.

The difference is described as follow:

(1) The point light sources 312 in the module device of multiple point light sources 311 receives a coded RF synchronous signal 320, whereby each point light source alternately emits a point-like scattering light 313 at the different time.

(2) Each 1D optical positioning devices 331 in 1D optical positioning devices with a visual axis tracking function 330 mainly emits or receives a coded RF synchronous signal 320, and receives the scattering light 313 emitted by the point light sources, so as to analyze, calculate and output the physical quantities 350 of all point light sources 312.

Figure 15C:
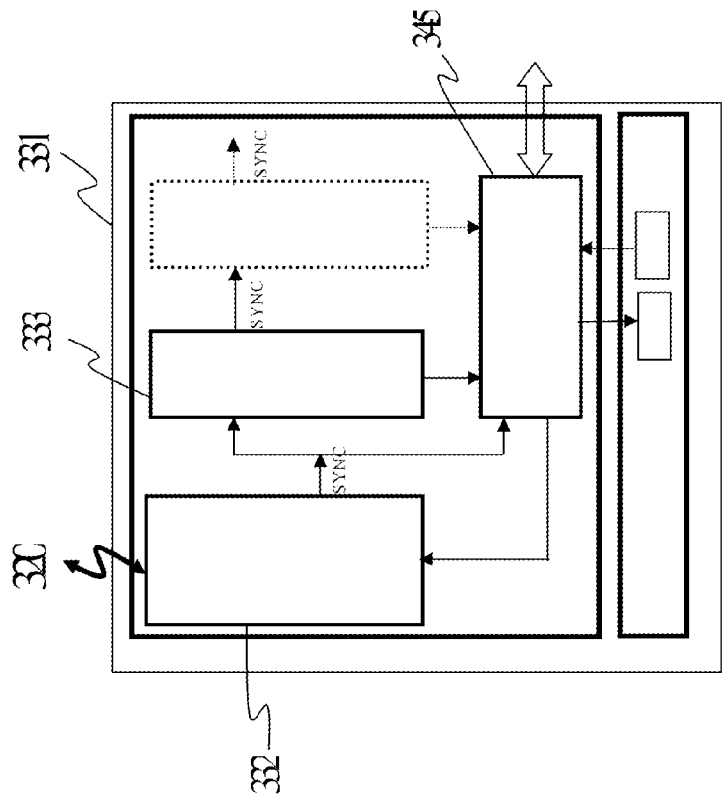
FIG. 15(c) shows the schematic view of a 1D optical positioning devices with visual axis tracking function in the third embodiment.
Figure 15B:
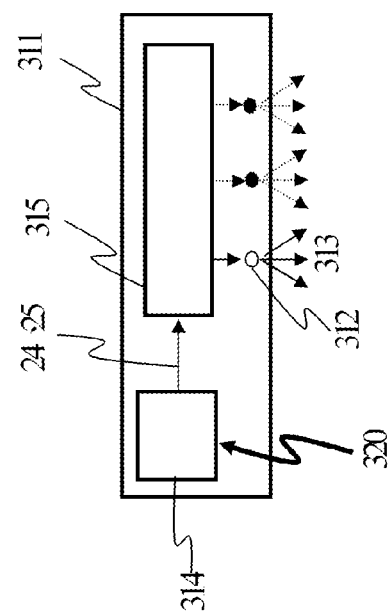
FIG. 15(b) shows the schematic view of a module device of multiple point light sources in the third embodiment.

With reference to FIG. 15(b) for a schematic view of a module device of multiple point light sources, the module device 311 comprises a RF receiver 314, a switch 315 and a plurality of point light sources. The RF receiver 314 comprises a RF antenna, a RF demodulator and decoder (not shown in the figure), and receives the coded RF synchronous signal 320, so as to analyzes and outputs an encoding signal 24 and a synchronous signal 25 (refer to FIG. 4(d)). According to the received encoding signal 24 and a synchronous signal 25, the switch 315 continuously and alternately lights each point light sources 312, so as to achieve the effect of time modulation.

With reference to FIG. 15(c) for a schematic view of a 1D optical positioning devices with a visual axis tracking function, being different from the composition in the first embodiment, the 1D optical positioning devices 331 comprises one more RF transmitter 332 for emitting or receiving the coded RF synchronous signal 320 which is generated by the positioning calculation control microprocessor 345. The encoding signal in the coded RF synchronous signal 320 can be composed of a group of binary codes, a square wave with specific time duration, or a specific number of pulses. If the 1D optical positioning devices 331 is selected as a master device, then the RF transmitter 332 is used to emit the coded RF synchronous signal 320. If the 1D optical positioning devices 331 is selected as a client device, then the RF transmitter 332 is used to receive the coded RF synchronous signal 320 and also produces a synchronization scan signal SYNC to synchronously drive all linear optical sensors, so as to obtain the image signal of the uniquely lit point light source.

Figure 16:
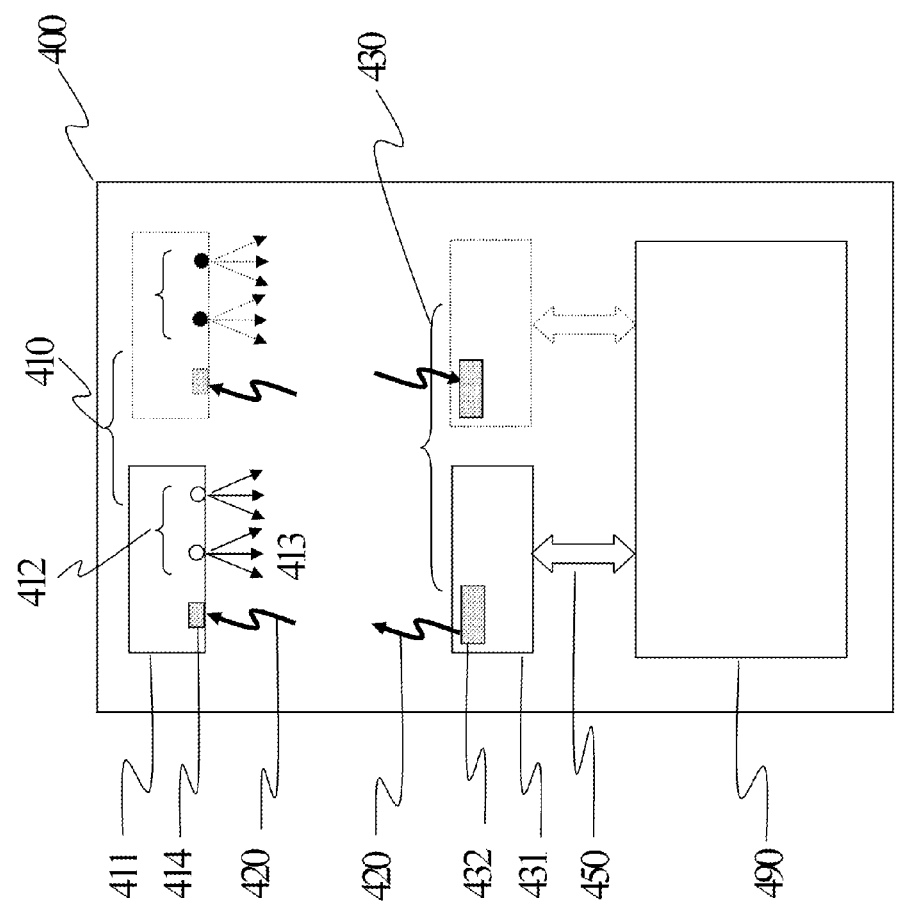
FIG. 16 shows the schematic view of the fourth preferred embodiment in the present invention.

FIG. 16 shows the schematic view of the fourth preferred embodiment of the present invention.

The fourth embodiment adopts an improved method which is an integration of the first, second and third embodiment, namely is an application that combines the uniqueness of intensity, geometric size, wavelength and time, and has a same system structure as the one disclosed in the first preferred embodiment. Only the difference is described as follow. For the clear illustration, the white circles are used as an example to illustrate the unique characteristic of emitting time for the module device of point light sources 411.

The device 400 in the present embodiment mainly comprises a plurality of module devices with multiple point light sources 410, a plurality of 1D optical positioning devices with a visual axis tracking function 430 and a control analysis procedure 490.

The difference is described as follow:

(1) Each module device with multiple point light sources 411 in the plurality of module devices 410 comprises a RF receiver 414, a switch (not shown in the figure) and a plurality of point light sources 412. The unique characteristics of the plurality of point light sources 412 can be the unique intensity, the unique geometric size or the unique wavelength. The RF receiver 414 receives the coded RF synchronous signal 420, so as to simultaneously light up all point light sources 412 for emitting a point-like scattering light source with unique characteristic 413. In addition, the coded RF synchronous signal 420 comprises an encoding signal and a synchronous signal (not shown in the figure). The encoding signal represents the number of a module device to be lit, and the synchronous signal represents the timing of the point light sources 412 to be lit. Namely, each module device 411 has a unique characteristic of time. By utilizing the RF receiver 414, the encoding signal and the synchronous signal can be separated and decoded to alternately light up each module device 411 at a different time.

(2) Each 1D optical positioning devices 431 in the plurality of 1D optical positioning devices with a visual axis tracking function 430 is mainly able to emit or receive a coded RF synchronous signal 420 and synchronously receive the scattering light source 413 emitted by the point light sources 412, so as to calculate and output the physical quantities 450 of all point light sources 412.

Figure 17:
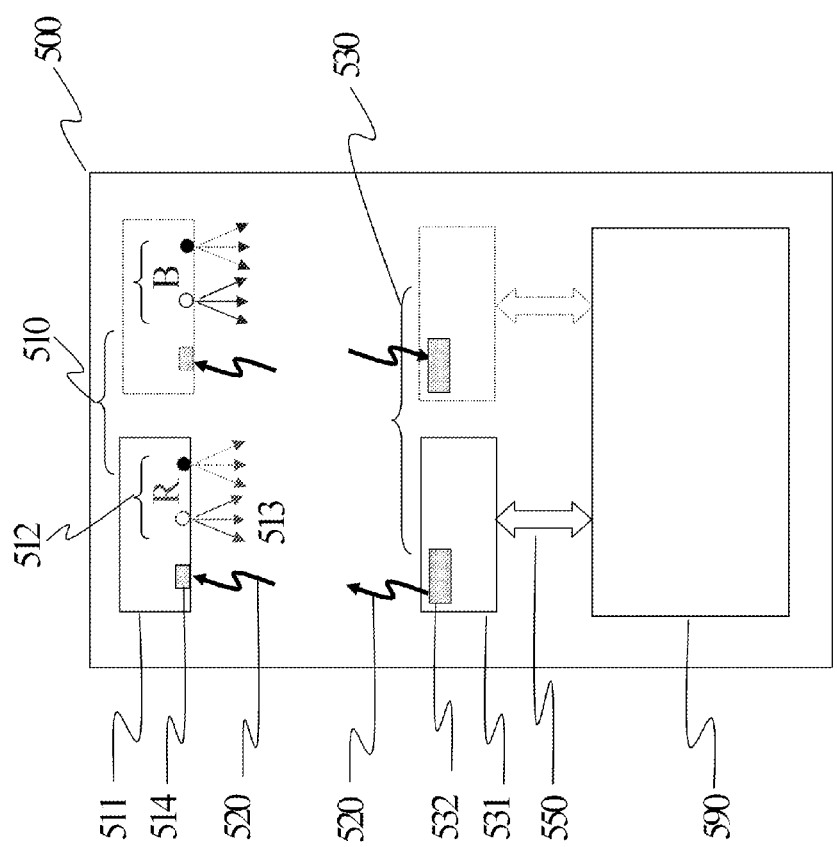
FIG. 17 shows the schematic view of the fifth preferred embodiment in the present invention

FIG. 17 shows the schematic view of the fifth preferred embodiment of the present invention.

The fifth embodiment is an integration of the second and third embodiment, namely, is an application that combines the uniqueness of wavelength and time, and has a same system structure as the one disclosed in the fourth preferred embodiment. Only the difference is described as follow.

The device 500 in the present embodiment mainly comprises a plurality of module devices with multiple point light sources 510, a plurality of 1D optical positioning devices with a visual axis tracking function 530 and a control analysis procedure 590. For the clear illustration, the white circle is used as an example to illustrate the unique characteristic of emitting time of the point light sources 512 in the module device 511 and R, B are used as an example to illustrate the unique characteristic of wavelength for the module device 511.

The difference is described as follow:

(1) Each module device with multiple point light sources 511 comprises a RF receiver 514, a switch (not shown in the figure) and a plurality of point light sources 512, and has a unique characteristic of wavelength, namely all point light sources 512 in the same module device 511 have the same emitting wavelength. After the RF receiver 514 receives the coded RF synchronous signal 520, all module devices 511 synchronously light one of the point light sources in the module device and let all point light sources in the same module device can be lit alternately. In other words, as to all point light sources 512 in the module device 511, each point light source has the uniqueness of time and is lit alternately, while as to all module device 511, each module device has a uniqueness of wavelength and are lit synchronously. In addition, the coded RF synchronous signal 520 comprises an encoding signal and a synchronous signal (not shown in the figure). The encoding signal represents the number of a point light source in the module device 511 to be lit, and the synchronous signal represents the timing of the point light sources 512 to be lit. By utilizing the RF receiver 514, the encoding signal and the synchronous signal can be separated and decoded to alternately light each point light source 512 in all module device 511.

(2) Each 1D optical positioning devices 531 in the plurality of 1D optical positioning devices with a visual axis tracking function 530 is mainly able to emit or receive a coded RF synchronous signal 520 and synchronously receives the scattering light source 513 emitted by the point light sources 512, so as to calculate and output the physical quantities 550 of all point light sources 512.

Figure 18:
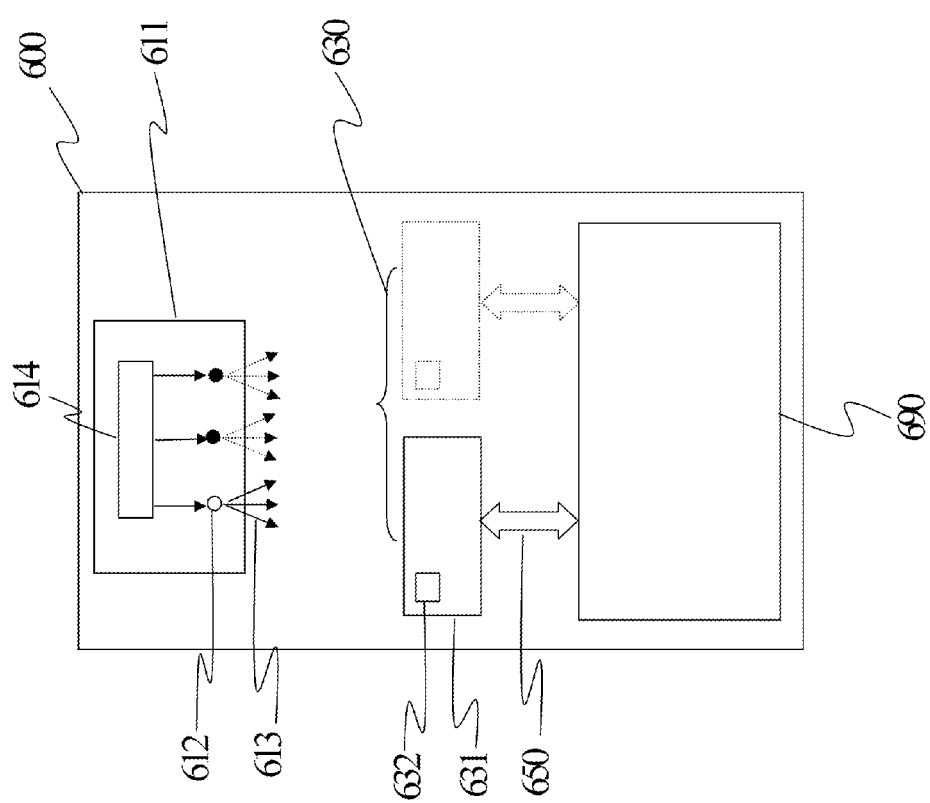
FIG. 18 shows the schematic view of the sixth preferred embodiment in the present invention.

FIG. 18 shows the schematic view of the sixth preferred embodiment of the present invention.

As for the unique characteristics of the point light sources, the sixth embodiment adopts another improved time modulation method, namely the aforementioned the improved Stephenson's method, and has a same system structure as the one disclosed in the first preferred embodiment. Only the difference is described as follow.

The device 600 in the present embodiment mainly comprises a module device of multiple point light sources 611, a plurality of 1D optical positioning devices with a visual axis tracking function 630 and a control analysis procedure 690.

The difference is described as follow:

(1) One more switch 614 is installed in the module device of multiple point light sources 611, and is used to continuously and alternately light the point light sources 612 for emitting a point-like scattering light source 613 at a constant period.

(2) An optical receiver 632 installed in each 1D optical positioning devices 631 is used to receive the light sources 613 emitted by the point light sources 612 and output a lighting timing signal of the point light sources 612 (refer to the above descriptions related to FIG. 4(*c*)). The positioning calculation control microprocessor (not shown in the figure) in the 1D optical positioning devices 631 is used to receive the lighting timing signal at a proper time and thus measure the period of the continuous and alternate lighting timing of the point light sources 612, and synchronously generate a synchronization scan signal SYNC with the same period, so as to synchronously drive all linear optical sensors to scan and read the image superposed signals.

The basic arts, system configurations and applications have been disclosed in the present invention and brief conclusions are given as follow:
1. Processing Art of Unique Characteristics of Point Light Source, includes:
   (1) Processing Art of Intensity Modulation Method;
   (2) Processing Art of Geometric Modulation Method;
   (3) Processing Art of Wavelength Modulation Method;
   (4) Art of Master/Client Wireless Synchronization Method;
   (5) Art of Improved Stephenson's Method;
2. Eliminating Art of Dynamic Background Light Interference, includes:
   (1) Real Time Eliminating Art of Time Dependent Ambient Light Interference Signal;
   (2) Approximated Real Time Eliminating Art of Time Dependent Ambient Light Interference Signal;
   (3) Eliminating Art of Space Dependent Ambient Light Interference Signal (Method of Fourier Signal Process);
3. Art of Data Process, includes:
   (1) Art of Profile Detection Method;
   (2) Art of Spatial Resolution Calculation;
   (3) Art of Mean Position Calculation;
4. Art of System Configurations Extension, includes:
   (1) Art of Blind Spot Compensation;
   (2) Art of Viewing Angle Expansion;
   (3) Art of Visual Axis Tracking;
   (4) Art of Coordinate Alignment and Synchronization calibration;
5. Art of System Applications Extension, includes:
   (1) Art of Virtual Input Applications;
   (2) Art of Simulator Applications;

In view of the above disclosed basic arts, system configurations, applications and embodiments in the present invention, although the all related description is dedicated in 1D optical system, the aforementioned basic arts, system configurations and applications are also available for 2D optical system which adopts the 2D lens and 2D optical sensor array. Such as the positioning coordinate calculation of the point light sources, the elimination of the dynamic background light interference, the process of data and the number of the used optical sensor are the primary differences between 1D and 2D system. As for the positioning coordinate calculation for 2D optical system, the details have been disclosed in R.O.C. Pat. Application No.: 096108692 and it is no necessary to describe it again. In addition, as for the elimination of the dynamic background light interference and the process of data, the necessary process and calculation can be extended from 1D to 2D by using the same analytic logics. As for the number of the used optical sensor, the least number used in 1D optical system is three, while the least number used in 2D optical system is two.

What is claimed is:

1. A three-dimensional virtual input and simulation apparatus, comprising:
   a plurality of point light sources, wherein each point light source is capable of simultaneously and continuously emitting a point light source which is scattered;
   a plurality of 1D optical positioning devices, wherein each 1D optical positioning device having a visual axis tracking function receives a synchronization enable signal and all scattered light sources simultaneously emitted by the point light sources for measuring the 3D positions of all point light sources and outputting a set of physical quantities, and wherein each 1D optical positioning devices is equipped with a visual axis tracking function for automatically tracking the central group coordinate of all point light sources and the coordinate of one of the point light sources and outputting a visual axis angle of its own visual axis so as to achieve the visual axis tracking purpose, and each 1D optical positioning devices further is equipped with a visual axis positioning function to receive a visual axis angle for setting the angular direction of its own visual axis, so as to achieve the visual axis positioning purpose; and
   a control analysis unit, having a control analysis procedure being a software procedure, mainly used to connect and control all 1D optical positioning devices, wherein the control analysis unit outputs a synchronization enable signal for synchronously starting all 1D optical positioning devices to do the 3D position measurement, also outputs a set of visual axis angles for setting the angular direction of visual axis of each 1D optical positioning devices, so as to achieve the visual axis positioning purpose for all 1D optical positioning devices, and further receives all physical quantities and a set of a visual axis angles for simulating an input function of a physical input device, so as to achieve the virtual input purpose, and also simulates the motion of a physical object, so as to achieve the purpose of simulator;
   wherein the single 1D optical positioning devices with a visual axis tracking function comprises:
   a plurality of linear positioning sensors, wherein each linear positioning sensor receives a synchronization scan signal and simultaneously receives all scattering light sources emitted by the point light sources for calculating and outputting the image mean positions of all point light sources;
   a positioning calculation control microprocessor, having a positioning calculation and control procedure, connected to control all linear positioning sensors and the two-axis angular control device and mainly receiving the synchronization enable signal, all image mean positions, a visual axis angle and two feedback angular electric signals so as to calculate and output a synchronization scan signal, a set of physical quantities, a visual axis angle and two angular driving signals;
   a signal transmission interface, being a wire or a wireless transmitting device, for transmitting a set of physical quantities, a visual axis angle and a synchronization enable signal;
   a group of pilot point light sources, being composed of a plurality of point light sources and installed and fixed at known positions of the 1D optical positioning device fixation mechanism, for being used for the position measurement and the visual axis angle positioning of the 1D optical positioning device;
   a 1D optical positioning device fixation mechanism, being a mechanical structure, for installing and fixing the plurality of linear positioning sensors, the positioning calculation control microprocessor, the signal transmission interface and the group of pilot point light sources, and connecting to the two-axis rotation mechanism in the two-axis angular control device to achieve a two-axis rotation effect; and
   a two-axis angular control device, being composed of two actuators, two angular sensors and a two-axis rotation mechanism, for receiving two angular driving signals, whereby driving the two actuators to rotate the two-axis rotation mechanism and the two angular sensors according to the magnitude of the angular driving signal, the two angular sensors outputting two angular electric signals as feedback signals according to the magnitude of the actual rotation, so as to achieve the angular positioning effect for the two-axis rotation mechanism, and the two-axis rotation mechanism rotating the 1D optical positioning device fixation mechanism, so as to change the visual axis angle of the 1D optical positioning device.

2. Three-dimensional virtual input and simulation apparatus of claim 1, wherein the each point light source has a unique characteristic of light intensity, and preferably has a light emission with an equal light emitting radius but a different light emitting intensity.

3. Three-dimensional virtual input and simulation apparatus of claim 1, wherein the each point light source has a unique characteristic of geometric size, and preferably has a light emission with a different light emitting radius but an equal light emitting intensity.

4. Three-dimensional virtual input and simulation apparatus of claim 1, wherein each point light source in the plurality of point light sources has a unique characteristic of wavelength, preferably has a light emission with a different light emitting wavelength, and each wavelength is not overlapped.

5. Three-dimensional virtual input and simulation apparatus of claim 4, wherein the number of the plurality of point light sources is three, and the light emitting wavelength of each point light source are the red, green and blue light.

6. Three-dimensional virtual input and simulation apparatus of claim 1, wherein the composed unique characteristics of the plurality of point light sources is a combination of light intensity, geometric size and wavelength.

7. Three-dimensional virtual input and simulation apparatus of claim 1, wherein the single point light source comprises:
a light scattering component, being an object capable of uniformly scattering an incident light along all angular directions;
a light emitting source, being composed of one or multiple LED or semiconductor laser diodes, for emitting the visible light or non-visible light;
an electronic control circuit, including a power switch and a circuit of a constant current source, for providing the function of a power switch and a constant current source which is supplied to the light emitting source for obtaining a specific and stable brightness of the light emission;
a battery, for supplying an electric power to the light emitting source and the electronic control circuit;
a point light source fixation mechanism, being a mechanical mechanism, for installing and fixing the light scattering component, the light emitting source, the electronic control circuit and the battery; and
a device fixation mechanism, being a mechanical mechanism, for attaching and fixing the point light source fixation mechanism onto an object.

8. Three-dimensional virtual input and simulation apparatus of claim 7, wherein the light scattering component is comprised of a transparent optical guide material and a scattering material, the transparent optical guide material is a geometric shape, and is made of transparent material, the scattering material is installed inside the transparent optical guide material and the scattering material is a randomly distributed powder with a light reflecting capability, or a randomly distributed transparent powder, or a randomly distributed tiny air bubbles, or a smaller and transparent ball, further, a position located near the transparent optical guide material has a light incident window with a predefined size and shape for allowing the incident light emitted from the light emitting source to enter the transparent optical guide material through a angle.

9. Three-dimensional virtual input and simulation apparatus of claim 7, wherein the light emitting source further uses an optical bandpass filter to generate a light source with a specific wavelength.

10. Three-dimensional virtual input and simulation apparatus of claim 7, wherein the device fixation mechanism is attached to one of a set of the fingers of a hand, a forehead of a head, an instep of a foot, a racket-shaped object, a rod-shaped object, a stick-shaped object, a glove-shaped object, a spherical object, a toy, a remote control toy, a joystick, and a remote control of a home video game player.

11. Three-dimensional virtual input and simulation apparatus of claim 1, wherein the single linear positioning sensor comprises:
a 1D optical element, comprising a filter, a linear aperture, and 1D optical lens;
a linear optical sensor, comprising a linear optical sensor array, an electronic scan and read circuit and an analog-to-digital converter, the electronic scan and read circuit sequentially and continuously reading and outputting an analog voltage sensed by each photosensitive pixel of the linear optical sensor array according to the received scanning timing signal, the analog-to-digital converter converting the analog voltage and outputting a digital voltage which is the image superposed signal;
a signal processing microprocessor, being connected to control the linear optical sensor, for receiving the synchronization scan signal to start the execution of a signal processing procedure which outputs a scanning timing signal and reads the image superposed signal, so as to calculate and output the image mean position of all point light sources; and
a linear positioning sensor fixation mechanism, being a mechanical structure, for installing and fixing the 1D optical element, the linear optical sensor and the signal processing microprocessor, and being installed and fixed in the 1D optical positioning device fixation mechanism.

12. Three-dimensional virtual input and simulation apparatus of claim 11, wherein the linear optical sensor is composed of a linear color optical sensor array, an electronic scan and read circuit and an analog-to-digital converter, each photosensitive pixel of the linear color optical sensor array installs a proper color filter, and the preferable color filters are R, G, and B color filters.

13. Three-dimensional virtual input and simulation apparatus of claim 11, wherein the linear optical sensor comprises a plurality of linear color optical sensor array, an electronic scan and read circuit and an analog-to-digital converter, all photosensitive pixels in each linear color optical sensor array install a proper color filter, and the preferable color filters are R, G, and B color filters.

14. Three-dimensional virtual input and simulation apparatus of claim 11, wherein the linear optical sensor comprises a 2D color optical sensor array, an electronic random access circuit and an analog-to-digital converter, the 2D color optical sensor array comprises a plurality of linear color optical sensor arrays, the color filters are arranged in a way that each photosensitive pixel of each linear color optical sensor array installs a proper color filter, preferably R, G, and B color filters, or all photosensitive pixels in each linear color optical sensor array install a proper color filter, preferably R, G, and B color filters, the electronic random access circuit comprises a microprocessor, a row decoder and a column decoder for reading a pixel directly and randomly.

15. Three-dimensional virtual input and simulation apparatus of claim 11, wherein the signal processing procedure comprises:
- a synchronous data acquisition procedure, for receiving the synchronization scan signal, whereby outputting a scanning timing signal at a proper time, so as to obtain and record the image superposed signal which includes the effective image signal formed by all point light sources and the dynamic background light signal;
- a dynamic background light signal elimination procedure, comprising an elimination procedure of time dependent ambient light interference signal and an elimination procedure of space dependent ambient light interference signal, and being able to eliminate the dynamic background light signal from the image superposed signal, so as to output an effective image signal of all point light sources;
- an image signal recognition and correspondence procedure, mainly utilizing a threshold comparison and/or a profile detection method to analyze and recognize the effective image signal of all point light sources and obtain the correspondence relationship, the profile detection method using the characteristics of the effective image signal, such as the standard deviation, the central intensity and the slope of the waveform, to achieve the purpose of analysis, recognition and correspondence, further, when adopting the geometric modulation method, a method of deduction and a Gaussian Fitting being used to analyze and recognize the effective image signal of all point light sources and obtain the correspondence relationship; and
- an image mean position calculation procedure, for applying several analytic processes such as the analysis of the position of the brightest sensed pixel, the analysis of Gaussian Fitting and the analysis of statistics to each analyzed and recognized effective image signal for calculating and outputting each image mean position.

16. Three-dimensional virtual input and simulation apparatus of claim 15, wherein the dynamic background light signal elimination procedure is a hardware method which uses one more noise measurement 1D optical sensor, by utilizing the same scanning timing used by the 1D optical sensor and a proper signal amplification, the noise measurement 1D optical sensor obtains the dynamic background light signal independently, thus the dynamic background light signal is subtracted from the image superposed signal, so as to achieve the purpose of the elimination of the dynamic background light signal, a proper optical filter attached to the linear optical sensor array in the noise measurement linear optical sensor is used to block out the light sources emitted by the point light sources but transmit the background light sources.

17. Three-dimensional virtual input and simulation apparatus of claim 15, wherein the elimination procedure of time dependent ambient light interference signal is a software method which applies a mathematic subtraction process to the two consecutively obtained image superposed signals, so as to achieve the purpose of eliminating the dynamic background light signal.

18. Three-dimensional virtual input and simulation apparatus of claim 15, wherein the elimination procedure of space dependent ambient light interference signal is a Fourier signal process, the Fourier signal process first applies a Fourier transformation to the data obtained by the elimination procedure of time dependent ambient light interference signal, then applies a bandpass filtering process to the transformed data for reducing the unnecessary frequencies and amplifying the signal in the frequency domain, and finally applies an inverse Fourier transformation to the processed data in the frequency domain, so as to achieve the purpose of eliminating the space dependent ambient light interference.

19. Three-dimensional virtual input and simulation apparatus of claim 1, wherein the positioning calculation and control procedure in the positioning calculation control microprocessor comprises:
- a synchronous scan procedure, for receiving a synchronization enable signal to periodically generate and output a synchronization scan signal, so as to synchronously drive all linear positioning sensors to start the execution of a signal processing procedure;
- a physical quantity calculation procedure, for obtaining the image mean positions provided by the linear positioning sensors and calculating and outputting a set of physical quantities, the set of physical quantities including the physical quantity, the group physical quantity, the relative physical quantity, and other physical quantities; and
- a visual axis control procedure, for calculating and outputting a visual axis angle and two angular driving signals according to the physical quantity, group physical quantity or a visual axis angle, further receiving two feedback angular electric signals to implement an angular feedback control, so as to achieve the angular positioning control of the visual axis.

20. Three-dimensional virtual input and simulation apparatus of claim 19, wherein the physical quantity means the physical quantities comprising the 3D position coordinates, 3D displacements, 3D velocities and 3D accelerations of the point light sources, and the group physical quantity means the physical quantities comprising a group center coordinate, a group average displacement, a group average velocity, and a group average acceleration, and the relative physical quantity means the physical quantities comprising a relative position, a relative velocity, a relative acceleration, an angle, an angular velocity, an angular acceleration and a plan vector constructed among the point light sources and the group center coordinates, and other physical quantities means the physical quantities comprising the force, torque, centripetal force, momentum and kinetic energy of the point light sources.

21. Three-dimensional virtual input and simulation apparatus of claim 1, wherein the 1D optical positioning device fixation mechanism is a triangular geometric structure, preferably an equilateral triangle structure, and installs and fixes a the linear positioning sensor fixation mechanism at each vertices or the middle of three sides of the triangular device, namely the relative installed positions of three linear positioning sensors constitute a triangular geometric structure, further the linear positioning sensor can be set to any angle by the rotation about its optical axis, namely the direction of a long axis of the linear optical sensor array in the linear positioning sensors can be set to any angle, and the group of pilot point light sources are installed at any position of the triangular 1D optical positioning device fixation mechanism, and the preferable number of the pilot point light sources is three, and the preferable installed positions are the vertices or the middle of three sides of the triangular, further a connecting structure can be installed at the vertices of the triangular 1D optical positioning device fixation mechanism, and the connecting structure includes a structure which can connects or detaches two sides of a triangle and can freely adjust the angle included between any two sides of the triangle.

22. Three-dimensional virtual input and simulation apparatus of claim 21, wherein the 1D optical positioning device fixation mechanism installs one more connecting mechanism installed at the middle of any one of three sides such that an extra linear positioning sensor is installed, and the extra linear positioning sensor is installed at the center of the triangle.

23. Three-dimensional virtual input and simulation apparatus of claim 1, wherein the 1D optical positioning device fixation mechanism is the improved mechanism of claim 21, has a quadrilateral, a pentagonal or a hexagonal geometric structure, preferably a square, an equilateral pentagon or an equilateral hexagon, and installs and fixes a linear positioning sensor fixation mechanism at each vertices or the middle of each sides of the 1D optical positioning device fixation mechanism, namely the number of installed linear positioning sensor is four, five or six, further the group of pilot point light sources are installed at any position of the 1D optical positioning device fixation mechanism, and the preferable number of the pilot point light sources is three, and the preferable installed position are the vertices or the middle of each sides of the 1D optical positioning device fixation mechanism.

24. Three-dimensional virtual input and simulation apparatus of claim 1, wherein the 1D optical positioning device fixation mechanism can be a casing of other conventional devices such as a notebook computer, a PDA, a video game player, a mobile phone, a liquid crystal display, a plasma display, a television, a projector, an optical camera, an optical camcorder, an optical telescope, an automobile or a motorcycle, namely the plurality of linear positioning sensors, the positioning calculation control microprocessor, the signal transmission interface and the pilot point light sources can be installed on the casing of the aforementioned conventional devices.

25. Three-dimensional virtual input and simulation apparatus of claim 1, wherein the control analysis procedure in the control analysis unit further comprises:
   a coordinate alignment and synchronous calibration procedure, for obtaining the coordinate transformation relationship between any two of 1D optical positioning devices with a visual axis tracking function, and compensating the positioning error caused by the coordinate transformation, and correcting the error of synchronous timing;
   a device simulated input procedure, for recognizing and simulating the operating gestures required by a physical input device, as to achieve the virtual input purpose; and
   a simulator procedure, for measuring the positions of a plurality of point light sources installed on a physical object in real time to obtain the trajectory and physical movement quantities of the physical object, and further taking the advantage of the virtual reality technology to define a virtual object in the virtual space and corresponding the motion of the virtual object to the motion of the physical object, and thus the virtual object interacting with other virtual objects in the virtual space according to the physical laws, so as to achieve the purpose of simulation.

26. Three-dimensional virtual input and simulation apparatus of claim 25, wherein the coordinate alignment and synchronous calibration procedure comprises:
   a visual axis reset procedure, for using the visual axis control procedure installed in the 1D optical positioning device with a visual axis tracking function to point the visual axes of 1D optical positioning devices all at a positioning point light source and thus setting the angle of each visual axis at zero degree;
   a coordinate transformation setting procedure, for selecting one of the 1D optical positioning device as a master positioning device and the others as client positioning devices, the master positioning device measuring the position of the positioning point light source and each pilot point light sources of all client positioning devices and each client positioning device measuring the position of the positioning point light source, such that the coordinate transformation relationship between the master and the client positioning devices and the compensation of the positioning error being obtained; and
   a synchronous timing calibration procedure, for periodically outputting a synchronization enable signal in a proper cycle of time interval, such that all positioning device being calibrated to execute the positioning calculation and control procedure synchronously.

27. Three-dimensional virtual input and simulation apparatus of claim 25, wherein the device simulated input procedure comprises:
   a procedure of virtual operating screen correspondence, as to a physical operating screen with an actual dimension, for defining a virtual operating screen at any position in the space, the virtual operating screen having a spatial corresponding relationship with the physical operating screen, and the relationship being a one-to-one corresponding relation which may have a magnifying corresponding relation, an equivalent corresponding relation or a shrinking corresponding relation, and further by taking the advantage of virtual reality technology, the virtual operating screen being visually displayed as a virtual stereo image;
   a procedure of virtual device geometric structure definition and operating fingers correspondence, as to a physical input device to be simulated, for defining a geometric structure of a virtual device, a physical position and size of the virtual function keys and the physical motion of the virtual function keys, and corresponding the operating fingers to the virtual function keys, and further by taking the advantage of virtual reality technology, the geometric structure of the virtual device and operating fingers being visually displayed as a virtual stereo image; and
   a procedure of operating gestures definition and recognition, according to the physical motion of the virtual function keys, for defining the physical movement quantities of the operating fingers, the physical movement quantities being a set of consecutive time dependent physical quantities, and the set of physical quantities comprising the physical quantities, group physical quantities, relative physical quantities and other physical quantities of all point light sources, thus according to these predefined physical quantities, the gestures of operating fingers being recognized by measuring and analyzing the motion of point light sources installed on the fingers, so as to achieve the device simulated input purpose.

28. Three-dimensional virtual input and simulation apparatus of claim 27, wherein the physical operating screen is the Windows operating screen of a personal computer, the Windows operating screen of a PDA, the operating screen of a mobile phone, the operating screen of a television or the operating screen of a game player.

29. Three-dimensional virtual input and simulation apparatus of claim 1, wherein the control analysis procedure is integrated and installed in other devices comparing a personal computer, a notebook computer, a PDA, a mobile phone, a game player and a video playing and a converting equipment.

30. Three-dimensional virtual input and simulation apparatus of claim 1, wherein the physical input device is one of a mouse, a keyboard, a remote control and a touch screen.

* * * * *